US012054972B2

(12) United States Patent
Cumbo

(10) Patent No.: US 12,054,972 B2
(45) Date of Patent: Aug. 6, 2024

(54) CLOSURE LATCH ASSEMBLY WITH CINCH MECHANISM AND VARIABLE POWERED ANTI-PINCH CINCH CONTROL

(71) Applicant: MAGNA CLOSURES INC., Newmarket (CA)

(72) Inventor: Francesco Cumbo, Pisa (IT)

(73) Assignee: MAGNA CLOSURES INC., Newmarket (CA)

( * ) Notice: Subject to any disclaimer, the term of this patent is extended or adjusted under 35 U.S.C. 154(b) by 262 days.

(21) Appl. No.: 17/586,908

(22) Filed: Jan. 28, 2022

(65) Prior Publication Data

US 2022/0259901 A1 Aug. 18, 2022

Related U.S. Application Data

(60) Provisional application No. 63/149,150, filed on Feb. 12, 2021.

(51) Int. Cl.

| | |
|---|---|
| ***E05B 81/86*** | (2014.01) |
| ***E05B 81/06*** | (2014.01) |
| ***E05B 81/20*** | (2014.01) |
| ***E05B 81/74*** | (2014.01) |
| *E05B 81/76* | (2014.01) |

(52) U.S. Cl.

CPC .............. *E05B 81/86* (2013.01); *E05B 81/06* (2013.01); *E05B 81/20* (2013.01); *E05B 81/74* (2013.01); *E05B 81/76* (2013.01)

(58) Field of Classification Search

CPC .......... E05B 81/86; E05B 81/06; E05B 81/20; E05B 81/74; E05B 81/76; E05B 81/21

USPC .......................................................... 292/201

See application file for complete search history.

(56) References Cited

U.S. PATENT DOCUMENTS

| | | | | |
|---|---|---|---|---|
| 4,872,714 | A | 10/1989 | Brusasco | |
| 4,988,135 | A | 1/1991 | Ottino | |
| 6,341,448 | B1 * | 1/2002 | Murray | E05B 81/20 49/283 |
| 6,516,929 | B1 | 2/2003 | Baniak et al. | |
| 6,669,268 | B2 | 12/2003 | Oberheide | |

(Continued)

FOREIGN PATENT DOCUMENTS

| | | | |
|---|---|---|---|
| CA | 2475746 | A1 | 1/2005 |
| DE | 10242830 | A1 | 12/2003 |

(Continued)

*Primary Examiner* — Kristina R Fulton
*Assistant Examiner* — James Edward Ignaczewski
(74) *Attorney, Agent, or Firm* — Dickinson Wright PLLC

(57) ABSTRACT

A closure latch assembly and method for cinching a closure panel from a partially closed position to a fully closed position without pinching an object between the closure panel and a structural portion of a motor vehicle are provided. The latch assembly has a latch cinch mechanism including a cinch lever operably moveable from a cinch start position to a cinch stop position to cause a cinch link to move a ratchet from a secondary striker capture position to a primary striker capture position. A power-operated cinch actuator receives a first signal to move the cinch lever from the cinch start position to the cinch stop position and receives a second signal, in response to an object detected between the closure panel and the structural portion, to stop moving the cinch lever from the cinch start position toward the cinch stop position.

17 Claims, 34 Drawing Sheets

(56) References Cited

U.S. PATENT DOCUMENTS

| | | | | |
|---|---|---|---|---|
| 6,848,727 | B1 | 2/2005 | Cetnar et al. | |
| 7,032,937 | B2 | 4/2006 | Boecker et al. | |
| 7,175,212 | B2 | 2/2007 | Cetnar et al. | |
| 7,261,334 | B2 | 8/2007 | Oberheide et al. | |
| 7,275,774 | B2 | 10/2007 | Oberheide | |
| 7,472,628 | B2 | 1/2009 | Oberheide | |
| 9,428,943 | B2 | 8/2016 | Mitchell et al. | |
| 9,920,556 | B2 | 3/2018 | Byun et al. | |
| 10,378,252 | B2 | 8/2019 | Ottino et al. | |
| 10,465,425 | B2 | 11/2019 | Clark et al. | |
| 10,767,397 | B2 | 9/2020 | Ottino et al. | |
| 10,876,329 | B2 | 12/2020 | Dente et al. | |
| 10,895,095 | B2 | 1/2021 | Cumbo | |
| 11,162,284 | B2 | 11/2021 | Ottino et al. | |
| 11,168,497 | B2 | 11/2021 | Distefano et al. | |
| 11,220,850 | B2 | 1/2022 | Margheritti | |
| 2003/0080569 | A1* | 5/2003 | Raymond | E05B 81/20<br>292/201 |
| 2004/0159518 | A1 | 8/2004 | Oberheide | |
| 2016/0186468 | A1 | 6/2016 | Ilea | |
| 2016/0244999 | A1* | 8/2016 | Ottino | E05B 85/26 |
| 2017/0089103 | A1 | 3/2017 | Ottino et al. | |
| 2017/0089105 | A1 | 3/2017 | Margheritti | |
| 2017/0306661 | A1 | 10/2017 | Kim et al. | |
| 2018/0051494 | A1 | 2/2018 | Scocco | |
| 2018/0100331 | A1 | 4/2018 | Cumbo | |
| 2018/0171677 | A1 | 6/2018 | Im et al. | |
| 2019/0003214 | A1 | 1/2019 | Cumbo et al. | |
| 2019/0017301 | A1* | 1/2019 | Cumbo | E05B 85/26 |
| 2019/0226247 | A1 | 7/2019 | Johann et al. | |
| 2019/0292817 | A1 | 9/2019 | Tomaszewski | |
| 2019/0301212 | A1* | 10/2019 | Digel | E05B 81/14 |
| 2020/0080348 | A1 | 3/2020 | Cappelli et al. | |
| 2020/0115932 | A1* | 4/2020 | Ottino | E05B 81/01 |
| 2020/0131836 | A1 | 4/2020 | Ottino | |
| 2020/0392766 | A1* | 12/2020 | Marshall | E05B 83/36 |
| 2021/0108451 | A1 | 4/2021 | Dente et al. | |
| 2021/0270065 | A1* | 9/2021 | Reusch | E05B 81/16 |
| 2021/0370864 | A1 | 12/2021 | Distefano | |

FOREIGN PATENT DOCUMENTS

| | | | | |
|---|---|---|---|---|
| DE | 10247979 | A1 | 4/2004 | |
| DE | 10339877 | A1 | 5/2005 | |
| DE | 10319952 | B4 | 3/2006 | |
| DE | 10330542 | B4 | 1/2007 | |
| DE | 102004036653 | B4 | 12/2008 | |
| DE | 102009050077 | A1 | 4/2011 | |
| DE | 102010024096 | A1 | 12/2011 | |
| DE | 102010024295 | A1 | 12/2011 | |
| DE | 102014003737 | A1 | 9/2015 | |
| DE | 10231825 | B4 | 8/2016 | |
| DE | 102009018188 | A1 | 9/2017 | |
| EP | 2115253 | B1 | 10/2021 | |
| JP | 1992009912 | B2 | 2/1992 | |
| WO | 2003071064 | A1 | 8/2003 | |
| WO | 2011015497 | A1 | 2/2011 | |
| WO | WO-2011065226 | A1 * | 6/2011 | E05B 81/20 |
| WO | WO-2018137738 | A1 * | 8/2018 | E05B 81/20 |

* cited by examiner

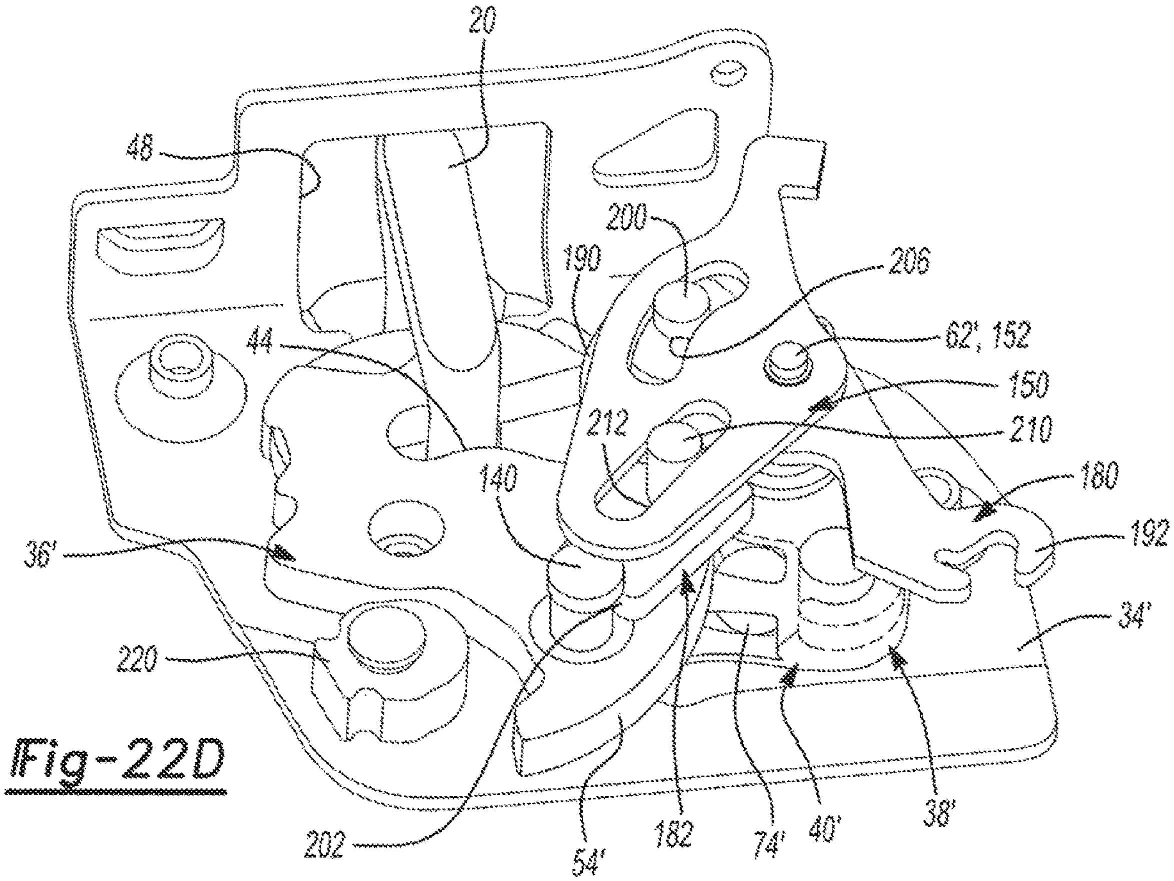
IFig-22D
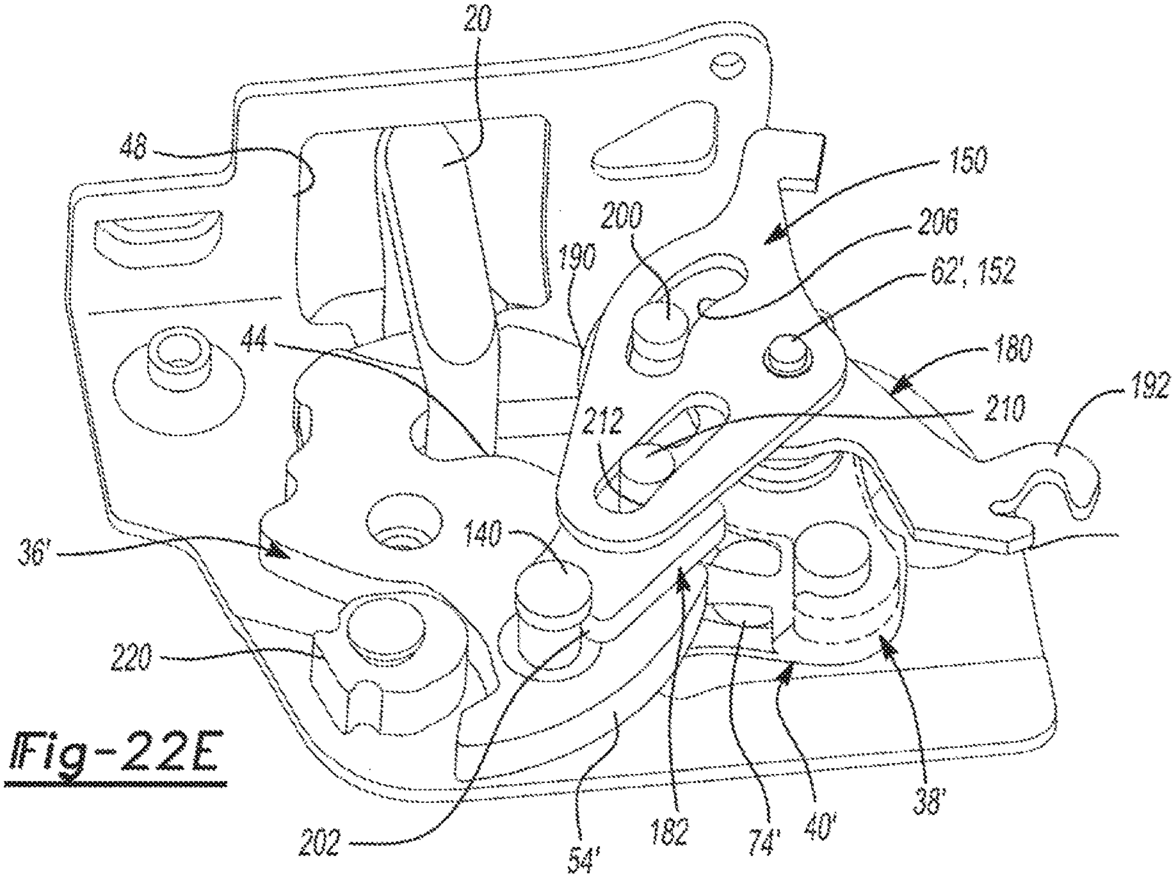
IFig-22E

CLOSURE LATCH ASSEMBLY WITH CINCH MECHANISM AND VARIABLE POWERED ANTI-PINCH CINCH CONTROL

CROSS-REFERENCE TO RELATED APPLICATION

This application claims the benefit of U.S. Provisional Application Ser. No. 63/149,150, filed Feb. 12, 2021, which is incorporated herein by way of reference in its entirety.

FIELD

The present disclosure relates generally to closure latch assemblies of the type used in vehicle closure systems for releasably securing a closure panel relative to a body portion of a motor vehicle. More particularly, the present disclosure is directed to a power-operated closure latch assembly equipped with a latch mechanism and a latch cinch mechanism arranged to provide a power cinching, anti-pinch function.

BACKGROUND

This section provides background information related to latch assemblies of the type used in motor vehicle closure systems and which is not necessarily prior art to the inventive concepts associated with the present disclosure.

In view of increased consumer demand for motor vehicles equipped with advanced comfort and convenience features, many modern motor vehicles are now provided with passive entry systems to permit locking and release of closure panels (i.e. doors, tailgates, liftgates, decklids, etc.) without the use of traditional key-type manual entry systems. In this regard, some of the more popular features now available with vehicular closure systems include power unlocking/locking, power release, power child locks, and power cinching. These "powered" features are typically integrated into a latch assembly mounted to the closure panel and which is equipped with a ratchet/pawl type of latch mechanism that is controlled via at least one electric actuator. Movement of the closure panel from an open position toward a closed position results in a striker (mounted to a structural portion of the vehicle) engaging and forcibly rotating the ratchet, in opposition to biasing normally applied to the ratchet via a ratchet biasing member, from a striker release position toward a striker capture position. Once the ratchet is located in its striker capture position, the pawl moves into a ratchet holding position whereat the pawl engages and holds the ratchet in its striker capture position, thereby latching the latch mechanism and holding the closure panel in its closed position. In most modern latch assemblies of the type equipped with such a ratchet/pawl latch mechanism, the pawl is operable in its ratchet holding position to retain the ratchet in both of a primary (i.e. "hard close") striker capture position when the closure panel is located in a fully-closed position and a secondary (i.e. "soft close") striker capture position when the closure panel is located in a partially-closed position.

Latch assemblies providing a power release feature typically include a latch release mechanism actuated by an electric "power release" actuator to cause the pawl to move from its ratchet holding position to a ratchet releasing position whereat the pawl is disengaged from the ratchet. Thereafter, the ratchet biasing member moves the ratchet from one of its primary and secondary striker capture positions into its striker release position, thereby releasing the latch mechanism and permitting movement of the vehicle closure panel to its open position. The power release actuator is controlled by a latch control unit in response to a latch release signal generated by the passive entry system (i.e. via a key fob or a handle-mounted switch).

Latch assemblies providing a power cinching feature typically include a latch cinch mechanism actuated by an electric "power cinch" actuator and configured to cause the ratchet to move from its secondary striker capture position into its primary striker capture position, thereby moving the closure panel from its partially-closed position into its fully-closed position. The latch cinch mechanism is normally maintained in a non-actuated condition and is only shifted into an actuated condition when sensors associated with the latch mechanism indicate that the ratchet is located in its secondary striker capture position. Upon being actuated, the latch cinch mechanism moves the closure panel from its partially-closed position into its fully-closed position in uninterrupted fashion. Following completion of the power cinching operation, when the sensors indicate that the ratchet is located in its primary striker capture position, the latch cinch mechanism is reset. Specifically, the latch cinch mechanism is returned to its non-actuated condition so as to permit uninhibited movement of the ratchet to its striker release position in response to subsequent actuation of the latch release mechanism. Obviously, if the closure panel is initially closed with sufficient closing force to locate the ratchet in its primary striker capture position, then the cinching operation is bypassed and the latch cinch mechanism is maintained in its non-actuated condition.

For latches with power cinching, the controller needs to know the position of the ratchet (released, primary engaged, secondary engaged position), in order to know when to begin and when to stop the cinching motor. Typically, switches triggered by either the ratchet or the pawl, or both, tend to report on the ratchet position. FIG. 23 shows a prior art switching strategy. One switch is triggered by the ratchet, and another switch is triggered by the pawl. The ratchet switch has an OFF state when the ratchet is rotated into the release position, and an ON state when the ratchet is rotates past the secondary and preferably close to the primary engagement position. To compensate for operational variances, there is a slight lag between the ratchet reaching the primary engagement position and the ratchet switch indicating that the ratchet is engaged. The pawl switch has an OFF position that corresponds to the pawl being actuated away from the ratchet, and an ON position, which corresponds to when the pawl retains the ratchet in either the secondary or primary engagement positions. One problem with this switch strategy is that the switches report the same state (OFF and OFF) when the ratchet is in the primary engagement position, and an interlude between the primary and secondary engagement positions. For example if the door remains between the primary and secondary position after a manual closing for a reason (i.e.: a low seal load), the pawl is indicated in the OFF position yet the ratchet ajar is not yet in the ON state, and the switch still indicates the OFF. Thus the states of the switches correspond to the OPEN position of the door yet the door is in a partially closed position. This means the controller is not able to distinguish the partially closed state of the door from an open state and thus will not proceed to power the cinch leading to a cinch malfunction. The inability for the switches to properly indicate the position of the ratchet is known as a blind spot.

Further, as noted above, upon actuating the power cinching feature, the closure panel is moved continuously from its partially-closed position to its fully-closed position under sufficient force to bring the closure panel to its fully closed position against seal force imparted on the closure panel. Although desirable to bring the closure panel to its fully closed position in reliable fashion, should object come between the closure panel and the structural portion of the vehicle to which the striker is mounted, it is also desirable to avoid damage to at least one of the power cinching feature and/or the object. As such, known power cinching features could benefit by decreasing the likelihood of causing damage to anything coming between the closure panel and the structural portion of the vehicle upon actuating the power cinching feature.

To ensure that precipitation and road debris do not enter the vehicle, all vehicular closure panels are equipped with resilient weather seals disposed around their periphery and which are configured to seal against a mating surface of the vehicle body surrounding the closure opening. These weather seals also function to reduce wind noise and are configured to compress upon latching of the closure panel in its fully-closed position relative to the vehicle body. As is well recognized, increasing the compressive seal force applied to the weather seals provides improved noise reduction within the passenger compartment of the motor vehicle. However, these seal forces also tend to drive the closure panel toward its open position, thereby loading the latch mechanism. As such, undesirably high latch release forces, required to release the latch mechanism, are established along the engagement interface between the ratchet and the pawl. These high latch release forces detrimentally impact the size and power requirements of the power release actuator which, in turn, drives up the overall cost and size of the latch assembly. To address this shortcoming, it is known to equip the latch assembly with a double ratchet/pawl type of latch mechanism. As a further alternative, it is known to modify the single ratchet/pawl type of latch mechanism with a roller-type engagement feature such as is shown in commonly-owned U.S. Publication No. US 2017/0051540.

While current power-operated latch assemblies and cinching features thereof are sufficient to meet all regulatory requirements and provide desired levels of enhanced comfort and convenience, a need continues to exist directed toward advancing the technology and providing alternative power-operated closure latch assemblies and sub-systems thereof that address and overcome at least some of the known shortcomings associated with conventional closure latch arrangements.

SUMMARY

This section provides a general summary of some of the inventive concepts associated with the present disclosure. Accordingly, this section is not intended to be interpreted as a comprehensive and exhaustive listing of all features, aspects, objectives and/or advantages associated with the inventive concepts of the present disclosure that are further described and illustrated in the detailed description provided herein.

It is an objective of the present disclosure to provide a power-operated closure latch assembly that meets the above-identified needs and provides a technological advancement over known power-operated closure latch assemblies.

It is another objective of the present disclosure to provide a power-operated closure latch assembly for a motor vehicle closure system equipped with a latch mechanism, a power-operated latch release mechanism, and a power-operated latch cinch mechanism.

It is a further objective of the present disclosure to incorporate a plurality of technical solutions into the power-operated closure latch assembly to effectively reduce power release (i.e. opening) force requirements, provide enhanced power cinch functionality, reduce the likelihood of causing damage and/or pinching an object coming between a closure panel and a structural portion of the motor vehicle while cinching the closure panel toward a fully closed position, and provide mechanical cinch disengagement functionality.

It is still a further objective of the present disclosure to employ the power-operated latch cinch mechanism to hold the ratchet of the latch mechanism in a secondary striker capture position without direct latched engagement between the pawl and the ratchet, and to further employ the power-operated latch cinch mechanism to move the ratchet from its secondary striker capture position into a primary striker capture position whereat the pawl moves into engagement with the ratchet while the latch cinch mechanism is subsequently moved out of engagement with the ratchet. The requirement of having an additional pawl to maintain the ratchet in the secondary striker capture position is also not required, reducing the complexity and packaging size of the closure latch assembly.

It is yet a further objective of the present disclosure to configure the power-operated latch cinch mechanism to avoid causing damage to an object coming between a closure panel and a structural portion of the vehicle upon actuating the power cinching feature to move the closure panel toward a fully closed position.

It is yet a further objective of the present disclosure to configure the power-operated latch cinch mechanism to avoid causing damage to the power-operated latch cinch mechanism upon an object coming between the closure panel and the structural portion of the vehicle upon actuating the power cinching feature to move the closure panel toward a fully closed position.

In accordance with these and other objectives, the present disclosure is directed to a closure latch assembly for a motor vehicle for releasably holding a closure panel in a fully closed position and a partially closed position relative to a structural portion of the motor vehicle and for releasing the closure panel for movement to an open position, comprising: a latch mechanism having a ratchet moveable between a striker release position whereat the ratchet is positioned to release a striker, a secondary (soft-close) striker capture position and a primary (hard-close) striker capture position, a pawl moveable between a ratchet holding position whereat the pawl is positioned to hold the ratchet in its primary striker capture position and a ratchet releasing position whereat the pawl is positioned to permit movement of the ratchet to its striker release position; a latch release mechanism having a release lever, the latch release mechanism being moveable between a non-actuated position whereat the release lever permits the pawl to be located in its ratchet holding position and an actuated position whereat the release lever causes the pawl to move to its ratchet releasing position; a latch cinch mechanism having a cinch link moveable between a rest position whereat the cinch link is disengaged from the ratchet when the ratchet is located in its striker release position and an engaged position whereat the cinch link engages the ratchet when the ratchet is located in its secondary striker capture position and a cinch lever operably moveable from a cinch start position to a cinch stop position for causing the cinch link to move from its engaged position to a ratchet cinched position which causes the ratchet to rotate from its secondary striker capture position to its primary striker capture position, and a power-operated cinch actuator configured to receive a first signal to move the cinch lever from the cinch start position to the cinch stop position to move the ratchet from its secondary striker capture position to its primary striker capture position and to receive a second signal, in response to an object being detected within a gap between the closure panel and the structural portion of the motor vehicle, after receiving the first signal, to stop moving the cinch lever from the cinch start position toward the cinch stop position to stop the ratchet from moving from its secondary striker capture position to its primary striker capture position.

In accordance with another aspect, upon receiving the second signal, the ratchet is permitted to move to one of its secondary striker capture position and its striker release position.

In accordance with another aspect, upon receiving the first signal, the power-operated cinch actuator is configured to move the cinch lever from the cinch start position toward the cinch stop position under a first power mode while the gap between the closure panel and the structural portion of the motor vehicle is present and under a second power mode when the gap between the closure panel and the structural portion of the motor vehicle is substantially closed, wherein the first power mode is less than the second power mode.

In accordance with another aspect, the closure latch assembly includes at least one sensor configured to detect when the gap is present and when the gap is substantially closed, wherein the at least one sensor is configured in operable communication with the power-operated cinch actuator to cause the power-operated cinch actuator to change from the first power mode to the second power mode when the gap is substantially closed.

In accordance with another aspect, the at least one sensor configured to detect when the gap is present and when the gap is substantially closed includes at least one switch assembly configured to simultaneously detect the positions of the pawl and the ratchet.

In accordance with another aspect, the at least one sensor configured to detect when the gap is present and when the gap is substantially closed can be provided as a single switch assembly configured to simultaneously detect the positions of the pawl and the ratchet.

In accordance with another aspect, the pawl is coupled to the single switch assembly for lost-motion movement therewith.

In accordance with another aspect, the single switch assembly indicates that the closure panel is in the fully closed position when the ratchet is in the primary striker capture position and the pawl is in the ratchet holding position.

In accordance with another aspect, the single switch assembly includes a lever coupled to the pawl for relative movement therewith, wherein the lever is configured for movement in response to movement of the ratchet.

In accordance with another aspect, a pin is fixed to the pawl and the lever of the single switch assembly includes an elongate slot extending between opposite first and second ends, wherein the pin is disposed in the elongate slot for sliding movement therealong to establish the lost motion between the pawl and the lever of the single switch assembly.

In accordance with another aspect, the pin is adjacent one of the first end or second end of the elongate slot when the ratchet is in the striker release position and the pin is adjacent the other of the first end or second end of the elongate slot when the ratchet is in the secondary striker capture position, wherein the lever remains in engagement with an ajar switch of the single switch assembly when the ratchet is in the striker release position and the secondary striker capture position.

In accordance with another aspect, the lever moves out of engagement from the ajar switch of the single switch assembly when the ratchet is in the primary striker capture position and the pawl is in the ratchet holding position.

In accordance with another aspect, the closure latch assembly includes an object sensor configured to detect an object within the gap when the cinch lever is moving from the cinch start position toward the cinch stop position under the first power mode, wherein the object sensor is configured in operable communication with the power-operated cinch actuator to stop moving the cinch lever from the cinch start position toward the cinch stop position when an object is detected.

In accordance with another aspect, the object sensor can be provided as a force sensor.

In accordance with another aspect, the closure latch assembly includes a controller configured in operable communication with the at least one sensor, the object sensor, and the power-operated cinch actuator.

In accordance with another aspect, a method of preventing pinching of an object between a closure panel and a structural portion of the motor vehicle while cinching the closure panel from a partially closed position to a fully closed position is provided. The method includes, detecting a latch mechanism of the closure panel being in a cinch start position; actuating a cinch actuator with a first signal and cinching the latch mechanism toward a primary latched position; detecting whether an object is in a gap between the closure panel and a structural portion of the motor vehicle; and stopping the cinching of the latch mechanism with a second signal if an object is detected in the gap, and continuing the cinching of the latch mechanism to the primary latched position under the first signal if an object is not detected in the gap.

In accordance with another aspect, the method can further include cinching the latch mechanism from the start position toward the cinch stop position under a first power mode while the gap between the closure panel and the structural portion of the motor vehicle is present, and when the gap between the closure panel and the structural portion of the motor vehicle is substantially closed, cinching the latch mechanism under a second power mode to the cinch stop position, wherein the first power mode is less than the second power mode.

In accordance with another aspect, the method can further include configuring at least one sensor to detect when the gap is present and when the gap is substantially closed and configuring the at least one sensor in operable communication with the power-operated cinch actuator to cause the power-operated cinch actuator to change from the first power mode to the second power mode when the gap is substantially closed.

In accordance with another aspect, the method can further include configuring the at least one sensor to detect when the gap is present and when the gap is substantially closed as a single switch assembly configured to simultaneously detect the positions of the pawl and the ratchet.

In accordance with another aspect, the method can further include providing the single switch assembly having a lever and a switch, and coupling the lever to the pawl for lost motion therewith and configuring the lever for movement into and out of actuating contact with the switch in response to movement of the pawl and the ratchet.

Further areas of applicability will become apparent from the detailed description provided herein. The description and specific examples disclosed in this summary are provided for purposes of illustration only and do not act to limit the scope of the present disclosure.

BRIEF DESCRIPTION OF THE DRAWINGS

The drawings described herein are provided to illustrate selected, non-limiting embodiments associated with the present disclosure and are not intended to limit the scope of the present disclosure.

FIGS. 22A through 22G illustrate a series of sequential isometric views showing the transition of the latch mechanism from its released state (FIG. 22A) into its secondary closed state (FIG. 22C), subsequent actuation of the power cinch actuator for causing the latch cinch mechanism to shift the latch mechanism from its secondary closed state (FIG. 22C) into its primary closed state (FIG. 22F), and subsequent disengagement and resetting of the latch cinch mechanism (FIG. 22G);

Corresponding reference numbers are used to indicate corresponding components throughout the several views of the drawings.

DETAILED DESCRIPTION OF EXAMPLE EMBODIMENTS

Figure 1:
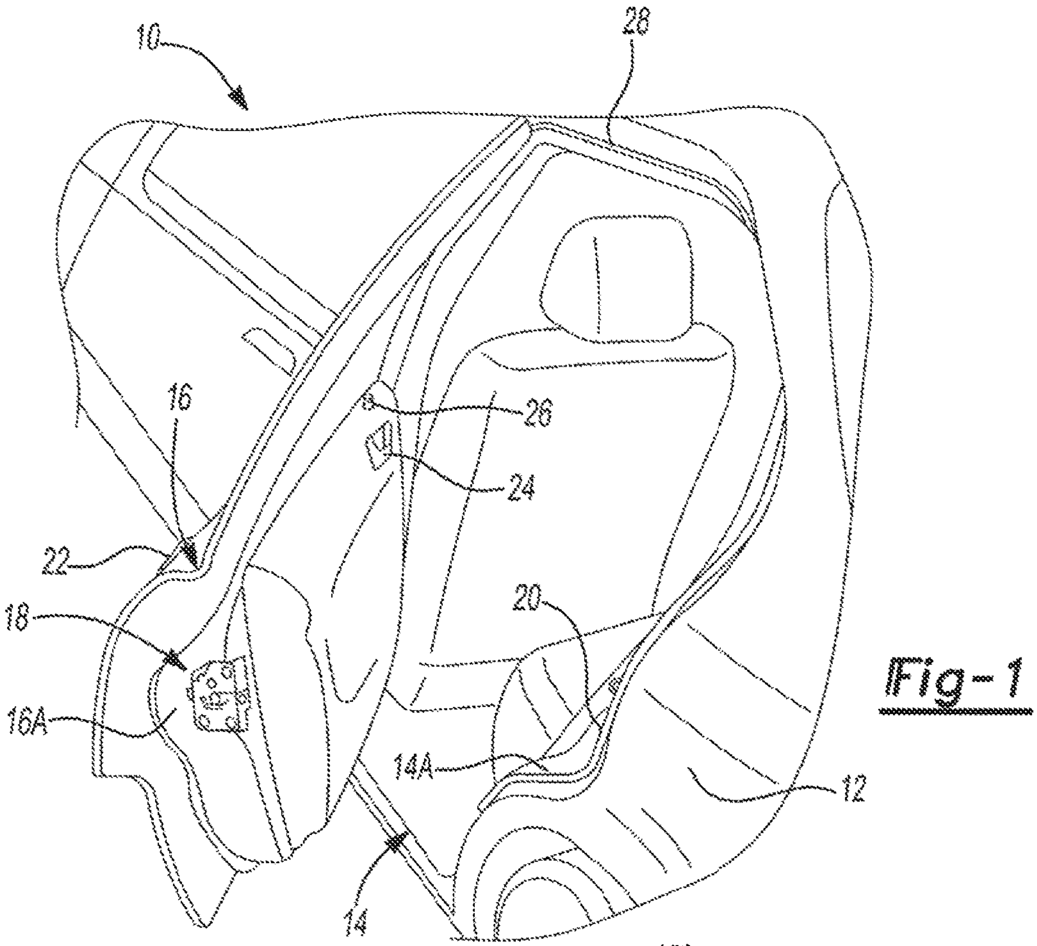
FIG. 1 is a partial perspective view of a motor vehicle having a closure panel equipped with a closure latch assembly constructed in accordance with the teachings of the present disclosure.

Example embodiments will now be described more fully with reference to the accompanying drawings. To this end, the example embodiments are provided so that this disclosure will be thorough, and will fully convey its intended scope to those who are skilled in the art. Accordingly, numerous specific details are set forth such as examples of specific components, devices, and methods, to provide a thorough understanding of embodiments of the present disclosure. However, it will be apparent to those skilled in the art that specific details need not be employed, that example embodiments may be embodied in many different forms, and that neither should be construed to limit the scope of the present disclosure. In some example embodiments, well-known processes, well-known device structures, and well-known technologies are not described in detail.

In the following detailed description, the expression "latch assembly" will be used to generally, as an illustrative example, indicate any power-operated latch device adapted for use with a vehicle closure panel to provide a power cinch feature in combination with a power release feature, but other configurations, such as a manually-operated cinch or release features could be provided. Additionally, the expression "closure panel" will be used to indicate any element moveable between an open position and at least one closed position, respectively opening and closing an access to an inner compartment of a motor vehicle and therefore includes, without limitations, decklids, tailgates, liftgates, bonnet lids, and sunroofs in addition to the sliding or pivoting side passenger doors of a motor vehicle to which the following description will make explicit reference, purely by way of example.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Referring initially to FIG. 1 of the drawings, a motor vehicle 10 is shown to include a vehicle body 12 defining an opening 14 to an interior passenger compartment. A closure panel 16 is pivotably mounted to body 12 for movement between an open position (shown), a partially-closed position, and a fully-closed position relative to opening 14. A latch assembly 18 is rigidly secured to closure panel 16 adjacent to an edge portion 16A thereof and is releasably engageable with a striker 20 that is fixedly secured to a recessed edge portion 14A of opening 14. As will be detailed, latch assembly 18 housing a latch mechanism 32 is operable to engage striker 20 and releaseably hold closure panel 16 in one of its partially-closed and fully-closed positions. An outside handle 22 and an inside handle 24 are provided for actuating (i.e. mechanically and/or electrically) latch assembly 18 to release striker 20 and permit subsequent movement of closure panel 16 to its open position. An optional lock knob 26 is shown which provides a visual indication of the locked state of latch assembly 18 and which may also be operable to mechanically change the locked state of latch assembly 18. A weather seal 28 is mounted on edge portion 14A of opening 14 in vehicle body 12 and is adapted to be resiliently compressed upon engagement with a mating sealing surface on closure panel 16 when closure panel 16 is held by latch assembly 18 in its fully-closed position so as to provide a sealed interface therebetween which is configured to prevent entry of rain and dirt into the passenger compartment while minimizing audible wind noise. For purpose of clarity and functional association with motor vehicle 10, the closure panel is hereinafter referred to as door 16.

Figure 2:
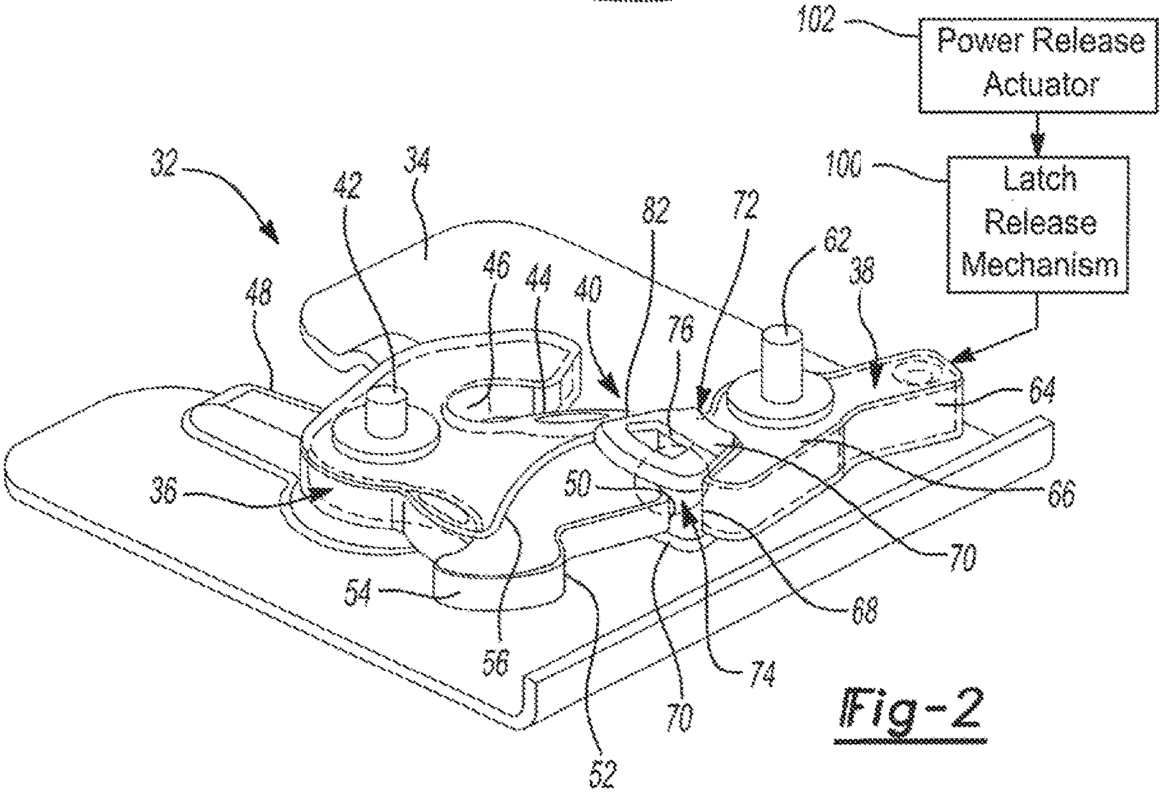
FIG. 2 is an isometric view of a roller-type latch mechanism associated with the closure latch assembly shown in FIG. 1.
Figure 3:
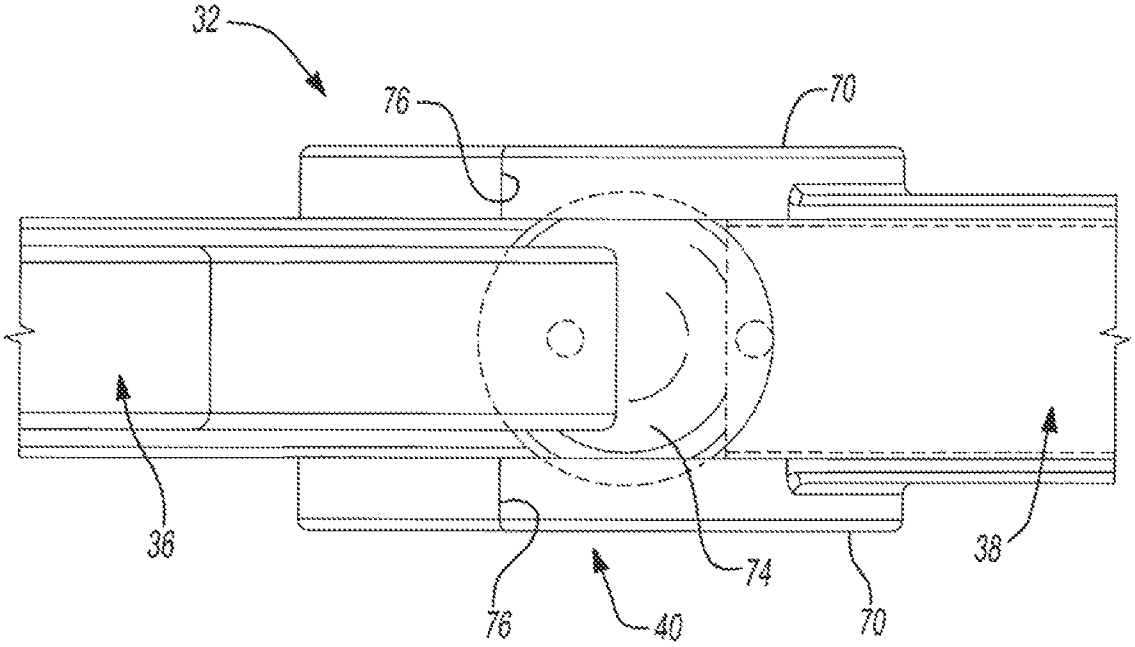
FIG. 3 is a partial side view of the latch mechanism shown in FIG. 2.

Referring now primarily to FIGS. 2, 3 and 4, various components of a latch mechanism 32 are shown pivotably mounted to a latch frame plate 34 and generally include a ratchet 36, a pawl 38, and a roller-type engagement device 40. Ratchet 36 is supported by a ratchet pivot post 42 for movement between a striker release position (FIG. 4A), a soft close or secondary striker capture position (FIG. 4B), and a hard close or primary striker capture position (FIGS. 4C and 4D). Ratchet 36 includes a striker guide channel 44 terminating in a striker retention cavity 46. As seen, latch frame plate 34 includes a fishmouth slot 48 aligned to accept movement of striker 20 relative thereto. Ratchet 36 includes a primary latch notch 50, a secondary latch notch 52, and an edge surface 54. A raised guide surface 56 is also formed on ratchet 36. Arrow 58 indicates a ratchet biasing member that is arranged to normally bias ratchet 36 toward its striker release position.

Pawl 38 is shown pivotably mounted to latch frame plate 34 about a pawl pivot post 62 and includes a first pawl leg segment 64 and a second pawl leg segment 66 defining a pawl engagement surface 68. Roller-type engagement device 40 is secured to second pawl leg segment 66 of pawl 38 and includes a pair of oppositely-disposed sidewalls 70 defining a cage 72, and a roller, shown as a spherical ball bearing 74, that is retained by cage 72 within aligned roller slots 76 formed in sidewalls 70. Pawl 38 is pivotable between a ratchet releasing position (FIG. 4A) and a ratchet holding position (FIGS. 4B, 4C and 4D). Pawl 38 is normally biased toward its ratchet holding position by a pawl biasing member, indicated by arrow 80.

Figure 4A:
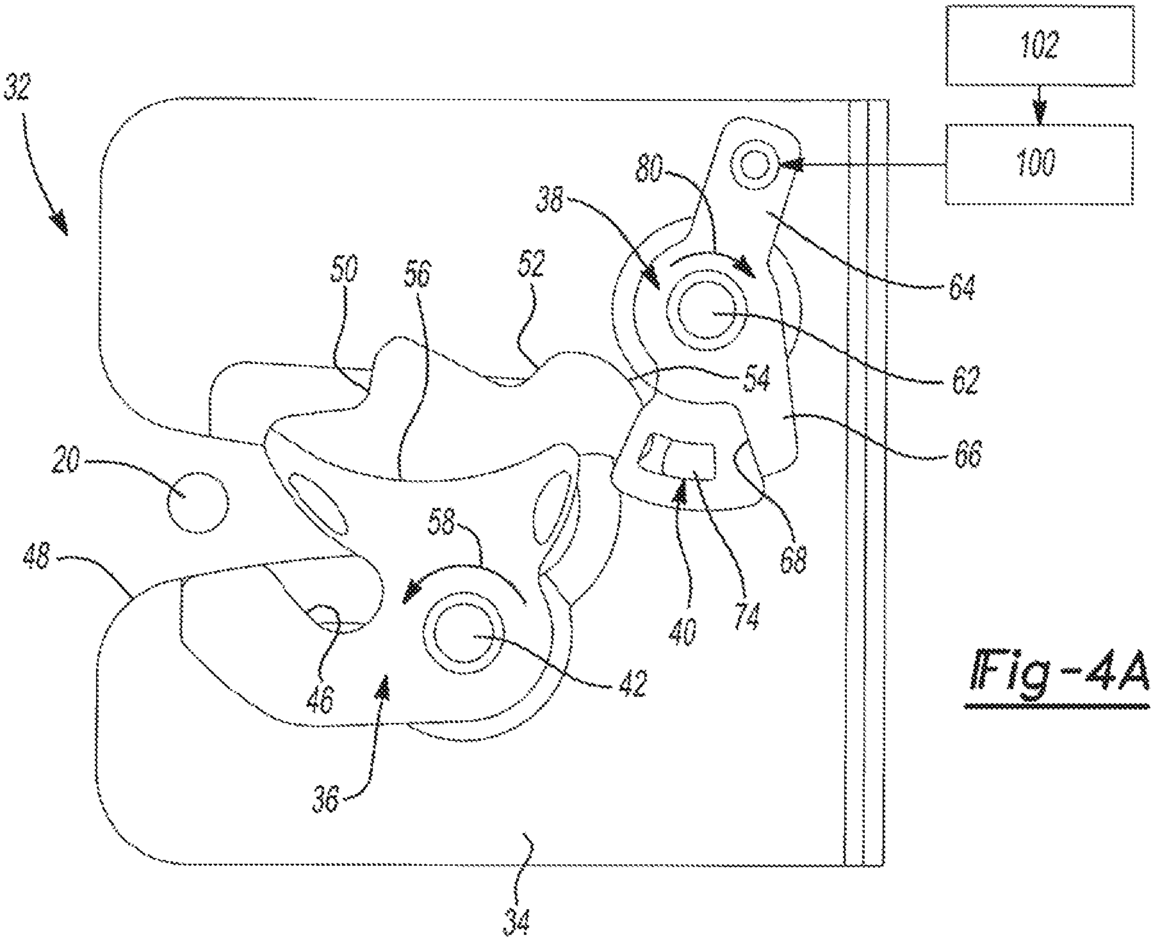
FIG. 4A is a plan view illustrating the latch mechanism in a released state.
Figure 4B:
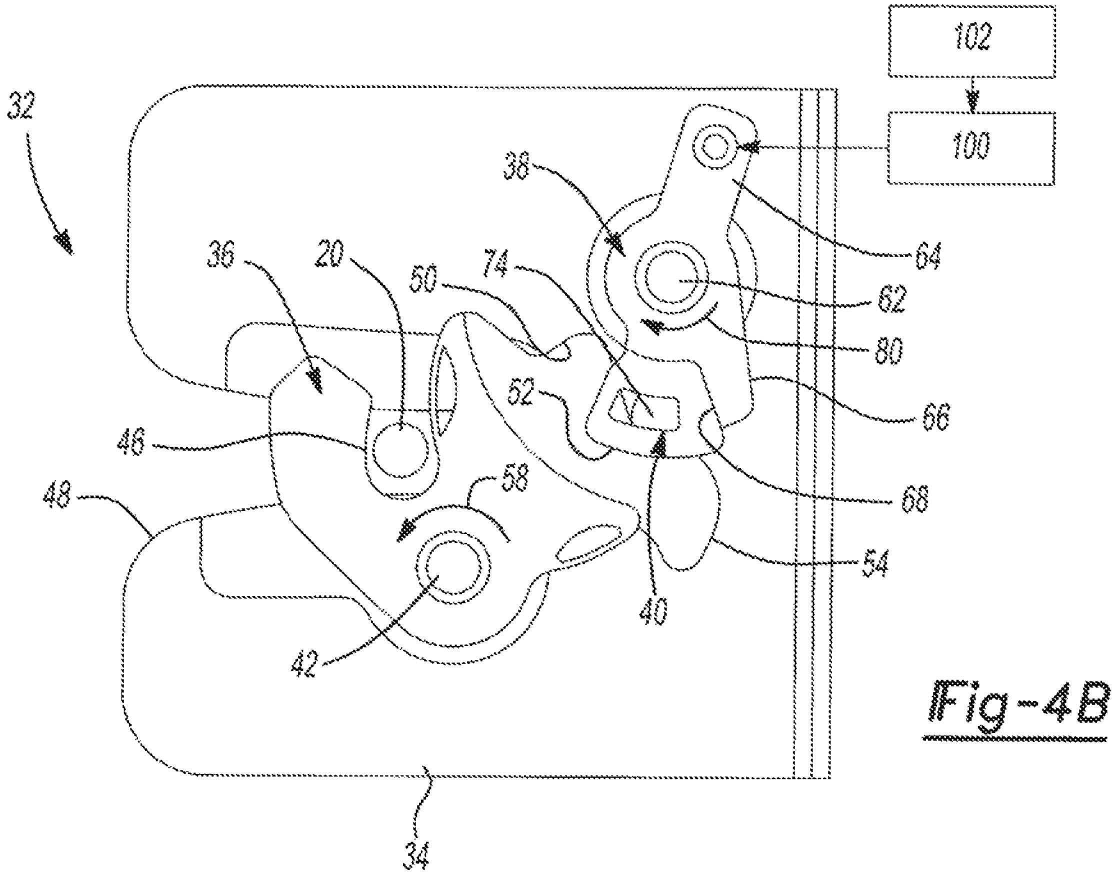
FIG. 4B is a similar plan view illustrating the latch mechanism in an initial or secondary closed state.
Figure 4C:
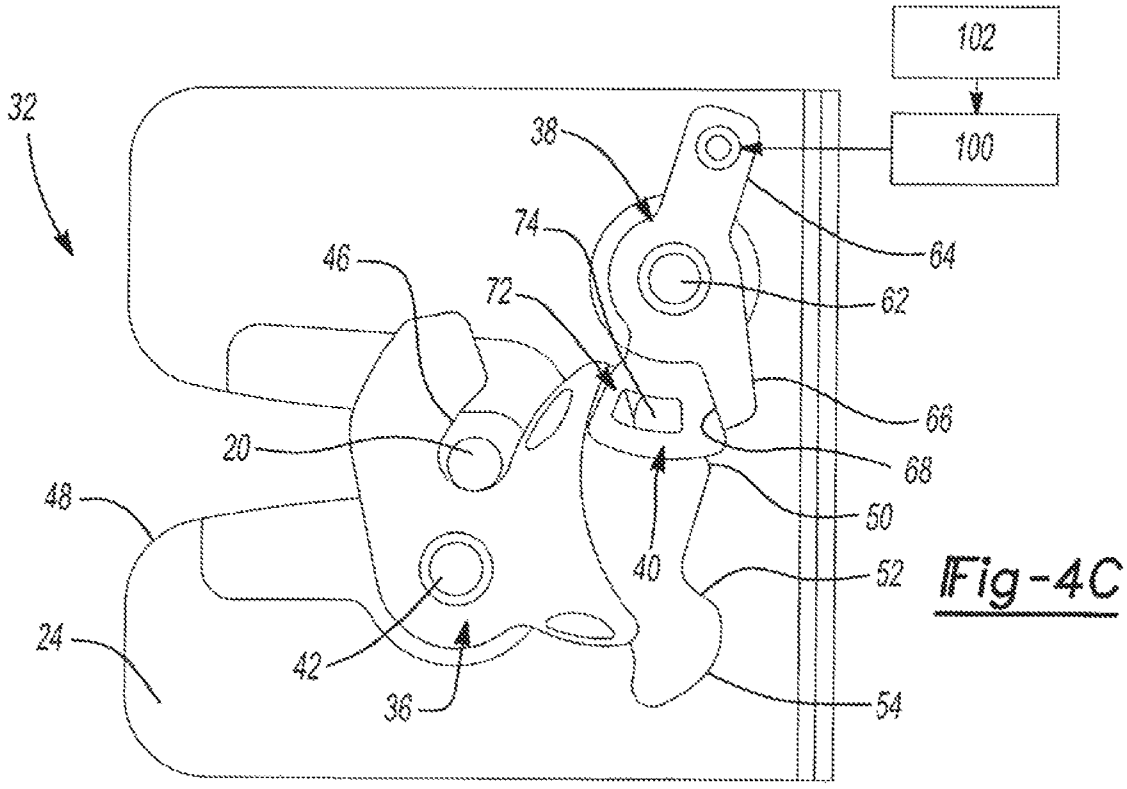
FIG. 4C is yet another plan view illustrating the latch mechanism in a final or primary closed state.
Figure 4D:
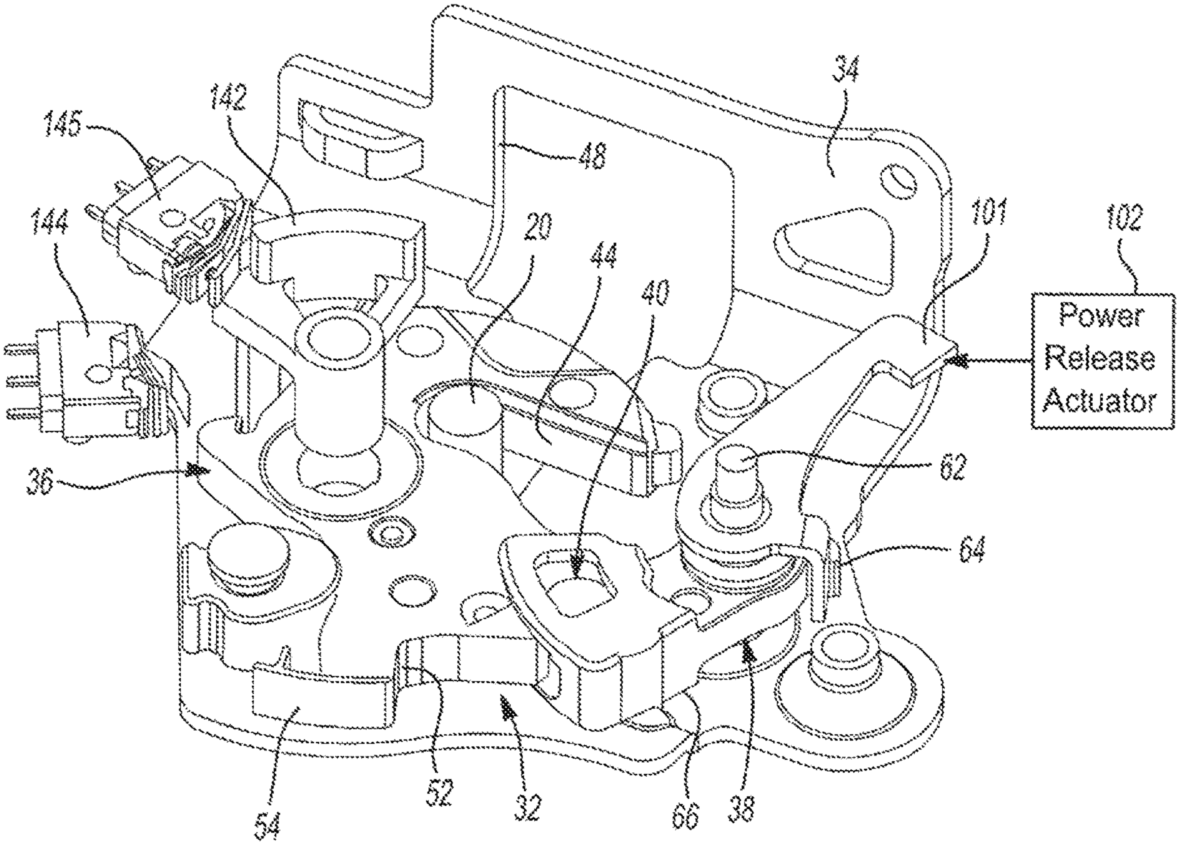
FIG. 4D is an isometric view of the latch mechanism in its primary closed state.

As shown in FIG. 4A, pawl 38 is held in its ratchet releasing position when ratchet 36 is located in its striker release position due to engagement of ball 74 with pawl engagement surface 68 and with edge surface 54 on ratchet 36, whereby a released operating state for latch mechanism 32 is established. As shown in FIG. 4B, ball 74 engages pawl engagement surface 68 on pawl 38 and secondary latch notch 52 on ratchet 36 so as to cause pawl 38, when located in its ratchet holding position, to hold ratchet 36 in its secondary striker capture position. In this orientation, striker 20 is retained between ratchet guide channel 46 and fishmouth slot 48 in latch plate 34 to hold door 16 in the partially-closed position and establish a secondary closed state for latch mechanism 32. Finally, FIGS. 4C and 4D illustrate pawl 38 located in its ratchet holding position with ball 74 engaging pawl engagement surface 68 on pawl 38 and primary latch notch 50 on ratchet 36 such that pawl 38 holds ratchet 36 in its primary striker capture position so as to hold door 16 in its fully-closed position and establish a primary closed operating state for latch mechanism 32.

A latch release mechanism 100 is shown schematically to be connected to first pawl leg segment 64 of pawl 36. Latch release mechanism 100 may include a release lever 101 (FIG. 4D) that is moveable between non-actuated and actuated positions to cause corresponding movement of pawl 38 between its ratchet holding and ratchet releasing positions. In addition, a power release actuator 102 is shown schematically connected to release lever 101 of latch release mechanism 100. Actuation of power release actuator 102 causes release lever 101 to move pawl 38 from its ratchet holding position into its ratchet releasing position. Power release actuator 102 is preferably an electric motor-driven arrangement. A ratchet switch lever 142 is mounted to ratchet 36 and works in cooperation with a ratchet release sensor 144 to provide a "door open" signal when ratchet 36 is located in its striker release position and a secondary latched sensor 145 to provide a "door ajar" signal when ratchet 36 is located in its secondary striker capture position. As is well known, these signals are used by a latch controller unit (ECU) to control operation of power release actuator 102.

Figure 5A:
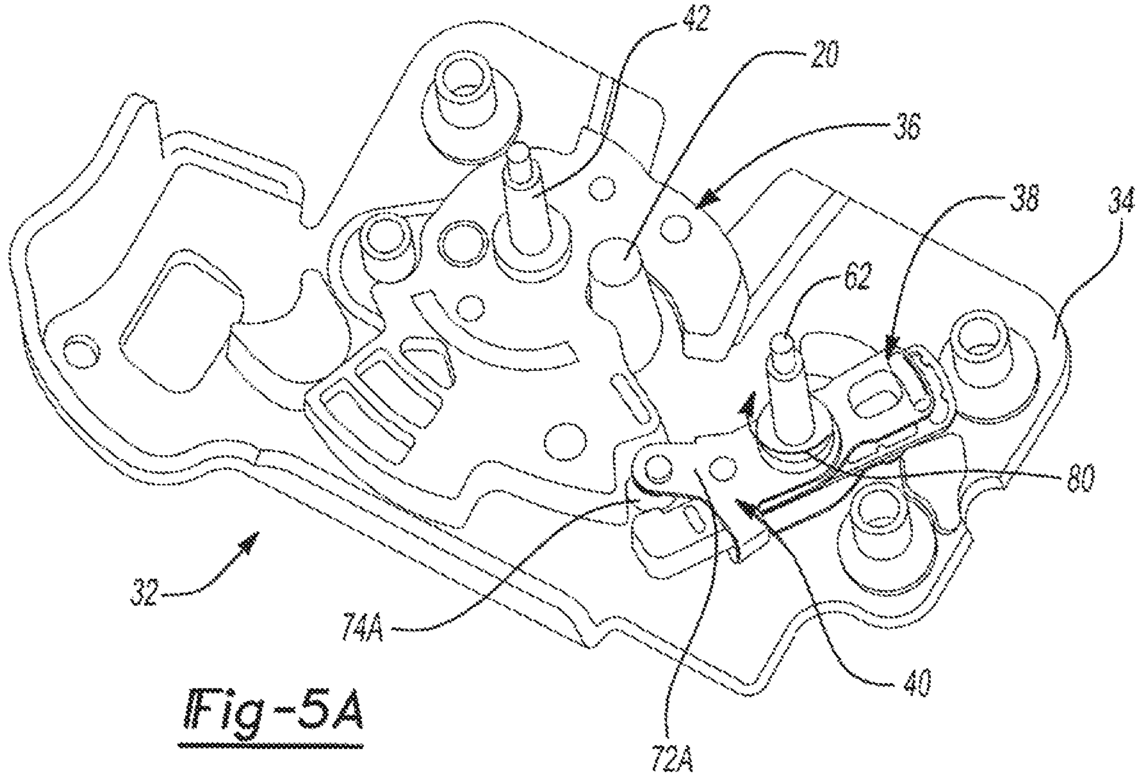
FIGS. 5A and 5B illustrate an alternative version of a roller-type latch mechanism operating in its primary closed state.
Figure 5B:
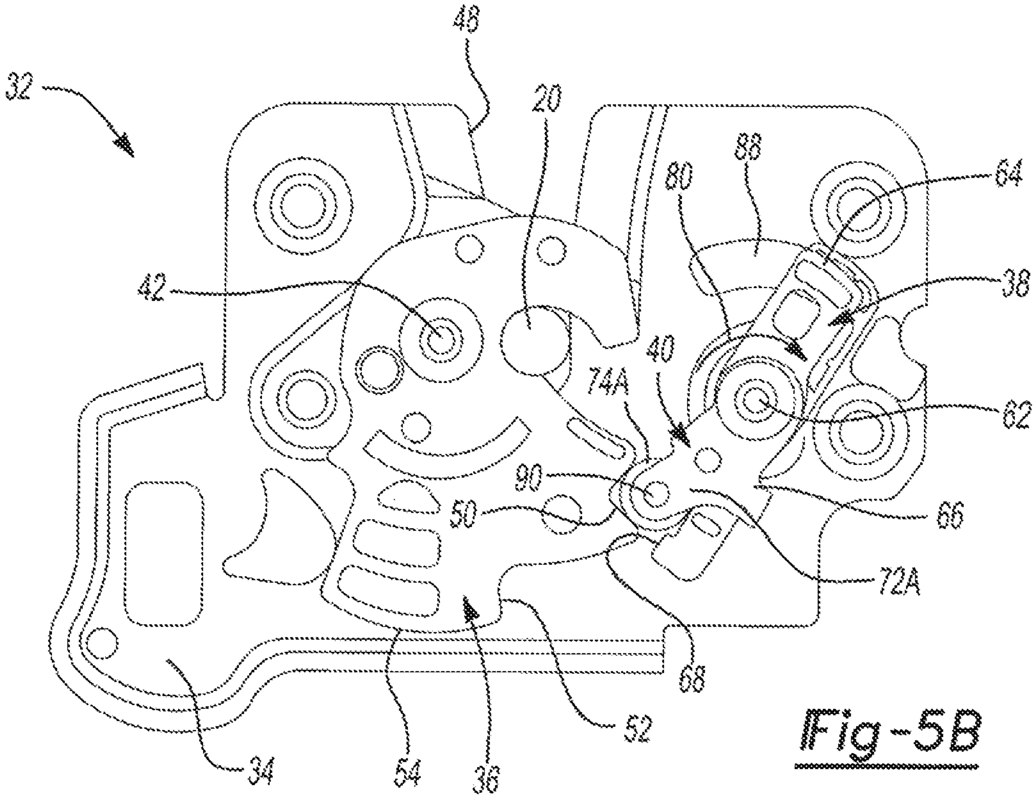
Figure 6A:
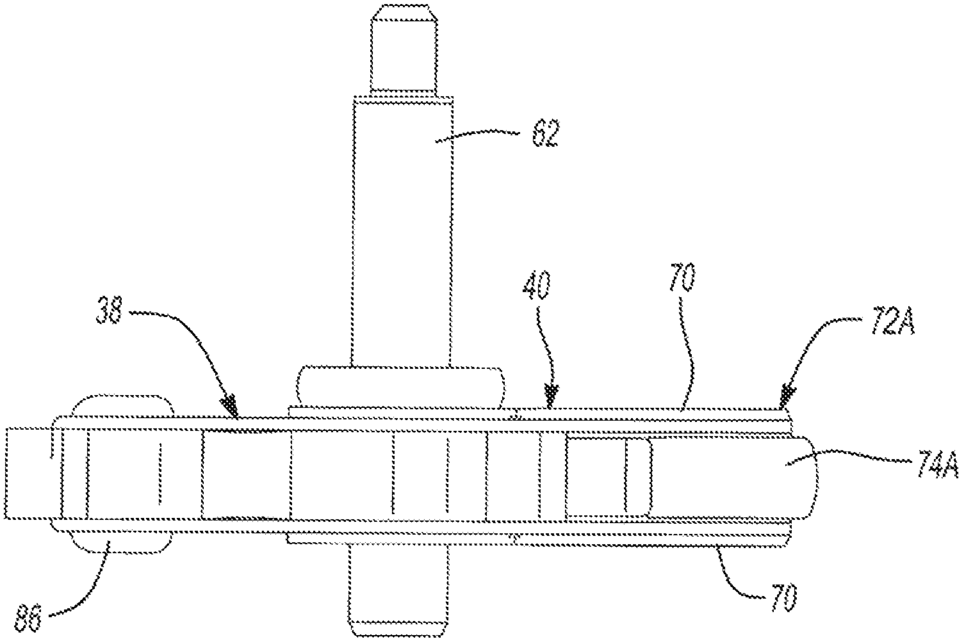
FIGS. 6A and 6B illustrate a roller engagement device associated with the pawl of the alternative latch mechanism shown in FIGS. 5A and 5B in greater detail.
Figure 6B:
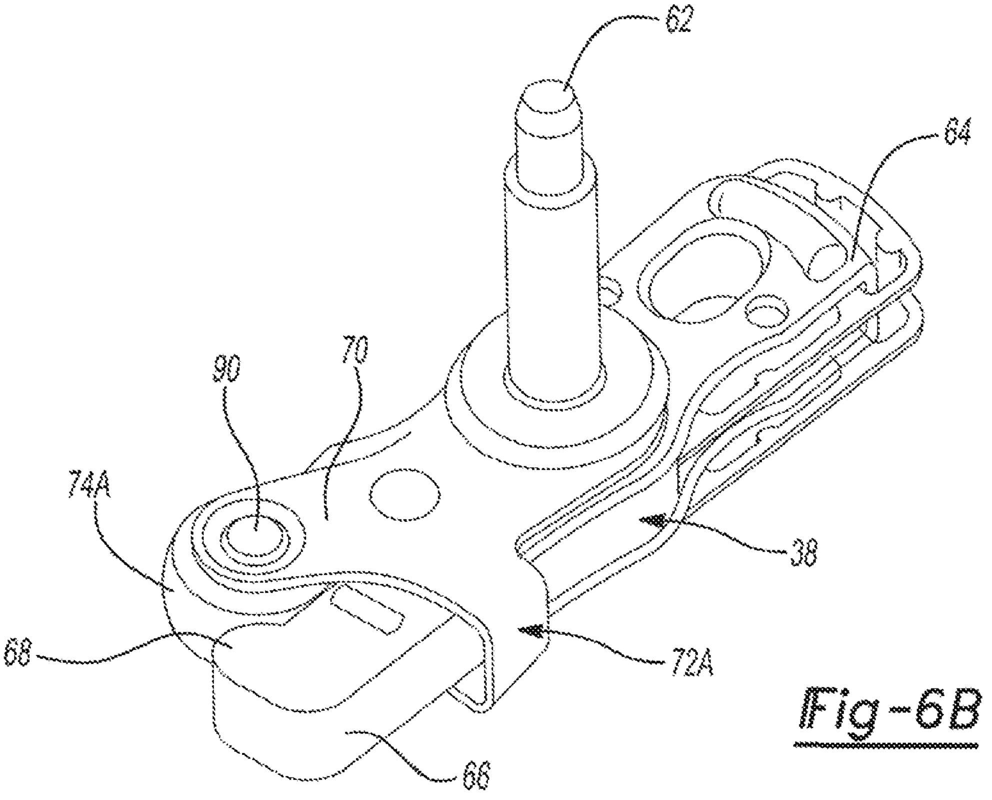

FIGS. 5A and 5B are provided to more clearly illustrate the engagement of a roller 74A associated with engagement device 40 between pawl engagement surface 68 on pawl 38 and primary latch notch 50 on ratchet 36 when ratchet 36 is held in its primary striker capture position by pawl 38 being positioned in its ratchet holding position. A lug 86 on first pawl leg segment 64 of pawl 38 is shown positioned within an arcuate guide slot 88 formed in latch plate 34 to provide guided pivotal movement of pawl 38. Lug 86 may engage an actuation mechanism, such as power release actuator 102 provided on an opposite side of latch plate 34 in accordance with an illustrative embodiment. FIGS. 6A and 6B better illustrate an alternative construction of pawl 38 and roller-type engagement unit 40. Note that in FIGS. 2-4, the roller member was a spherical ball 74 retained within cage 72. However, FIGS. 5 and 6 illustrate the roller member being a follower 74A mounted on a pivot post 90 extending from cage 72A.

Figure 7A:
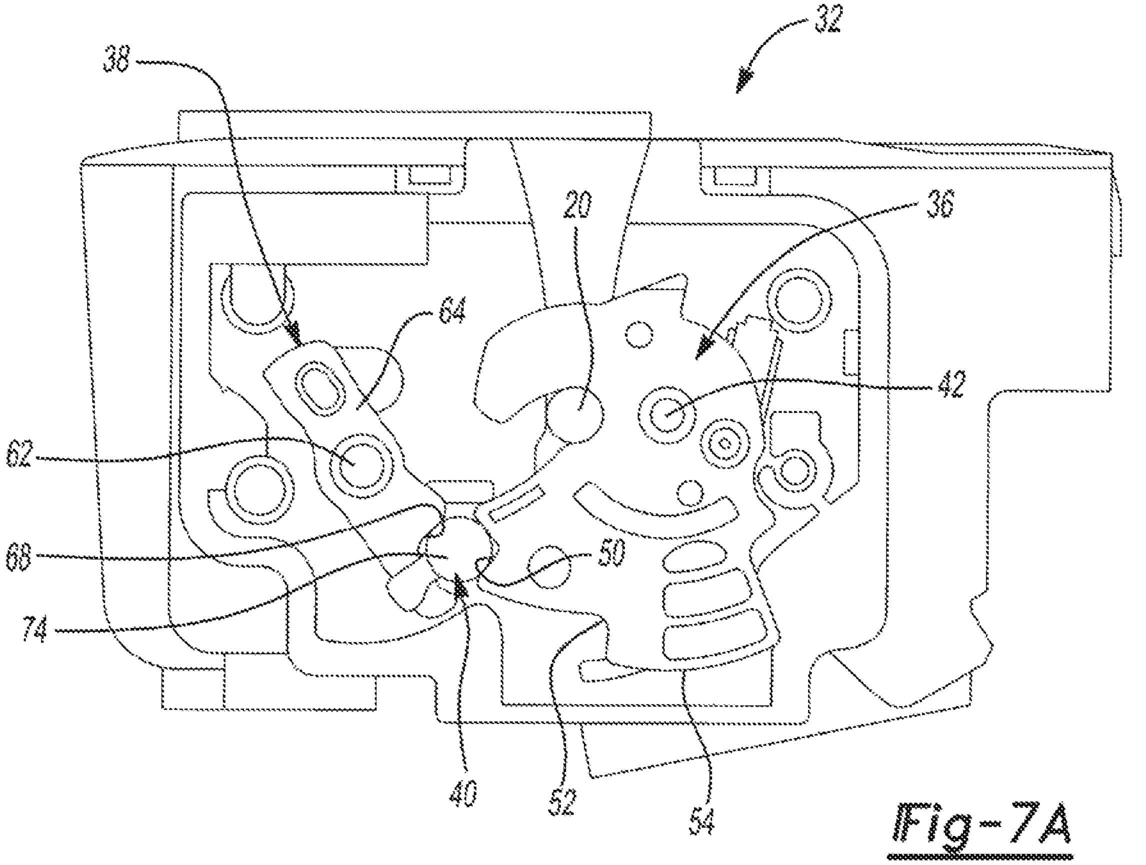
FIGS. 7A through 7H are a series of sequential plan views illustrating shifting of a roller-type latch mechanism from its primary closed state into its released state.
Figure 7B:
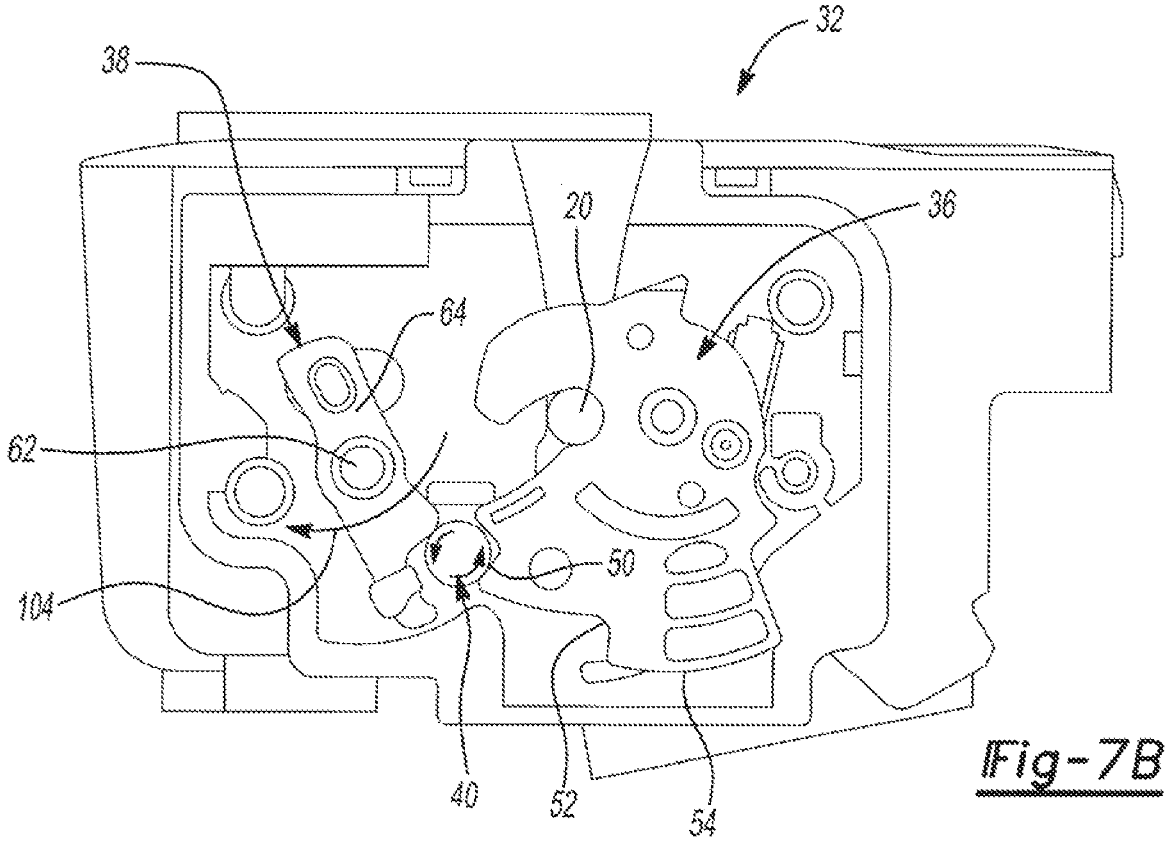
Figure 7C:
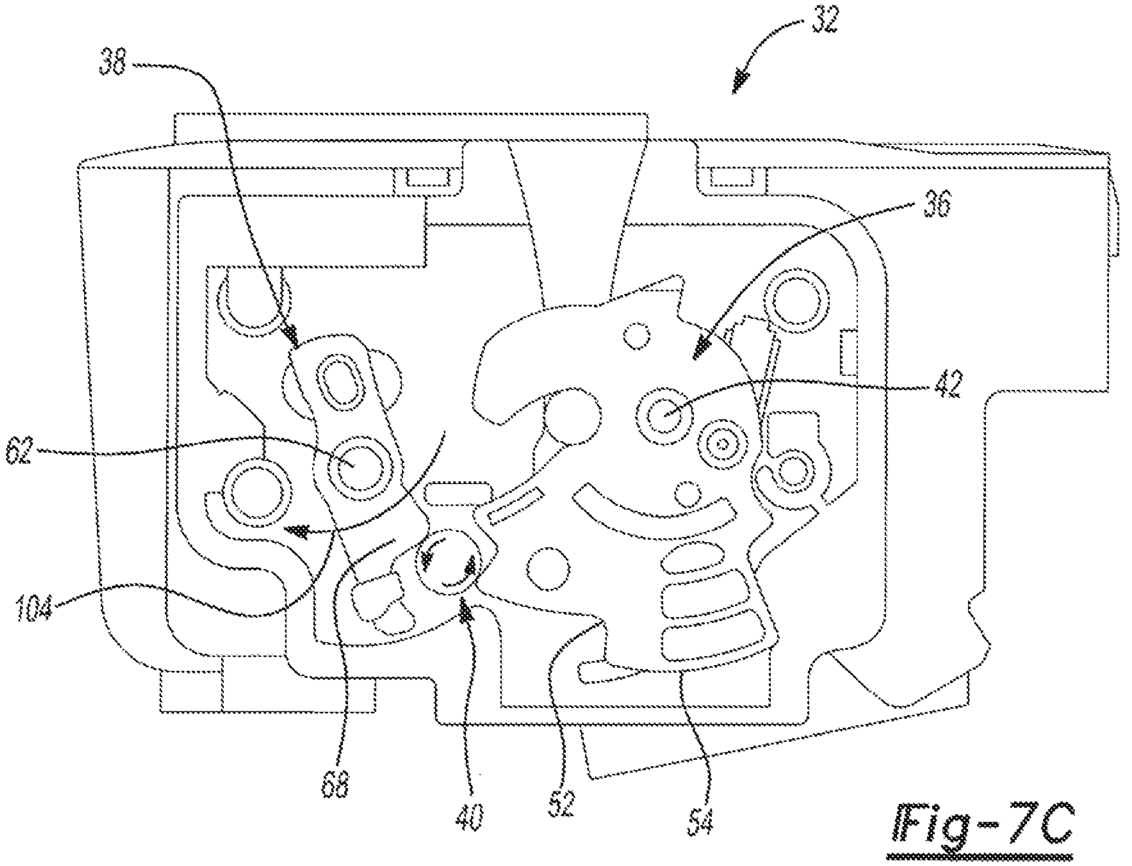
Figure 7D:
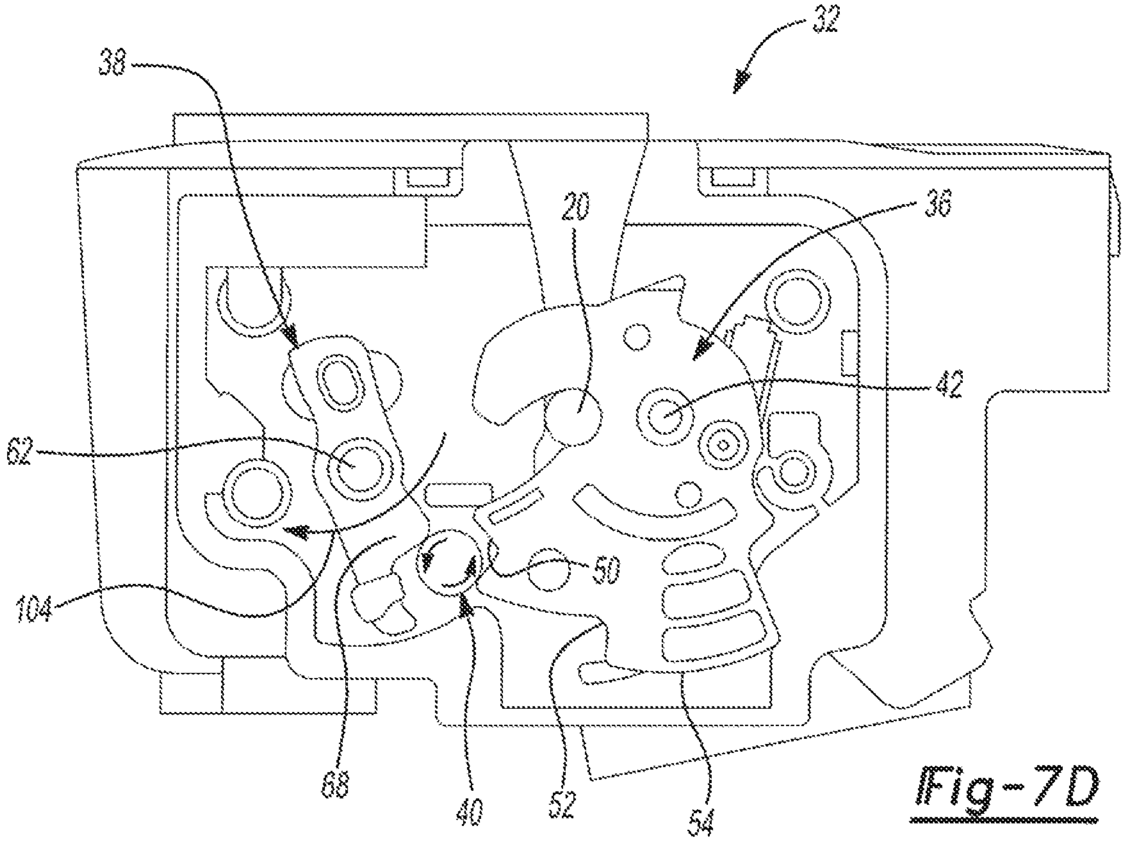
Figure 7E:
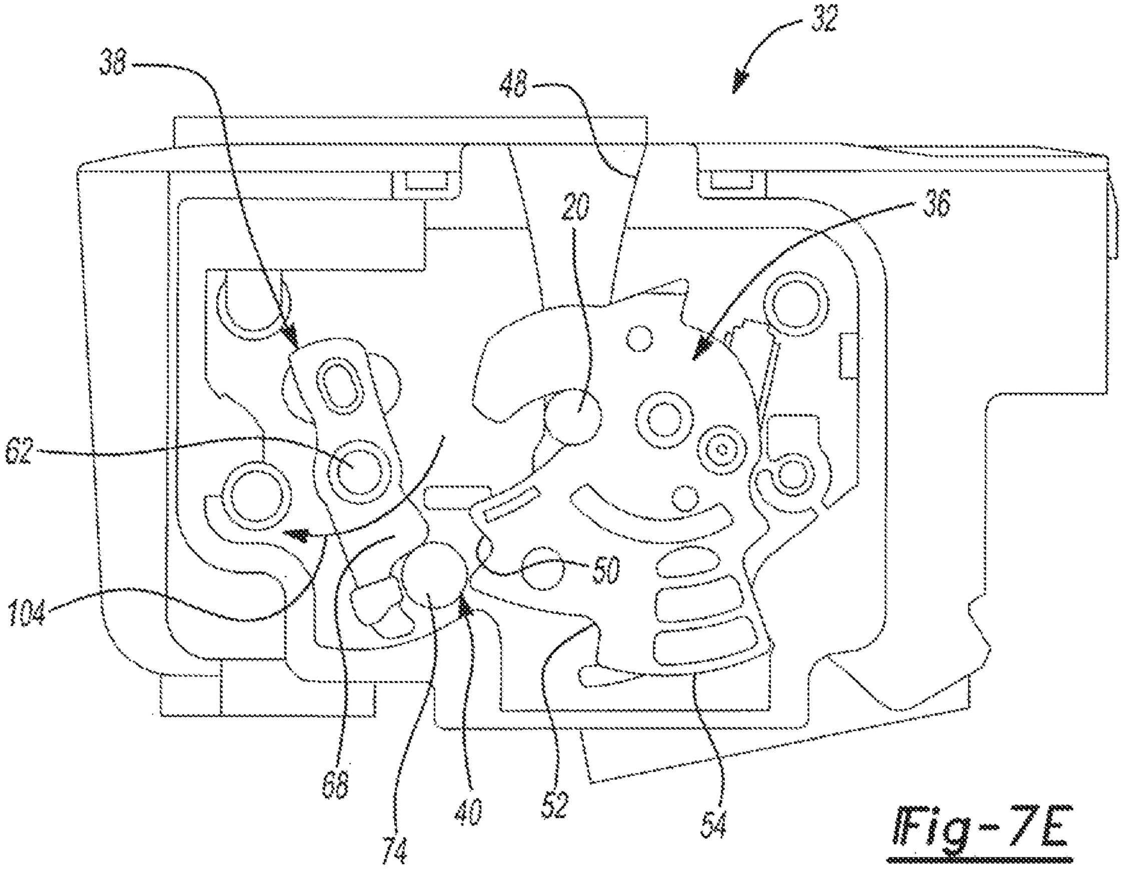
Figure 7F:
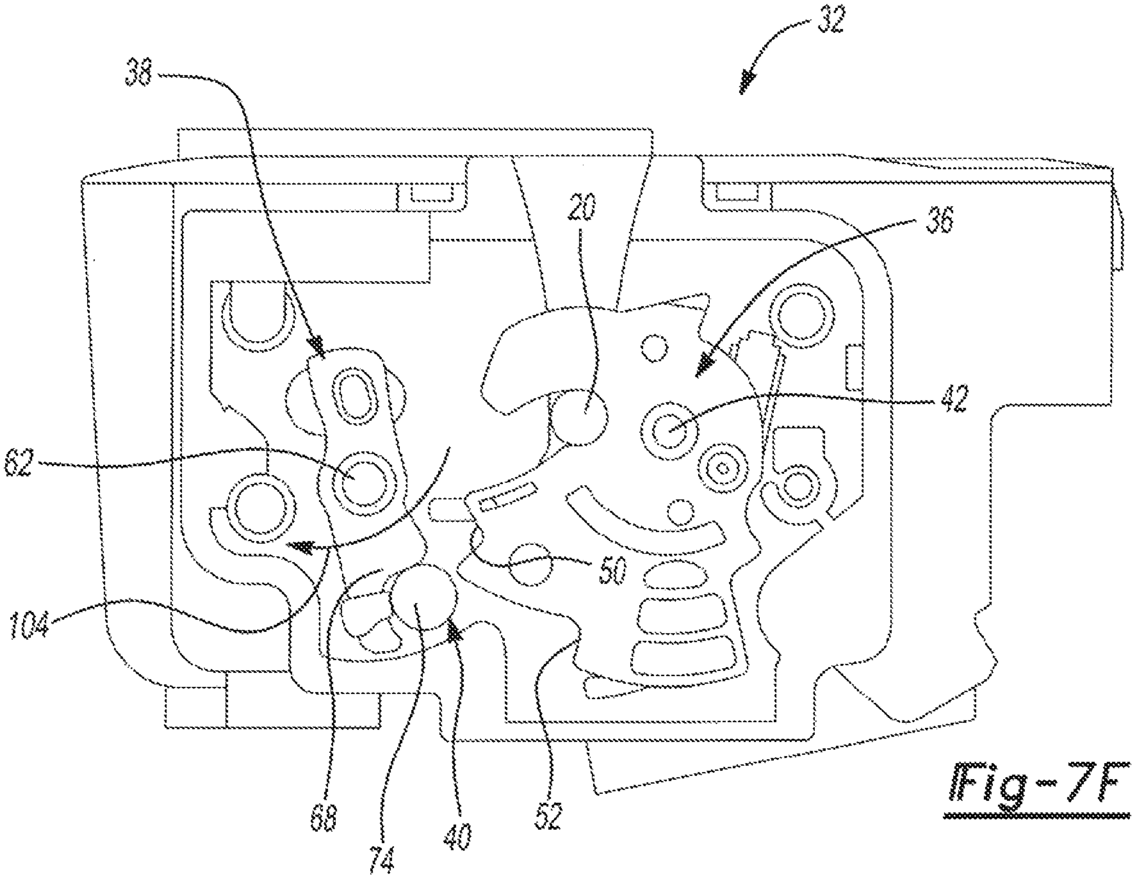
Figure 7G:
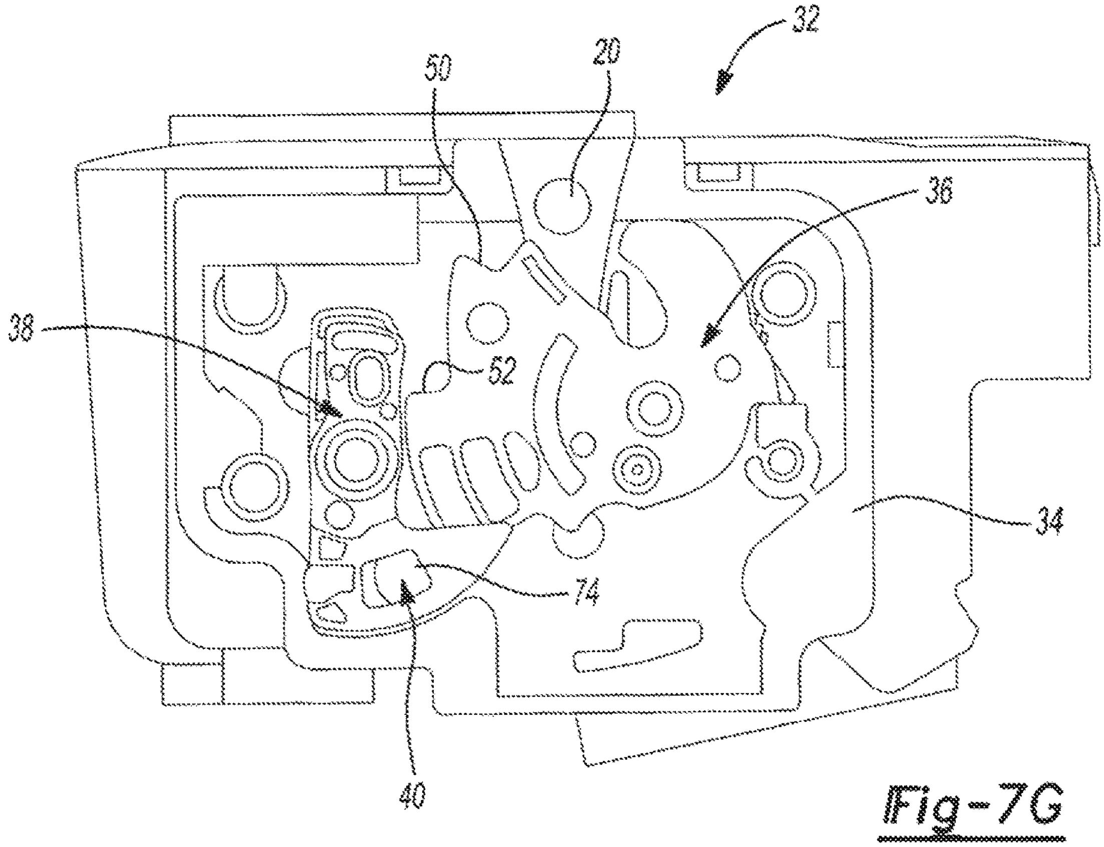
Figure 7H:
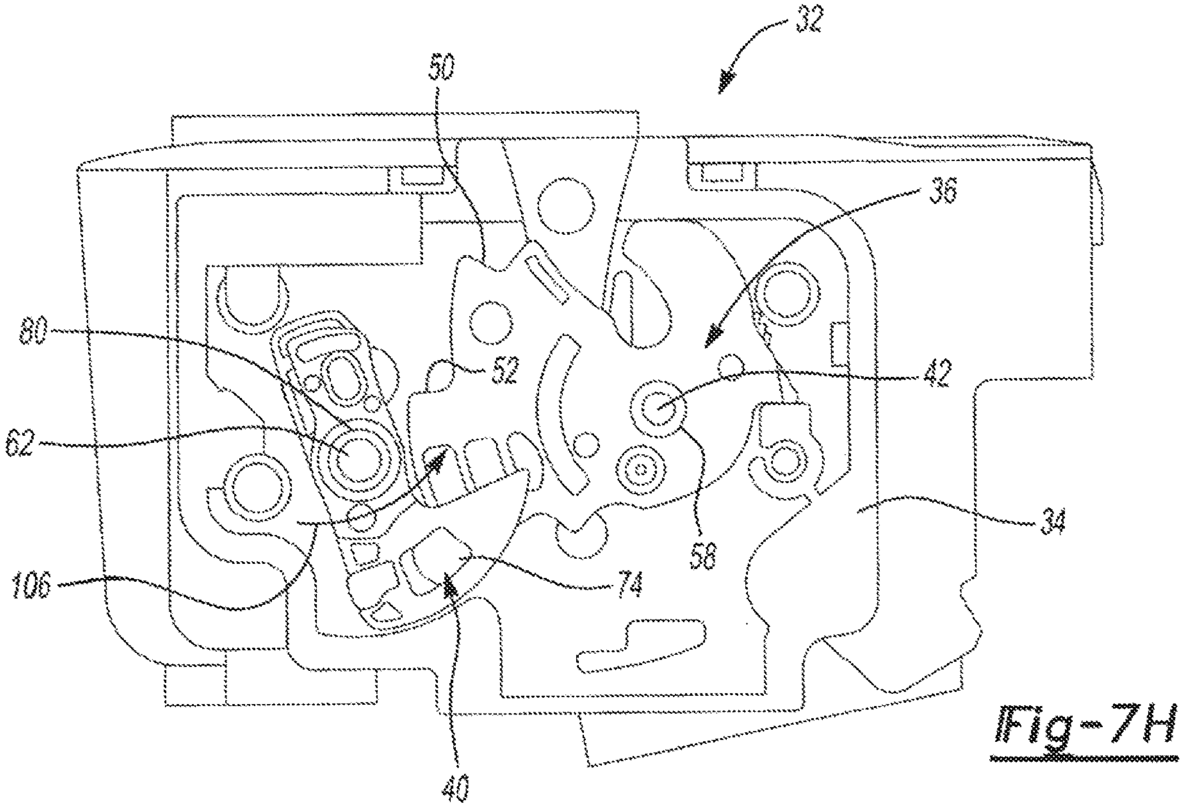

Referring now to FIGS. 7A through 7H, a sequential series of views are provided of latch mechanism 32 as it is shifted from its primary closed state (FIG. 7A) into its released state (FIG. 7H) in response to actuation of latch release mechanism 100 causing pawl 38 to pivot from its ratchet holding position into its ratchet releasing position. Arrow 104 (FIGS. 7B-7G) illustrates the force applied by latch release mechanism 100 to move pawl 38 in a ratchet releasing direction from its ratchet holding position into its ratchet releasing position. FIG. 7H illustrates, via arrow 106, rotation of pawl 38 in a ratchet engaging direction back toward its ratchet holding position due to the biasing of pawl spring 80 such that ball 74 engages cam edge 54 of ratchet 36 upon release of latch release mechanism 100.

Figure 8A:
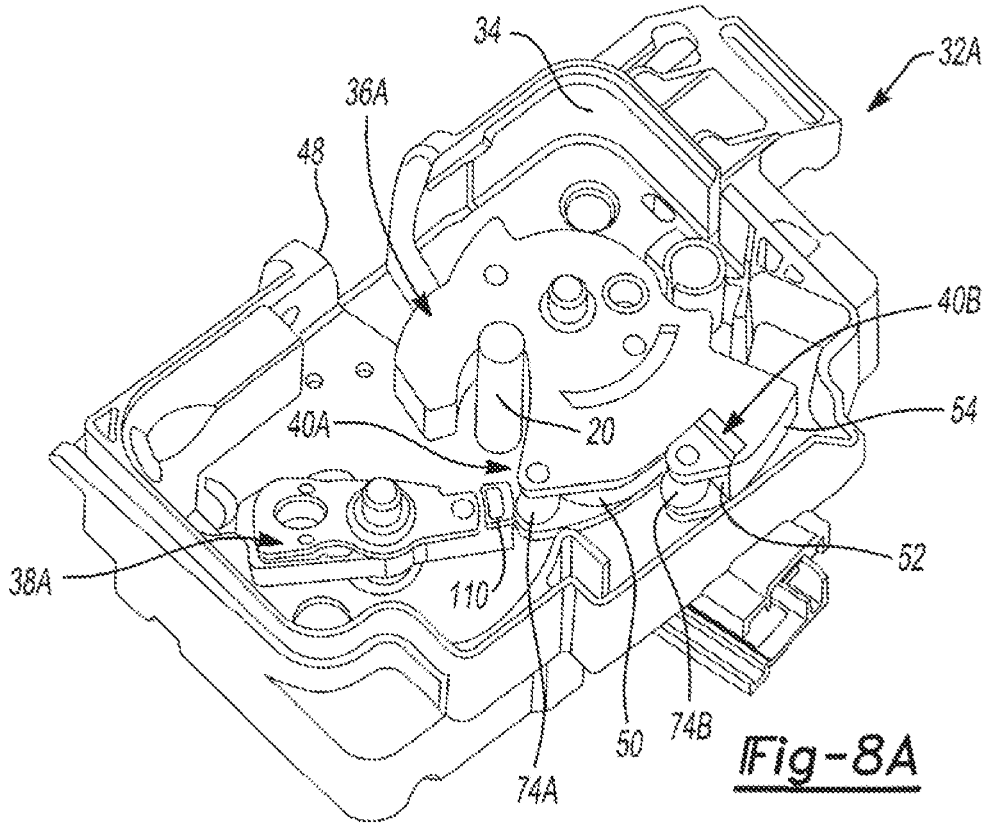
FIGS. 8A and 8B are views illustrating another yet alternative embodiment of the roller-type latch mechanism configured for use with the closure latch assembly.
Figure 8B:
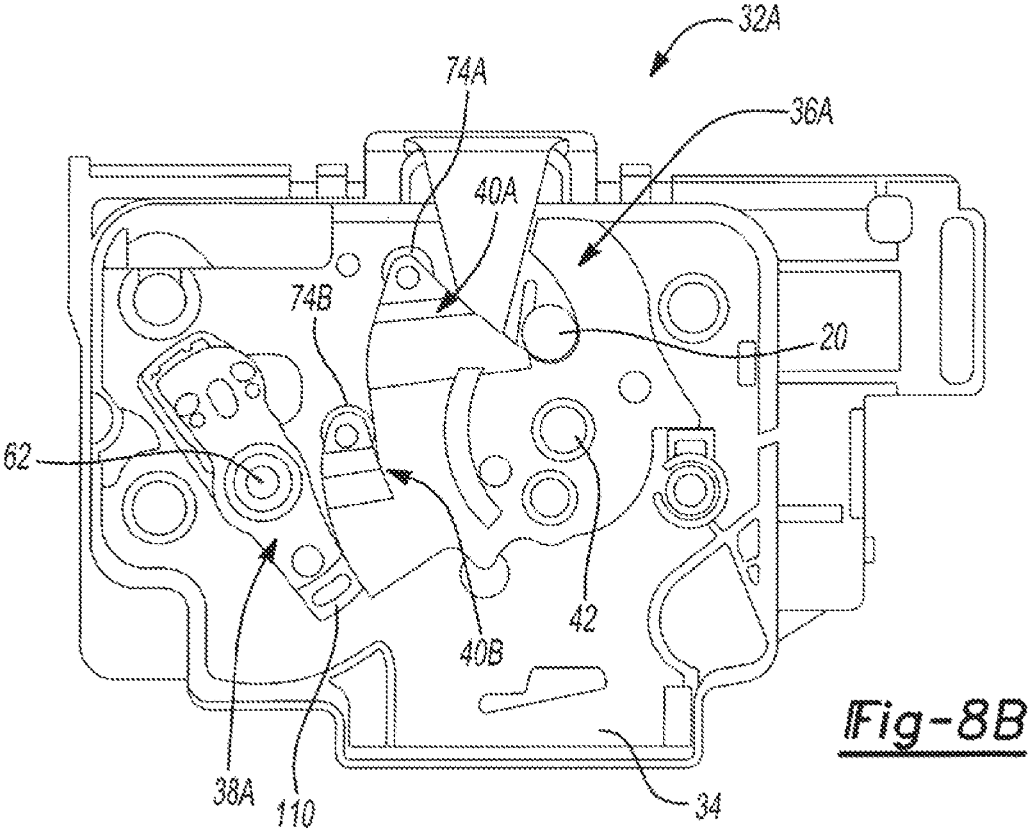

Referring now to FIGS. 8A and 8B, an alternative roller-type latch mechanism 32A is shown to have a primary roller-type engagement device 40A mounted on ratchet 36A adjacent to primary latch notch 50, a secondary roller-type engagement device 40B mounted on ratchet 36A adjacent to secondary latch notch 52, and a pawl 38A with an engagement end 110 adapted to latchingly engage roller 74A (associated with primary engagement device 40A) when ratchet 36A is located in its primary striker capture position and to latchingly engage roller 74B (associated with secondary engagement device 40B) when ratchet 36A is located in its secondary striker capture position. FIG. 8A illustrates pawl 38A located in its ratchet holding position while FIG. 8B illustrates pawl 38A located in its ratchet releasing position.

Figure 9:
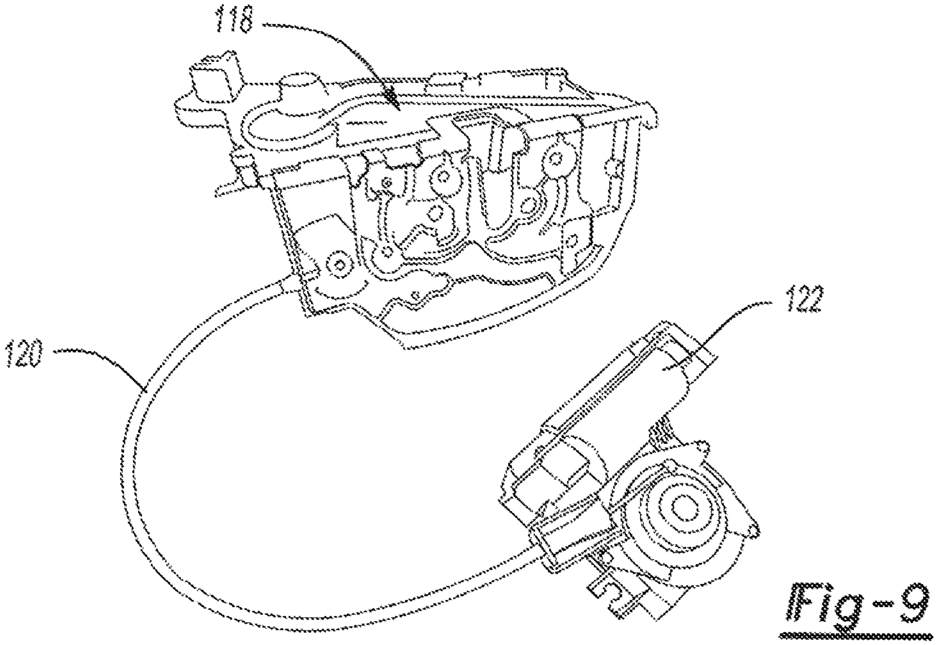
FIG. 9 is a isometric view of a closure latch assembly constructed according to the present disclosure to include a latch cinch mechanism which is shown interconnected to a power-operated cinch actuator via a cinch cable assembly.
Figure 10:
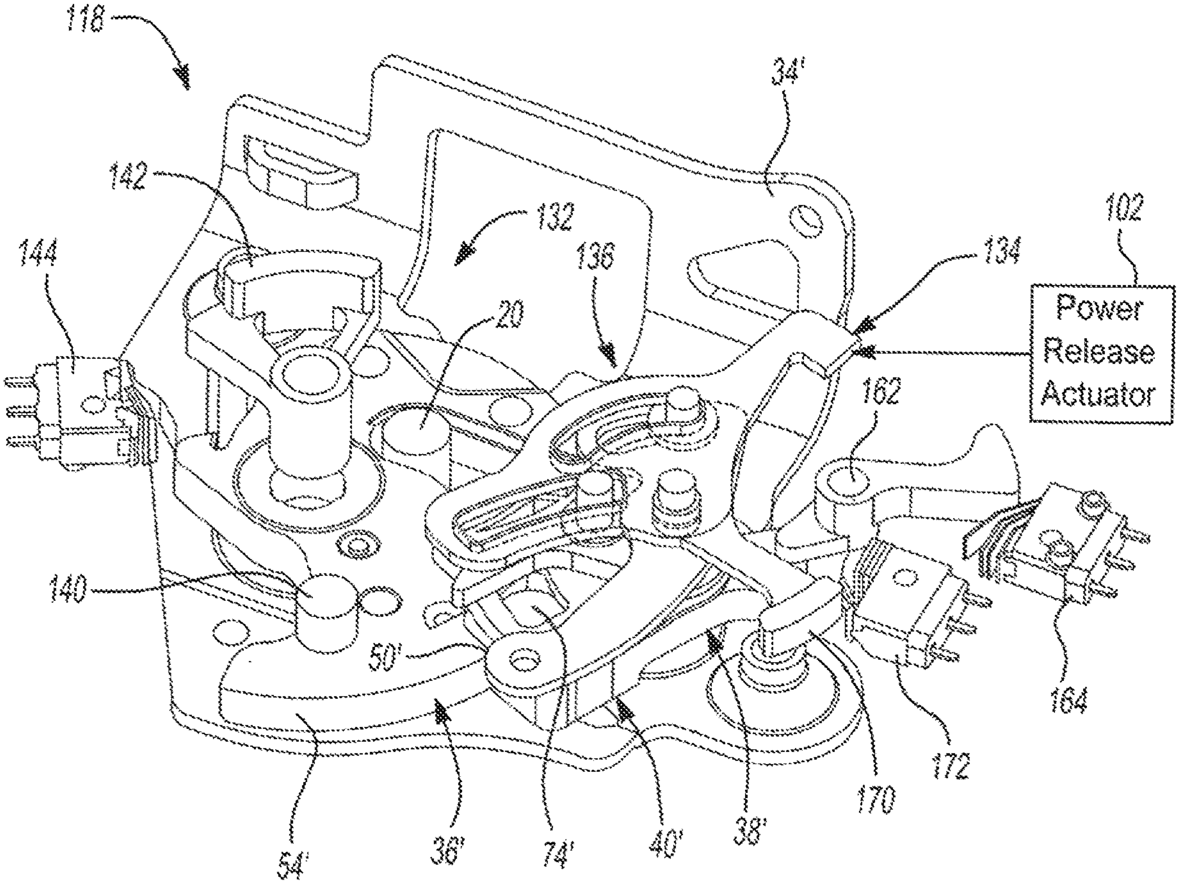
FIG. 10 is an isometric view of a strength module associated with the closure latch assembly shown in FIG. 9 illustrating a roller-type ratchet/pawl latch mechanism, a latch release mechanism, and a latch cinch mechanism operably arranged for providing unique operational functionality according to the present disclosure.

The roller-type single ratchet/pawl latch mechanisms disclosed above each provide reduced latch release efforts required to move the pawl from its ratchet holding position to its ratchet releasing position due to rolling (i.e. point-type) engagement compared to the otherwise conventional sliding friction engagement associated with non-roller type latch mechanisms. However, the requirement to provide both primary latching (door fully-closed) and secondary latching (door partially-closed) functionality requires increased packaging to accommodate the pawl travel and provide adequate latching surfaces on the ratchet. In addition, it would be desirable to provide a more compact configuration capable of also providing a power cinching feature. In this regard, FIG. 9 is a isometric view of a non-limiting sample embodiment of a closure latch assembly 118 operably interconnected via a cinch actuation mechanism 120, shown as a cinch cable assembly 120, to a power-operated cinch actuator 122. FIG. 9 illustrates the closure latch assembly 118 operably interconnected to a cinch cable assembly 120 which is operate to be driven e.g. pulled and/or pushed by a power cinch actuator 122. The closure latch assembly 118 and the power cinch actuator 122 are shown as being both installed e.g. mounted to an inner door shut face surface 123 and an inner panel 125, respectively, of door 16, within an inner cavity 119 of vehicle door 16, the inner cavity 119 defined by the inner panel 125 and an outer panel (not shown). FIG. 10 is an isometric view of a latch mechanism 132, a latch release mechanism 134, and a latch cinch mechanism 136 associated with a strength module incorporated in closure latch assembly 118 and which will be detailed hereinafter. FIG. 10 illustrates a revised version of the strength module shown in FIG. 4D and which is now equipped with enhanced functionality provided by the present disclosure. Specifically, latch cinch mechanism 136 is configured to hold latch mechanism 132 in its secondary closing state and to subsequently cause latch mechanism 132 to be transitioned from its secondary closing state to its primary closing state.

Figure 11:
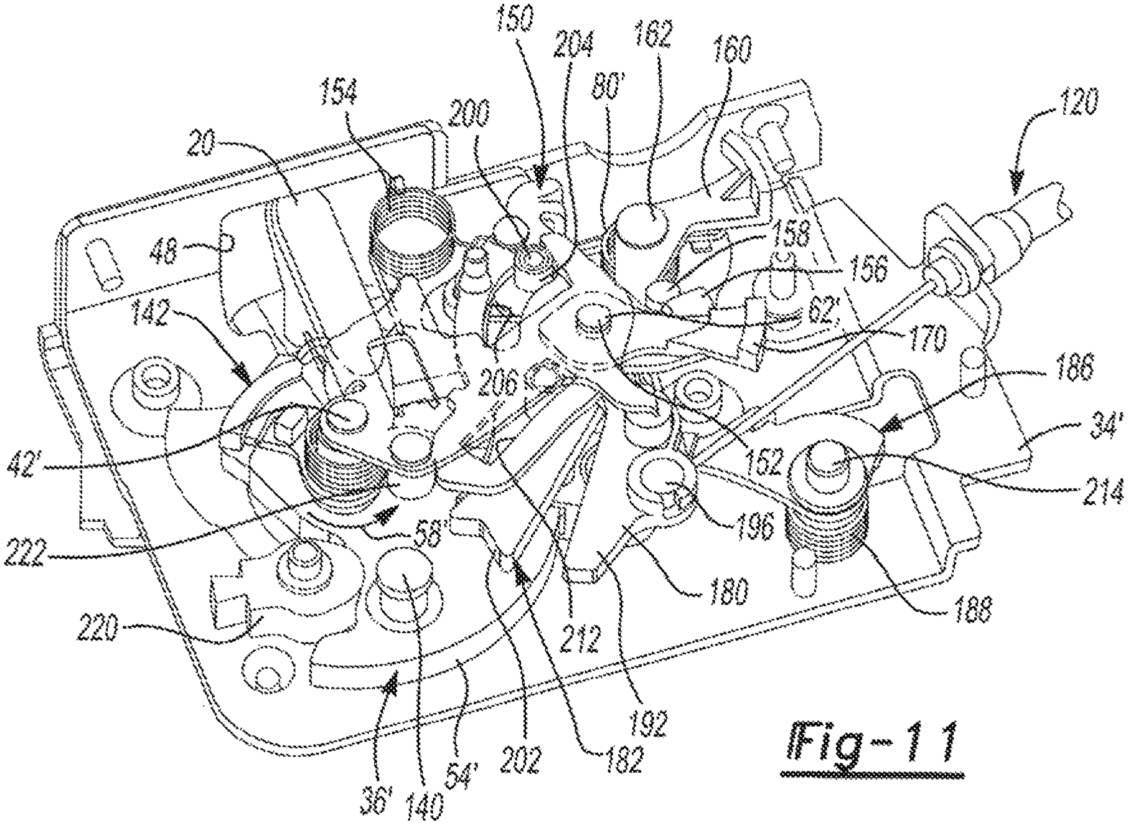
FIGS. 11 and 12 are additional isometric views of the strength module of FIG. 10 showing additional components and various operative connections therebetween.
Figure 12:
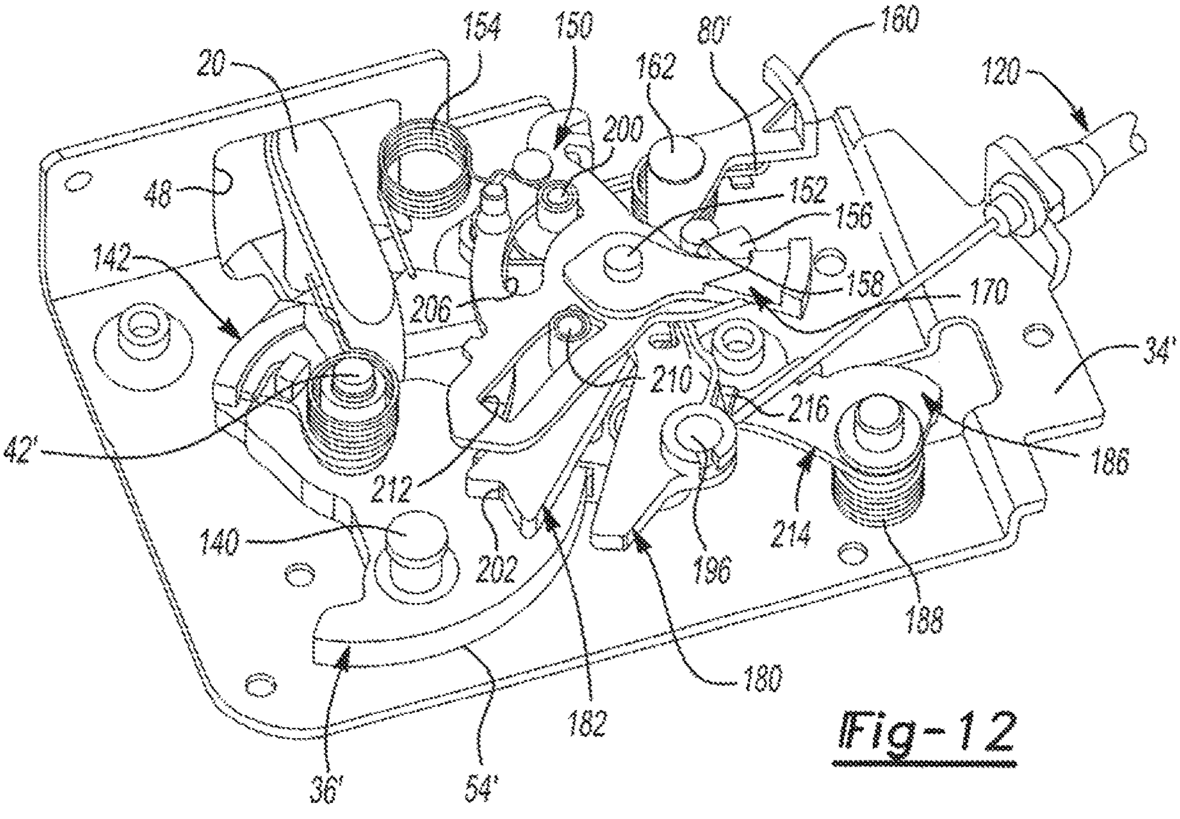

Referring initially to FIGS. 10-12, latch mechanism 132 is generally shown to include a configuration similar to latch mechanism 32 of FIGS. 2-4. To this end, latch mechanism 132 includes a ratchet 36' supported from a frame plate 34' for rotational movement about a ratchet pivot post 42', a pawl 38' supported from frame plate 34' for pivotal movement about a pawl pivot post 62', and a roller-type engagement device 40' having a cage 72' secured to pawl 38' and ball bearing 74' retained within cage 72'. However, in this particular embodiment, ratchet 36' only includes a single latch feature, configured as a primary latch notch 50', and an elongated edge profile 54'. As will be detailed, latch cinch mechanism 136 is configured to engage a ratchet engagement feature or member, such as a ratchet post 140, extending from ratchet 36' when ratchet 36' is moved by striker 20 from its striker release position into its secondary striker capture position and to mechanically hold ratchet 36' in its secondary striker capture position while pawl 38' is maintained in its ratchet releasing position with ball bearing 74' engaging elongated cam profile 54'. Thus the secondary latch notch has been eliminated, thus simplifying the ratchet 36' profile, since pawl 38' is no longer used to hold ratchet 36' in its secondary striker capture position. Ratchet switch lever 142 is mounted to ratchet 36' about ratchet pivot post 42' and works in cooperation with ratchet position sensor 144 to provide a "door open" signal when ratchet 36' moves to its striker release position. As is well known, the door open signal is used by the latch controller unit (ECU) to control initial actuation and subsequent resetting of power release actuator 102 and latch release mechanism 134. Ratchet biasing member 58' is again indicated by a directional arrow to illustrate normal biasing of ratchet 36' toward its striker release position.

As before, ratchet 36' is still rotatable between its three distinct positions including its striker release position, its secondary striker capture position, and its primary striker capture position. Likewise, pawl 38' is still pivotal about pawl pivot post 62' between its ratchet holding position and its ratchet releasing position. In this embodiment, however, elongated cam profile 54' on ratchet 36' holds pawl 38' in its ratchet releasing position when ratchet 36' is located in both of its striker release position and its secondary striker capture position. As such, pawl 38' is only permitted to move into its ratchet holding position when ratchet 36' is moved into its primary striker capture position whereat ball bearing 74' engages surface 68' on pawl 38' and primary latch notch 50' on ratchet 36'. A pawl biasing member 80' is provided for normally biasing pawl 36' toward its ratchet holding position.

Latch release mechanism 134 includes a release lever 150 supported about a release lever pivot post 152 for movement between a non-actuated position and an actuated position, and a release lever biasing spring 154 operable to normally bias release lever 150 toward its non-actuated position. Release lever pivot post 152 is shown in this non-limiting embodiment to be aligned with and/or integrally associated with pawl pivot post 62'. A release lever lug 156 formed on release lever 150 engages a pawl lug 158 formed on first pawl leg segment 64' of pawl 36'. As such, movement of release lever 150 from its non-actuated position into its actuated position causes pawl 38' to move from its ratchet holding position to its ratchet releasing position. As before, a power release actuator 102 (schematically shown in FIG. 10) is provided for moving release lever 150 from is non-actuated position into its actuated position when the ECU is signaled to shift latch mechanism 132 from one of its closed operating states into its released operating state. A pawl switch lever 160 is pivotal about pivot post 162 and is used in conjunction with a pawl position sensor 164 (FIG. 10) to detect when pawl 38' is located in its ratchet holding position which is also indicative of ratchet 36' being located in its primary striker capture position so as to indicate door 16 being located in its fully-closed position. Pawl switch lever 160 has a leg portion 166 (FIG. 13) engaging pawl lug 158 such that movement of pawl switch lever 160 in response to movement of pawl 38' to its ratchet holding position actuates pawl position sensor 164.

Latch cinch mechanism 136 is operably connected via cinch cable assembly 120 to power cinch actuator 122 (FIG. 9) for driving ratchet 36' from its secondary striker capture position into its primary striker capture position. A cinch switch lever 170 associated with latch cinch mechanism 136 is arranged to actuate a cinch sensor 172 (FIG. 10) when ratchet 36' is located in its secondary striker capture position so as to cause the ECU to actuate power cinch actuator 122 and initiate the power cinching function. Note also that pawl switch lever 160 is used to recognize when ratchet 36' is located in its primary striker capture position to cause the ECU to de-actuate power cinch actuator 122 and complete the power cinching function.

Generally speaking, latch cinch mechanism 136 includes, in this non-limiting embodiment, a cinch lever 180, a cinch link 182, a cinch link biasing member 184 shown in the figures as a cinch link spring 184, an auxiliary cinch lever 186, and an auxiliary cinch lever spring 188. Cinch lever 180 is mounted for pivotal movement about a pivot axis, such as release lever pivot post 152, and is configured to include a first cinch lever leg 190 and a second cinch lever leg 192 disposed on opposite sides of a cinch lever pivot segment 193. Illustratively, the release lever 150 and cinch lever 180 are shown positioned adjacent to the ratchet 36' within distinct planes in an overlapping compact configuration. A lost motion slot 194 is formed in first cinch lever leg 190. The lost motion slot 194 is dimensioned to allow pre-travel for the cinch lever 180 that is attached by cinch cable 120 to the power-operated cinch actuator 122. The dimensional and positional tolerances of cinch cable 120, for example a Bowden cable length tolerance, as well as the power-operated cinch actuator 122 and latch Bowden cable attachment tolerances are compensated by the lost motion slot 194 to avoid the cinch link 182 from being preloaded by the cinch lever 180 which may modify the nominal latched secondary position, i.e. the rotational position of the ratchet 36' at which the ratchet post 140 moves into engagement with a side edge surface of cinch link 182, as will be described in more detail herein below.

Figure 13:
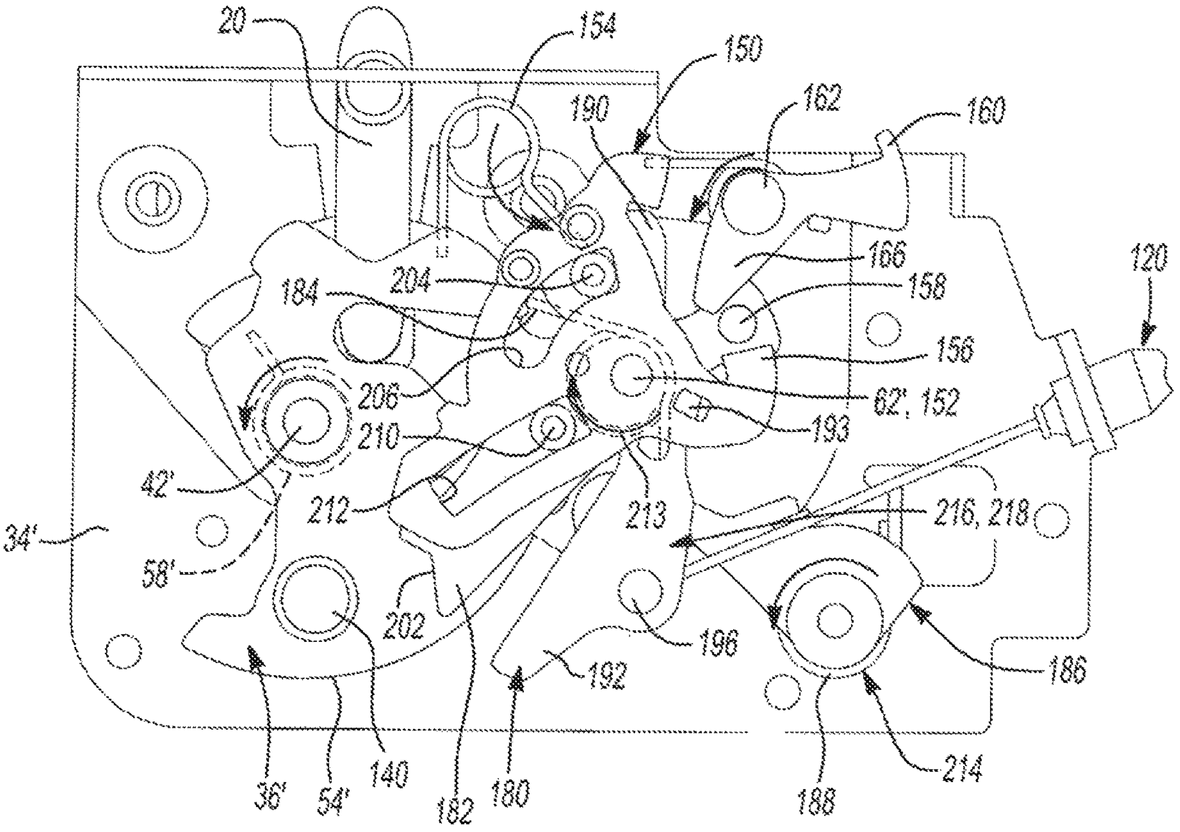
FIGS. 13 through 17 are views of the strength module shown in FIGS. 10-12 now illustrating the orientation and positioning of the various components with the latch mechanism operating in a primary closed state, the latch release mechanism operating in a non-actuated state, and the latch cinch mechanism operating in a rest state.
Figure 14:
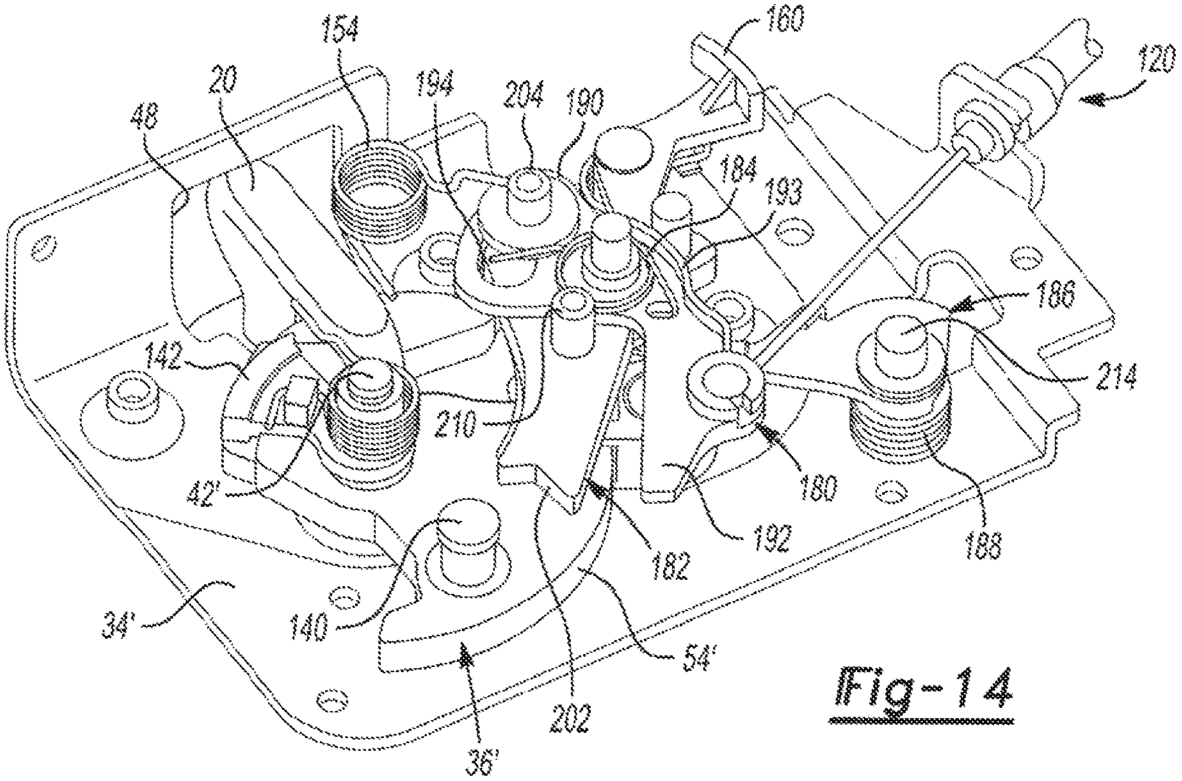
Figure 15:
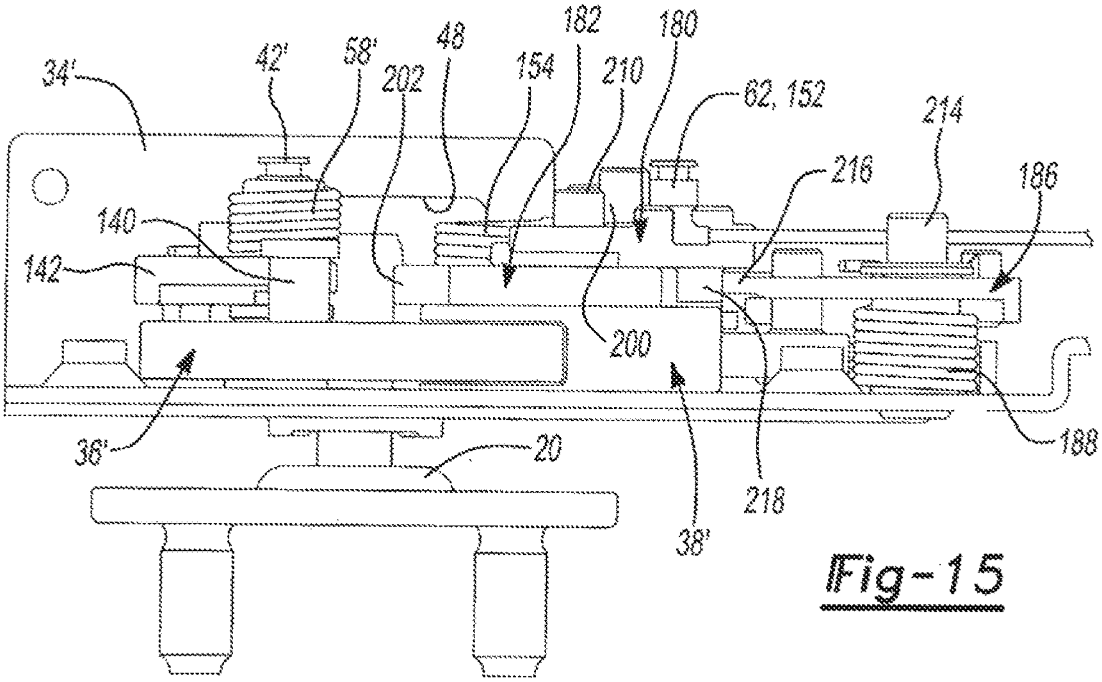

Second cinch lever leg 192 is shown connected via a ferrule 196 to a first end of a cable associated with cinch cable assembly 120. Cinch link 182 is an elongated member having a cinch link pivot 200 at a first end and a cinch link engagement feature or member, hereinafter referred to as drive notch 202, formed at a second end. Cinch link pivot 200 has a first drive pin segment (not shown) extending into and guided within lost motion slot 194 on first cinch lever leg 190 of cinch lever 180. A second drive pin segment 204 of cinch link pivot 200 extends through and is guided within a first drive slot 206 formed in release lever 150. A cinch link rivet 210 extending outwardly from cinch link 182 is retained within a second drive slot 212 formed in release lever 150. Cinch link spring 184 surround pivot post 152 and has its opposite end segments engaged with cinch lever 180 and cinch link 182. Cinch link spring 184 is arranged to normally bias cinch link 182 and cinch lever 180 in the direction shown by arrow 213 (FIG. 13). Auxiliary cinch lever 186 is pivotable about an auxiliary cinch lever pivot 214 and has an end lug segment 216 engaging a cam lug 218 (FIG. 15) formed on cinch lever 180. Auxiliary cinch lever spring 188 acts to normally bias end lug segment 216 into continuous engagement with cam lug 218.

Referring now to FIGS. 13 through 17, latch mechanism 132 is shown operating in a primary closed state, latch release mechanism 134 is shown operating in a non-actuated state, and latch cinch mechanism 136 is shown operating in a rest state. As such, door 16 is held in its fully-closed position with striker 20 retained in striker cavity 46 of ratchet 36' as ratchet 36' is held in its primary striker capture position by pawl 38' being located in its ratchet holding position via engagement of ball 74' between pawl engagement surface 68 on pawl 38' and primary latch notch 50 on ratchet 36'. With latch cinch mechanism 136 operating in its rest state, cinch lever 180 is located in a rest position and is operable for locating cinch link 182 in a rest position. With cinch link 182 located in its rest position, drive notch 202 is aligned with, but displaced from engagement with ratchet post 140. Since latch release mechanism 134 is operating in its non-actuated state, release lever 150 is shown located in its non-actuated position. FIG. 11 shows an overslam bumper 220 engaging ratchet 36' in its primary striker capture position and a release lever rest bumper 222 engaging release lever 150 in its non-actuated position.

Figure 18A:
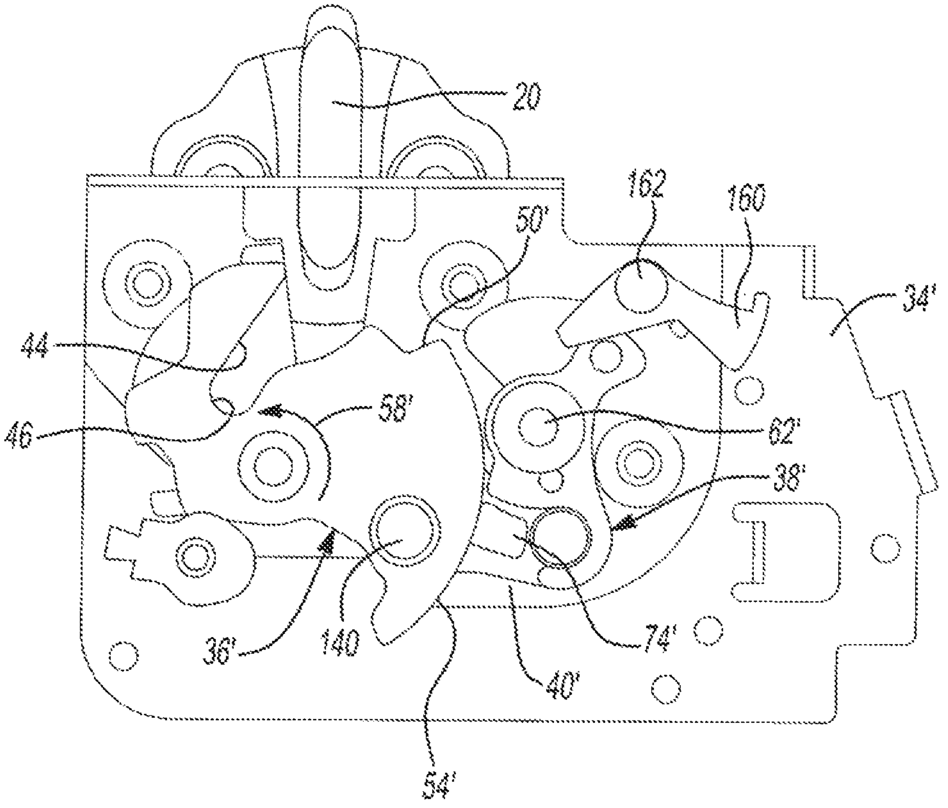
FIGS. 18A and 18B are plan views illustrating the orientation and positioning of components with the latch mechanism now operating in a released state, the latch release mechanism maintained in its non-actuated state, and the latch cinch mechanism now operating in a stand-by state.
Figure 18B:
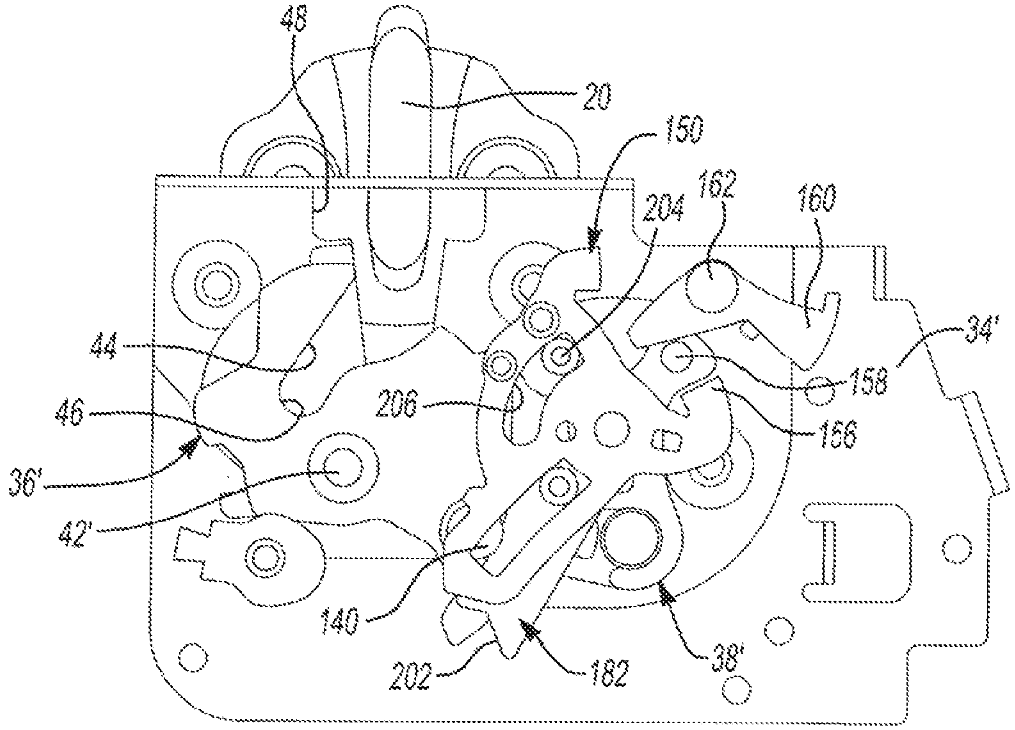

In contrast to latch mechanism 132 operating in its primary closed state (FIGS. 13-17), FIGS. 18A and 18B now illustrate latch mechanism 132 operating in a released state, latch release mechanism 134 operating in an actuated state, and latch cinch mechanism 136 operating in a stand-by state when door 16 has been opened and striker 20 is released from ratchet 36', which is now shown located in its striker release position. As seen, ball 74' engages edge cam surface 54' on ratchet 36' such that pawl 38' is held in its ratchet releasing position while release lever 150 is shown rotated to its actuated position. Such rotation of ratchet 36' to its striker release position, under the biasing applied thereto by ratchet spring 58', results in ratchet post 140 moving into engagement with a side edge surface of cinch link 182. As is understood, movement of release lever 150 from its non-actuated position into its actuated position causes pawl 36' to move from its ratchet holding position (FIG. 17) to its ratchet releasing position (FIG. 18A) which, in turn, allows ratchet spring 58' to drive ratchet 36' to its striker release position. Release lever 150 is subsequently returned to its non-actuated position following completion of the power release operation.

Figure 19A:
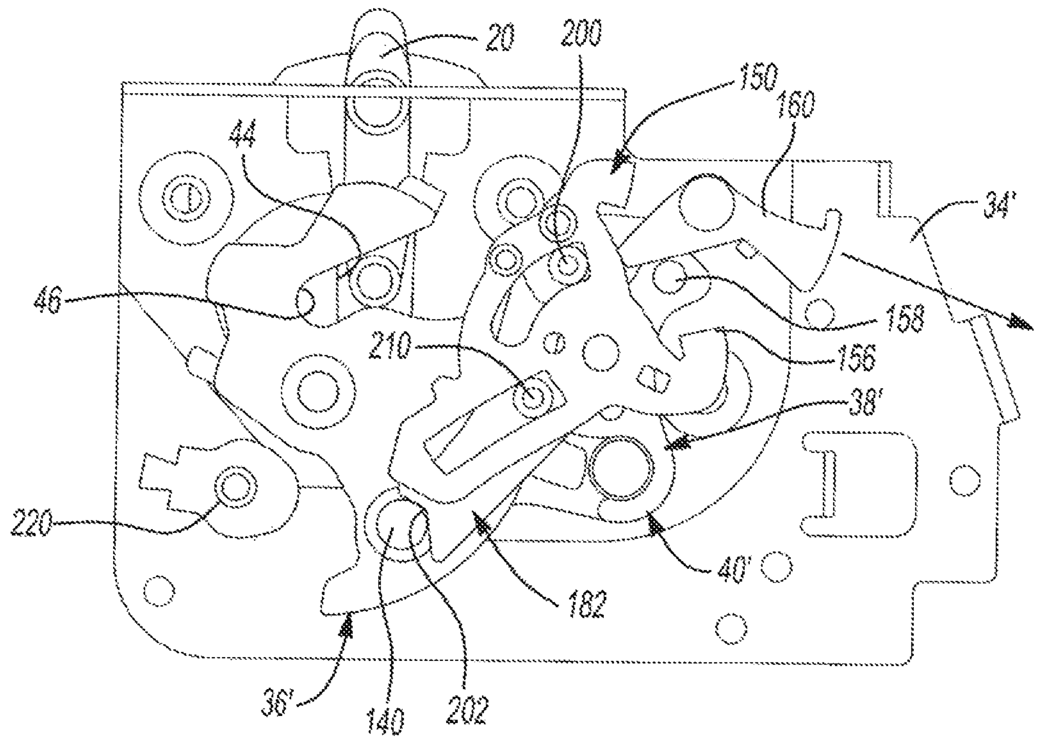
FIGS. 19A and 19B are plan views illustrating the orientation and positioning of components when the latch mechanism is shifted from its released state into an initial or secondary closed state and the latch cinch mechanism is shifted from its stand-by state into an engaged state.
Figure 19B:
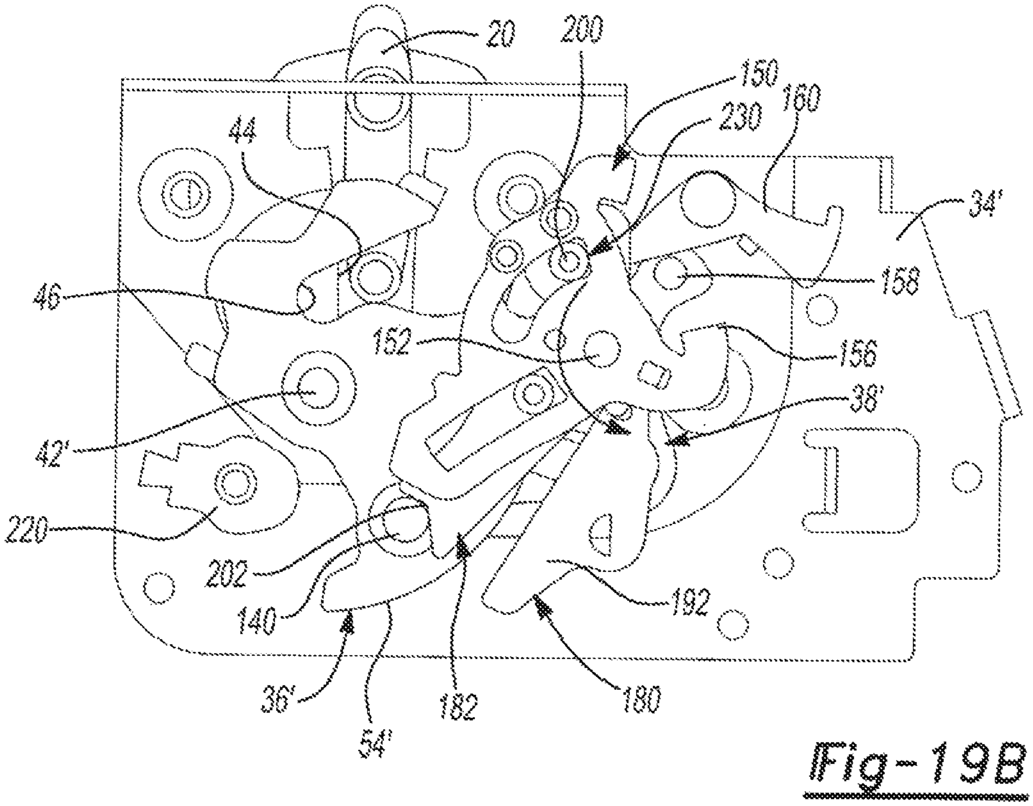

FIGS. 19A and 19B illustrate latch mechanism 132 shifted from its released state (FIGS. 18A and 18B) into its secondary closed state in response to door 16 being partially-closed (i.e. a soft close event) and also illustrate latch cinch mechanism 136 shifted from its stand-by state into an engaged state. Specifically, rotation of ratchet 36' from its striker release position into its secondary striker capture position causes cinch link 182 to pivot from its rest position into an engaged position such that drive notch 202 on cinch link 182 moves into engagement with ratchet post 140 on ratchet 36' and thereafter acts to mechanically hold ratchet 36' in its secondary striker capture position. Note that pawl 38' is retained in its ratchet releasing position by ball 74' continuing to engage cam edge 54' of ratchet 36'. Additionally, first drive pin segment of cinch link pivot 200 engages an end segment of lost motion slot 194 formed in cinch lever 180, as is indicated by arrow 230. In this position, cinch lever switch 170 actuates cinch position sensor 172 and sends a signal to the ECU that is used to initiate actuation of power cinch actuator 122. By having the secondary striker capture position of the ratchet 36' maintained by a dedicated lever (i.e. release lever 150), the blind spot problems associated with the cinch function can be overcome. Since the single cinch sensor 172 monitoring the cinch switch lever 170 associated with the release lever 150 (which does not change its position between secondary striker capture position and primary striker capture position of the ratchet 36') is used to determine when the power-operated cinch actuator 122 needs to be activated (i.e. when the ratchet 36' is in the secondary striker capture position), the reliance on the combination of a ratchet position and a pawl position switches, or additional switches, is not necessary, and the cinch malfunctions due to blind spots may be avoided.

Figure 16:
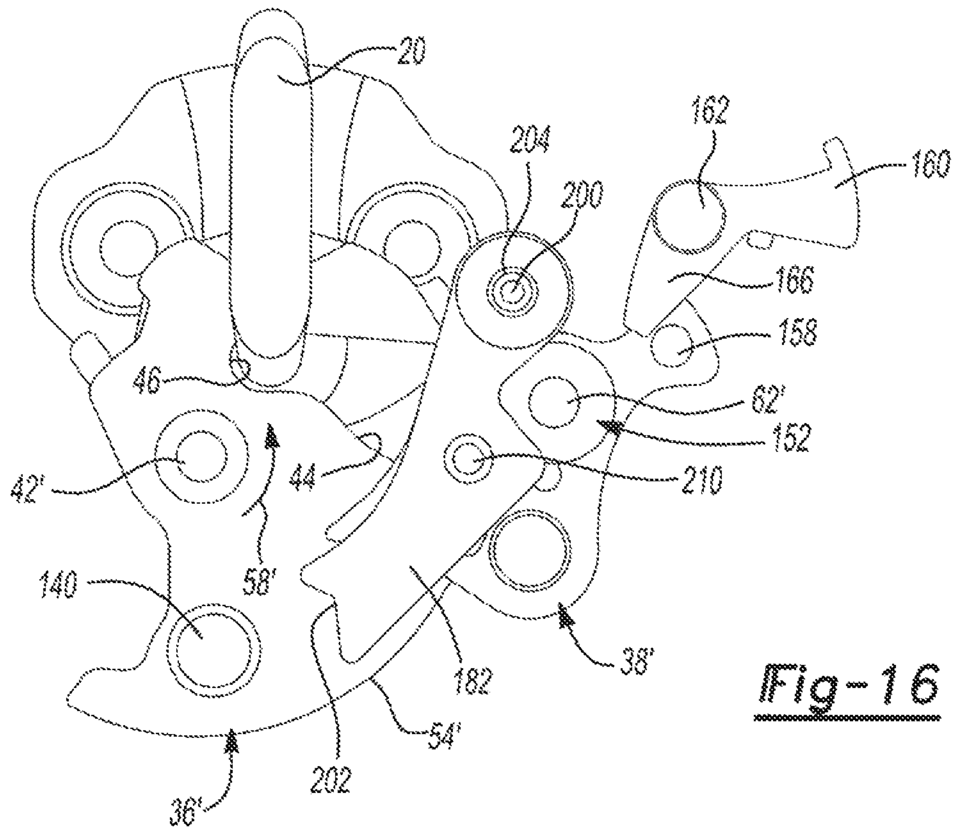
Figure 17:
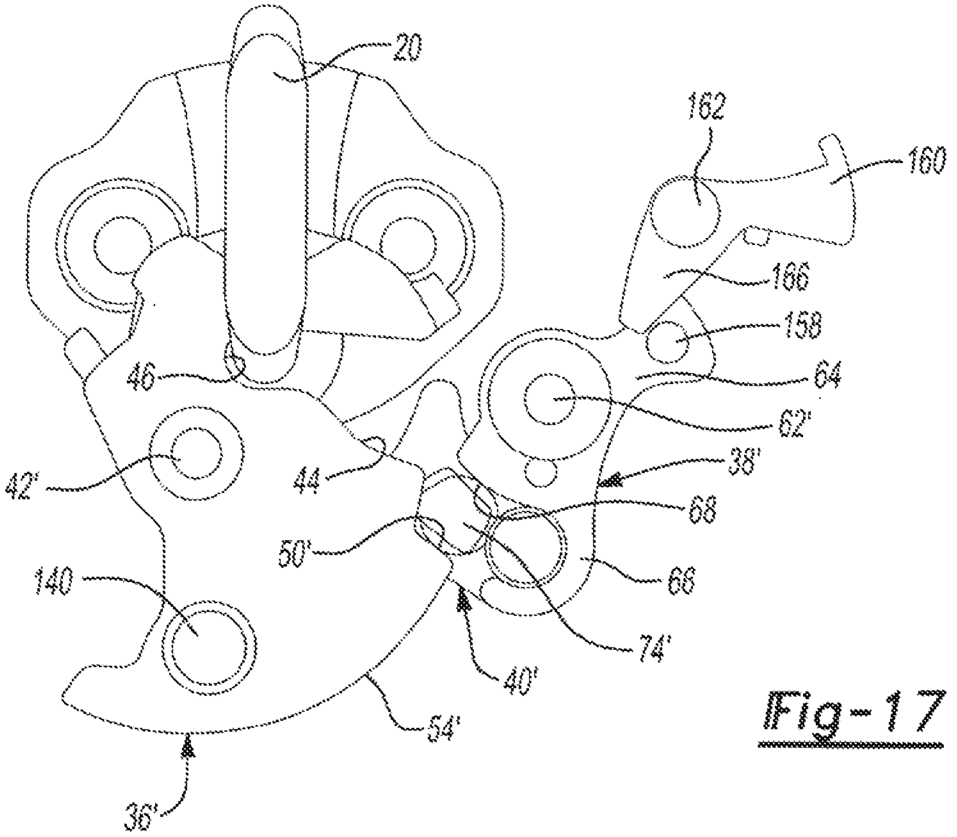
Figure 20A:
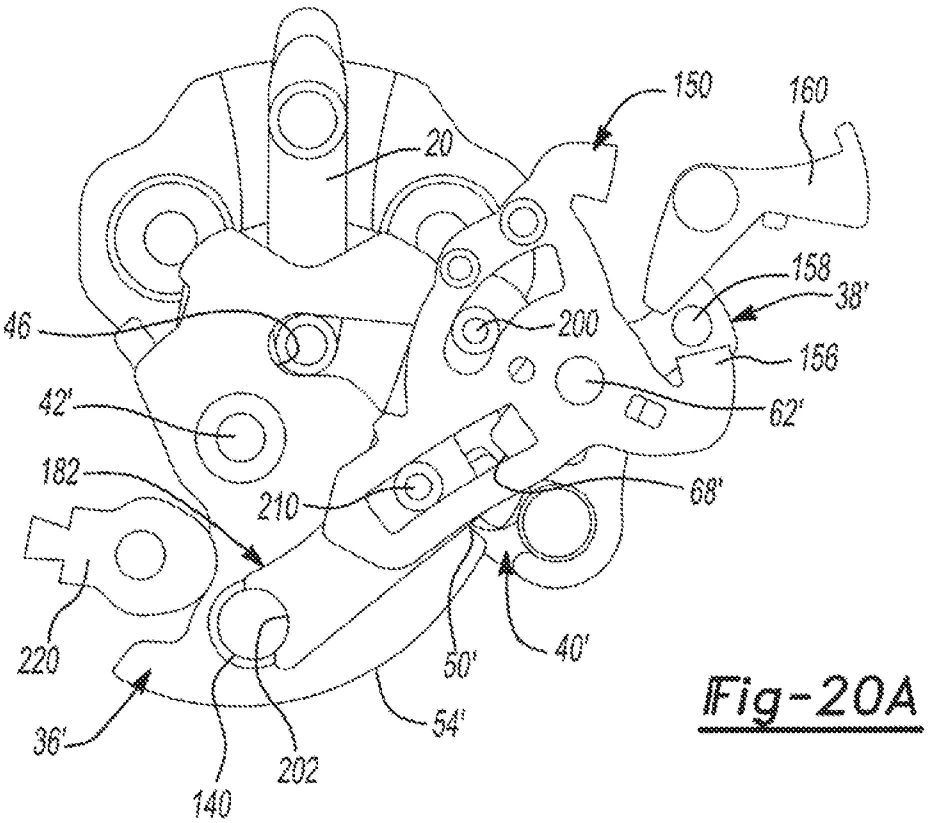
FIGS. 20A and 20B are additional plan views illustrating actuation of the power-operated cinch actuator for shifting the latch mechanism from its secondary closed state into its primary closed state while the latch cinch mechanism is maintained in its engaged state.
Figure 20B:
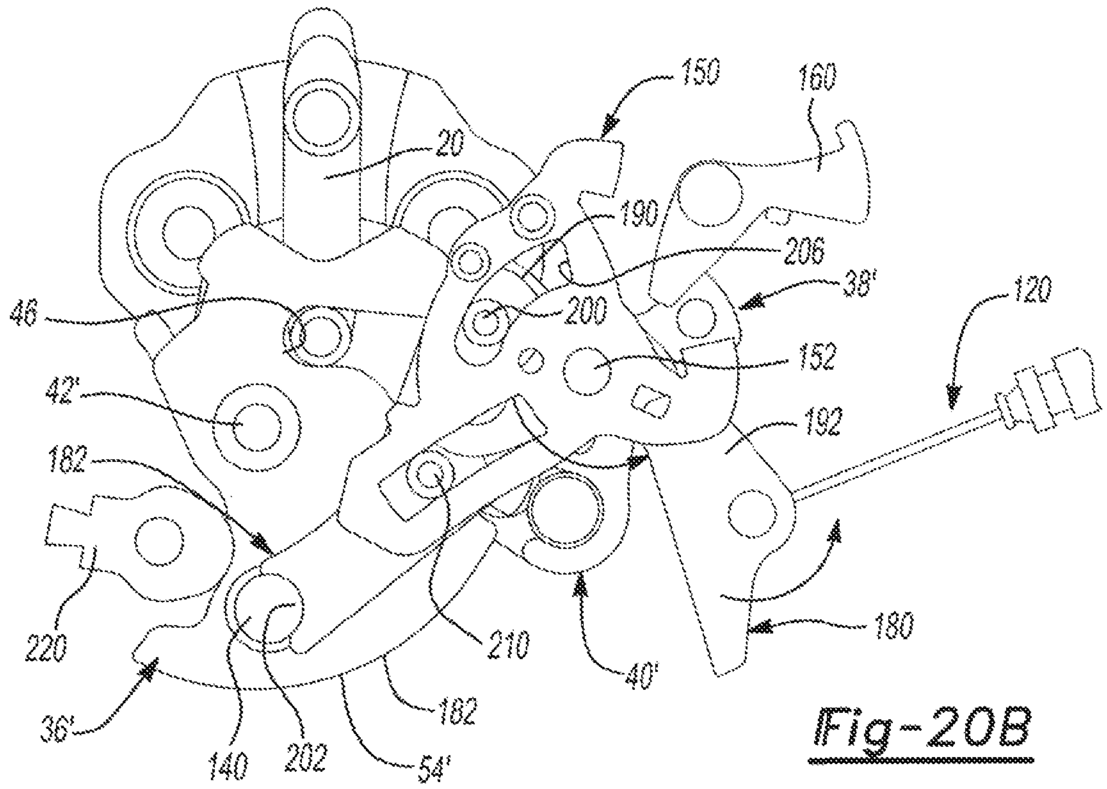

Actuation of power cinch actuator 122 causes latch cinch mechanism 136 to initiate cinching of ratchet 36' by mechanically rotating it from its secondary striker capture position (FIG. 19A) to is primary striker capture position (FIG. 16). The power cinching operation is illustrated in FIGS. 20A and 20B wherein movement of cinch lever 180 from its cinch start position into a cinch stop position (via pulling of cinch cable 120) causes the drive connection between the first drive pin on cinch link pivot 200 and slot 194 in cinch lever 180 to cause concurrent movement of cinch link 182 from its engaged position into a ratchet-cinched position for causing rotation of ratchet 36' from its secondary striker capture position into its primary striker capture position due to engagement of drive notch 202 on cinch link 182 with ratchet post 140 on ratchet 36'. This drive engagement functions to cause ratchet 36' to slightly over-travel past its primary striker capture position to allow roller ball 74' to disengage cam edge surface 54' and align with primary latch notch 50, thereby permitting pawl 38' to move into its ratchet holding position. As the cinch link 182 is moved, the cinch link 182 will pivot about the cinch link rivet 210 retained within the second drive slot 212 as caused by the movement of the second end of the cinch link 182 caused by the second drive pin segment 204 following the arcuate path of the first drive slot 206. As the cinch link 182 is moved, the orientation of the cinch link 182 will change to follow the rotational path of the ratchet post 140 relative to the ratchet pivot post 42 so as to ensure the force applied by the cinch link 182 upon the ratchet 36' is constantly maintained on the ratchet post 140 in the direction of travel of the cinch link 182.

Upon completion of this power cinching operation, ratchet 36' is held in its primary striker capture position by pawl 38' and latch cinch mechanism 136 is "reset" back into its rest state (FIG. 16). For example, to reset the latch cinch mechanism 136 into its rest state, the power release actuator 102 (or the manually-actuated inside or outside latch release actuator) may be actuated to pivot release lever 150 from its non-actuated position into its actuated position for moving the cinch link 182 to release lock notch 202 from ratchet post 140 e.g. by moving the cinch link rivet 210 as urged by the movement of the second drive slot 212. The disengagement of the latch cinch mechanism 136 is designed in such way the moment arm on the cinch link 182 does not decrease during the cinch function, which allows to lower the disengagement efforts i.e. the distance between the cinch link rivet 210 retained within the second drive slot 212 and the release lever pivot post 152 rather increases during the cinch function which increases the force the second drive slot 212 applies on the pin 140 due to the rotation of the pivot release lever 150.

Figure 21A:
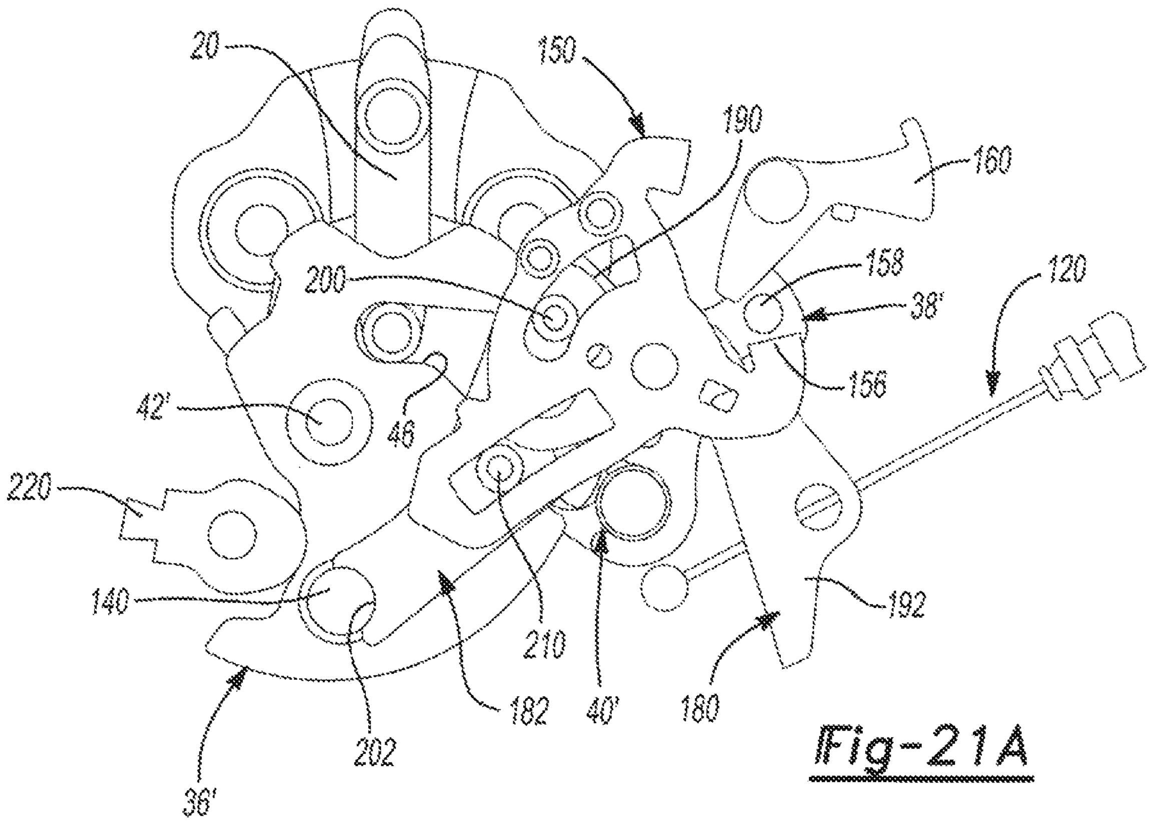
FIGS. 21A through 21C sequentially illustrate movement of the components associated with a cinch override operation.
Figure 21B:
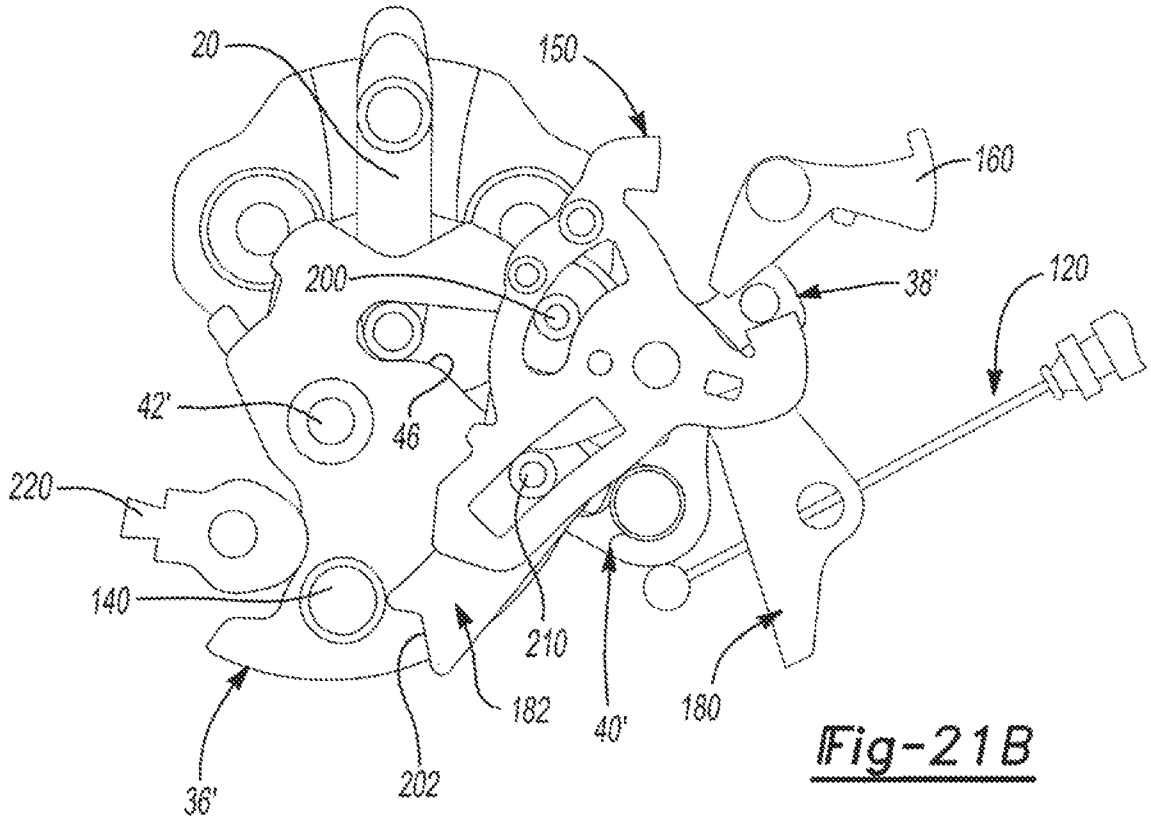
Figure 21C:
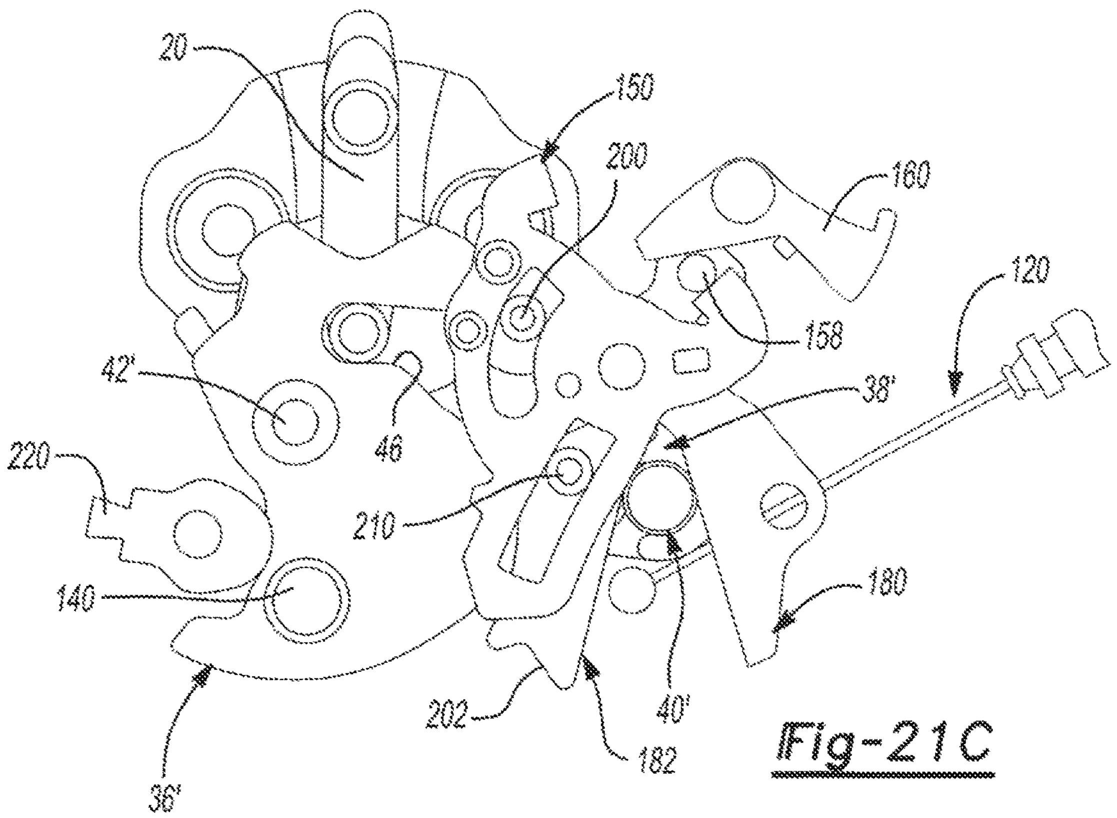
Figure 22A:
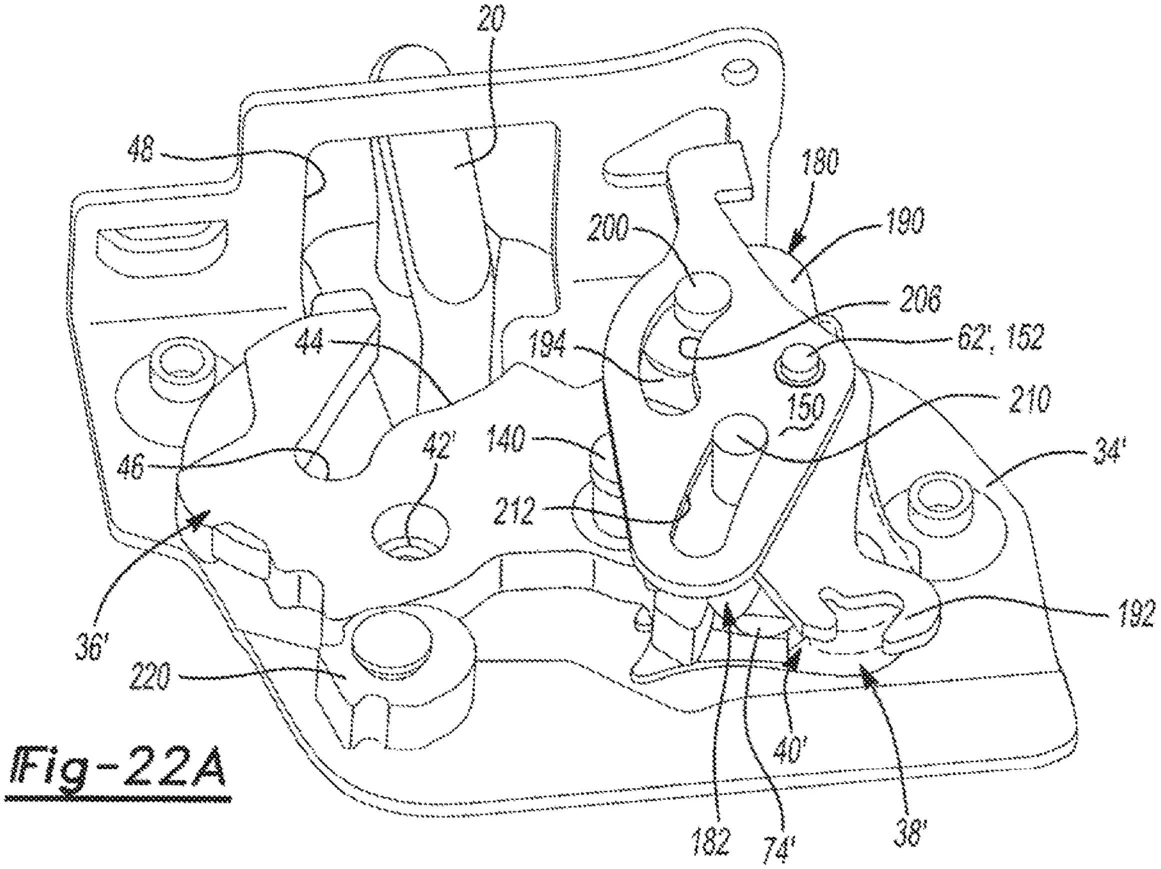
Figure 22B:
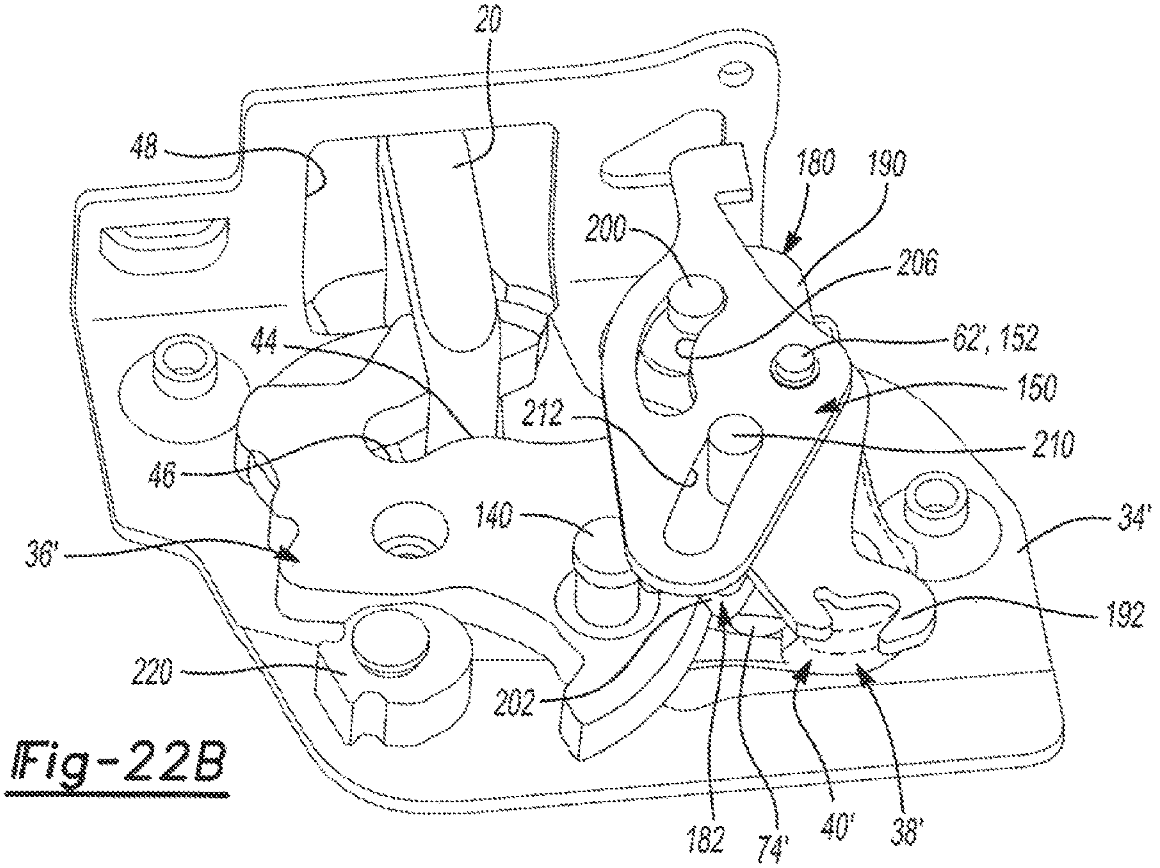
Figure 22C:
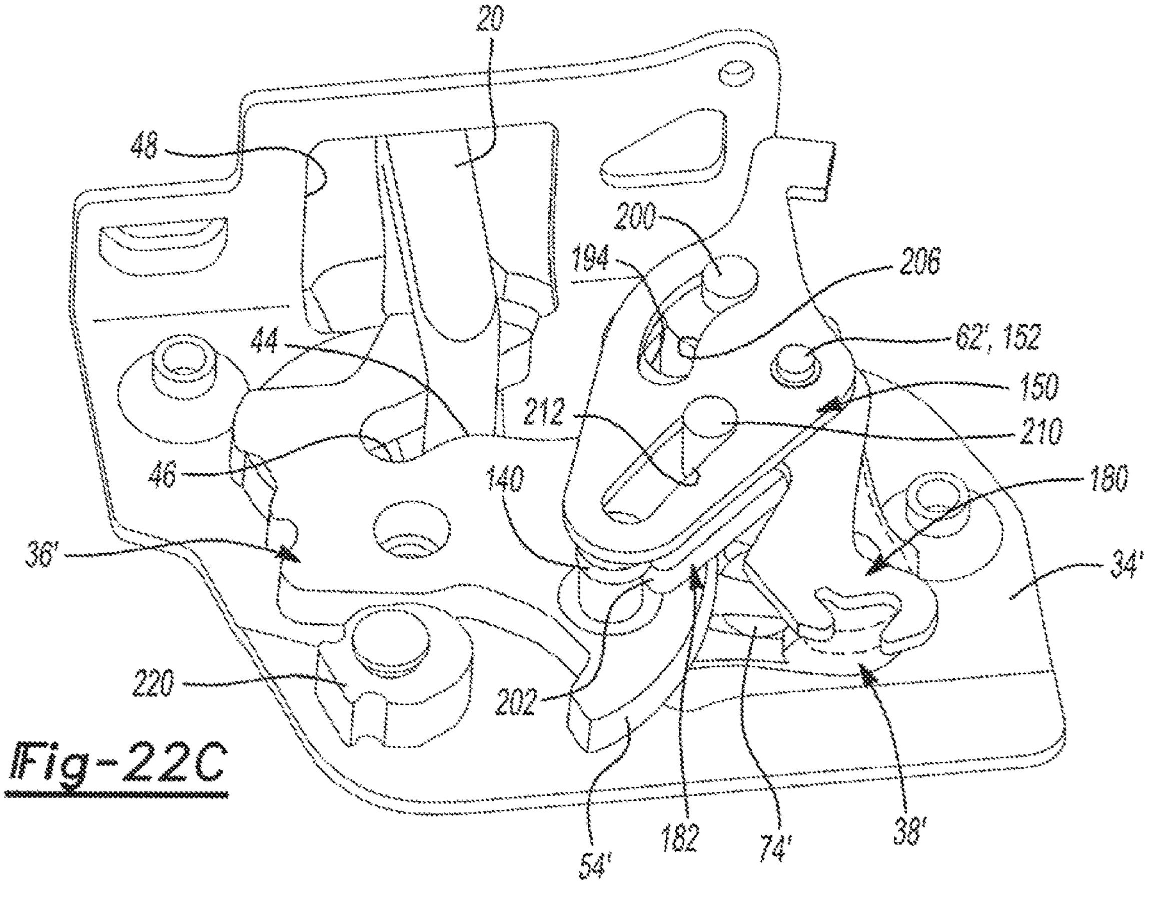
Figure 22F:
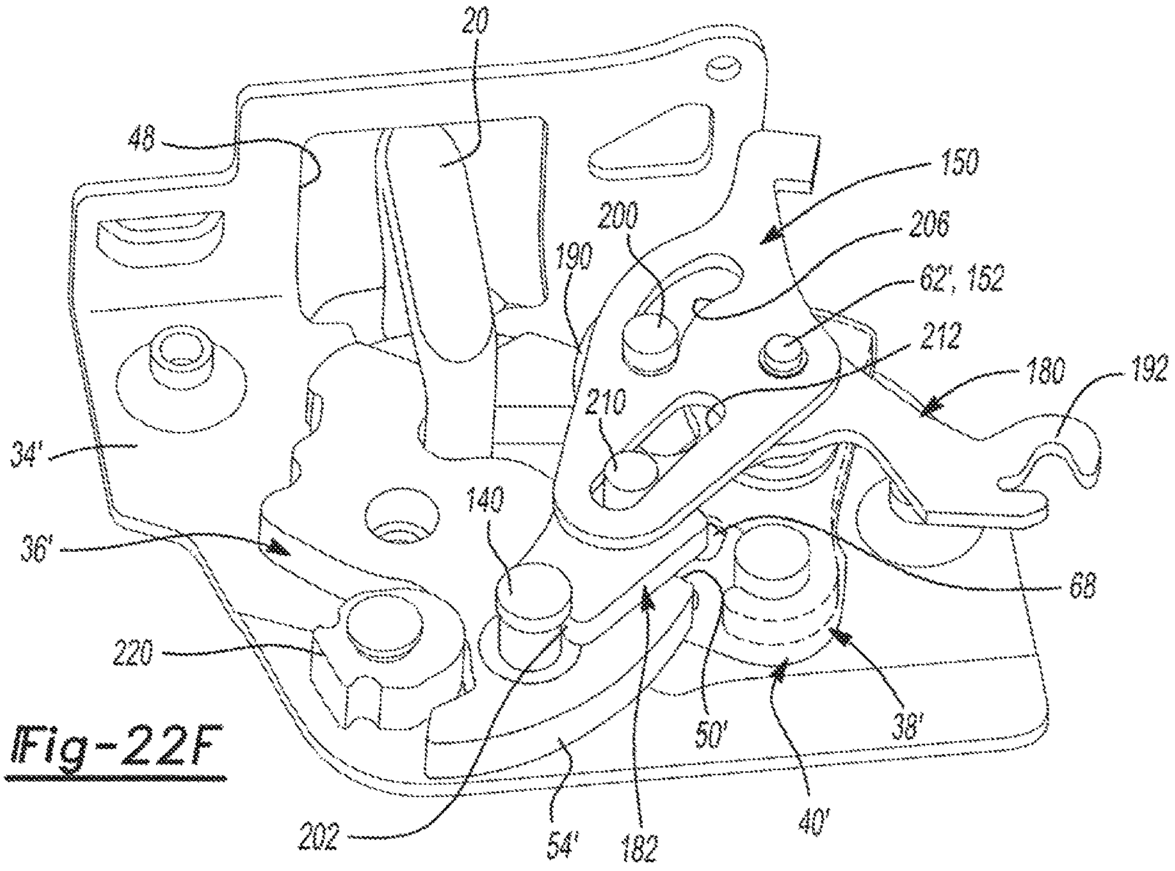
Figure 22G:
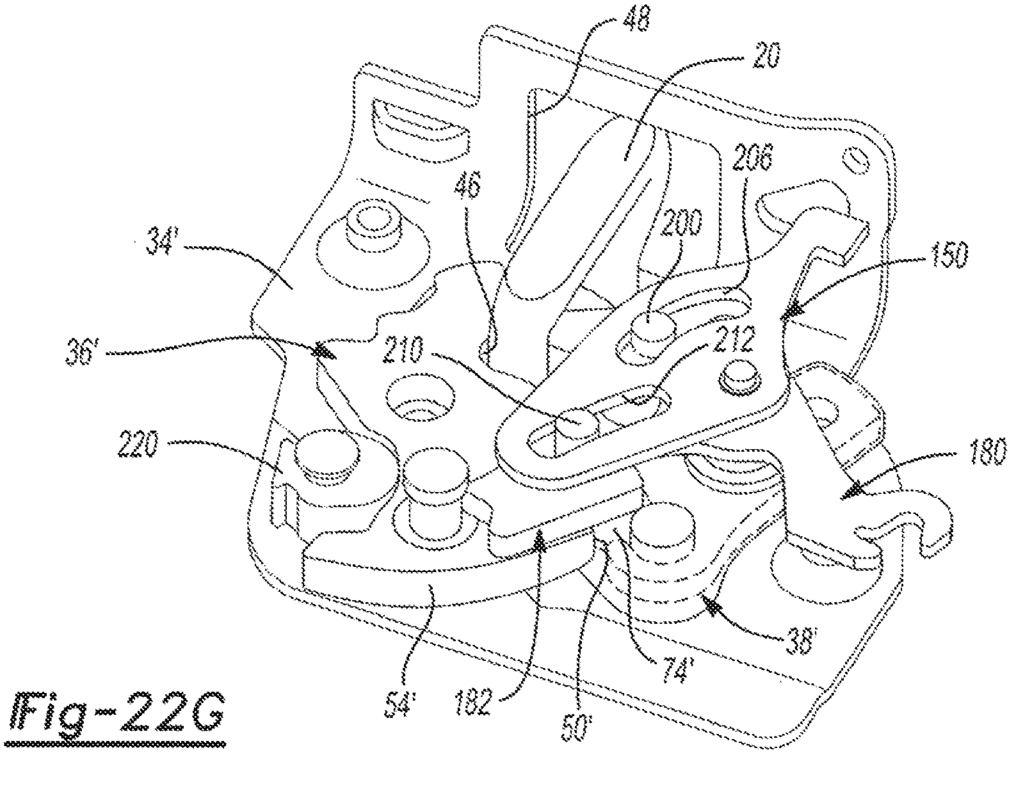
Figure 23:
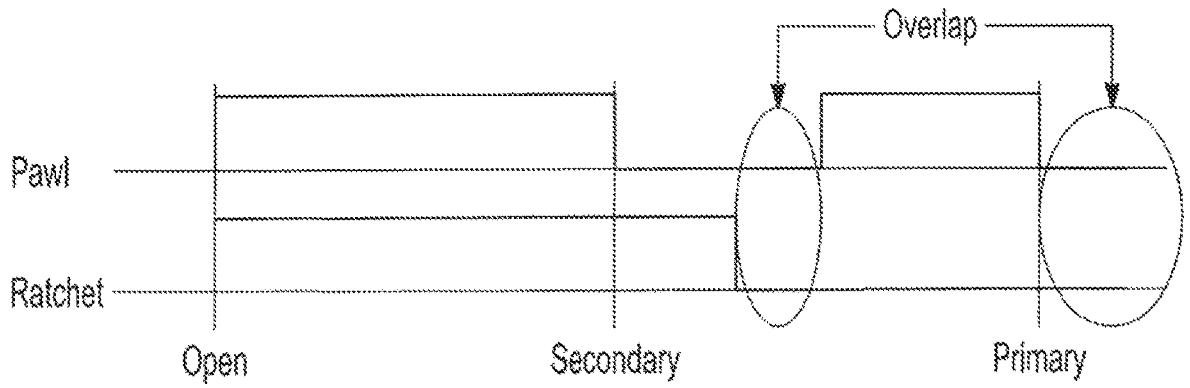
Fig-23 PRIOR ART
FIG. 23 shows a prior art switching strategy.

FIGS. 21A through 21C illustrate a cinch “override” operation to shift latch cinch mechanism 136 from its actuated state into an override-released state. Specifically, power release actuator 102 (or the manually-actuated inside or outside latch release actuator) is actuated to pivot release lever 150 from its non-actuated position into its actuated position for driving pawl 38' to its ratchet releasing position and moving cinch link 182 to release lock notch 202 from ratchet pin 140.

In an alternative arrangement, cinch link 182 can remain engaged with ratchet 36' (via lock notch 202 and ratchet post 140) when ratchet 36' is located in its primary striker capture position. As such, subsequent actuation of latch release mechanism 134 will cause release lever 150 to move pawl 38' and cinch link 180 concurrently to release ratchet 36' for movement to its striker release position.

FIGS. 22A-22G provide a series of sequential views illustrating movement of the various components associated with shifting of latch mechanism 132 from its released state (FIG. 22A) into its secondary closed state (FIG. 22C) via engagement of striker 20 with ratchet 36' during movement of door 16 from its open position to its partially-closed position. As noted, this action results in movement of cinch link 182 relative to ratchet 36' until drive notch 202 is aligned with and engaging ratchet post 140. At this point, the power cinching operation is initiated via actuation of power cinch actuator 122 such that cinch link 180 mechanically drives ratchet 36' from its secondary capture position to its primary striker capture position (see FIGS. 22C through 22F). In this manner, latch mechanism 132 is shifted from its secondary closed state into its primary closed state. Following completion of the power cinching operation, cinch link 182 is uncoupled from ratchet 36' (FIG. 22G) with pawl 38' functioning to hold ratchet 36' in its primary striker capture position.

The present invention provides a simple and compact design of latch assembly 118 having a ratchet 36' with a one tooth (primary latch notch 50') profile engaged only by the pawl 38' in the primary striker capture position. As noted, the secondary striker capture position for the ratchet 36' is obtained via engagement of ratchet-mounted post 140 engaged and held by a cinch component (cinch link 182) of a cinching mechanism. The release lever 150 has a profile configured to guide the cinch link 182 during the power cinching function and which is also used for cinch disengage and latch release in any ratchet position. The disengage arrangement is designed such that the moment arm on the cinch link 182 does not decrease during the cinching operation, thereby permitting lower disengagement efforts.

While cinching mechanism 136 is shown operably associated with roller-type single ratchet/pawl latch mechanism 132, those skilled in the art will recognize that alternative single and double ratchet/pawl latch mechanisms can be used, provided the cinching mechanism is configured to establish the secondary closed state without direct latching engagement between the ratchet and pawl. Likewise, alternative arrangements for cinch actuator 122 and cinch cable 120 can be provided for selectively moving cinch lever 180 between its rest and cinch position to initiate and complete the power cinching operation.

Figure 25:
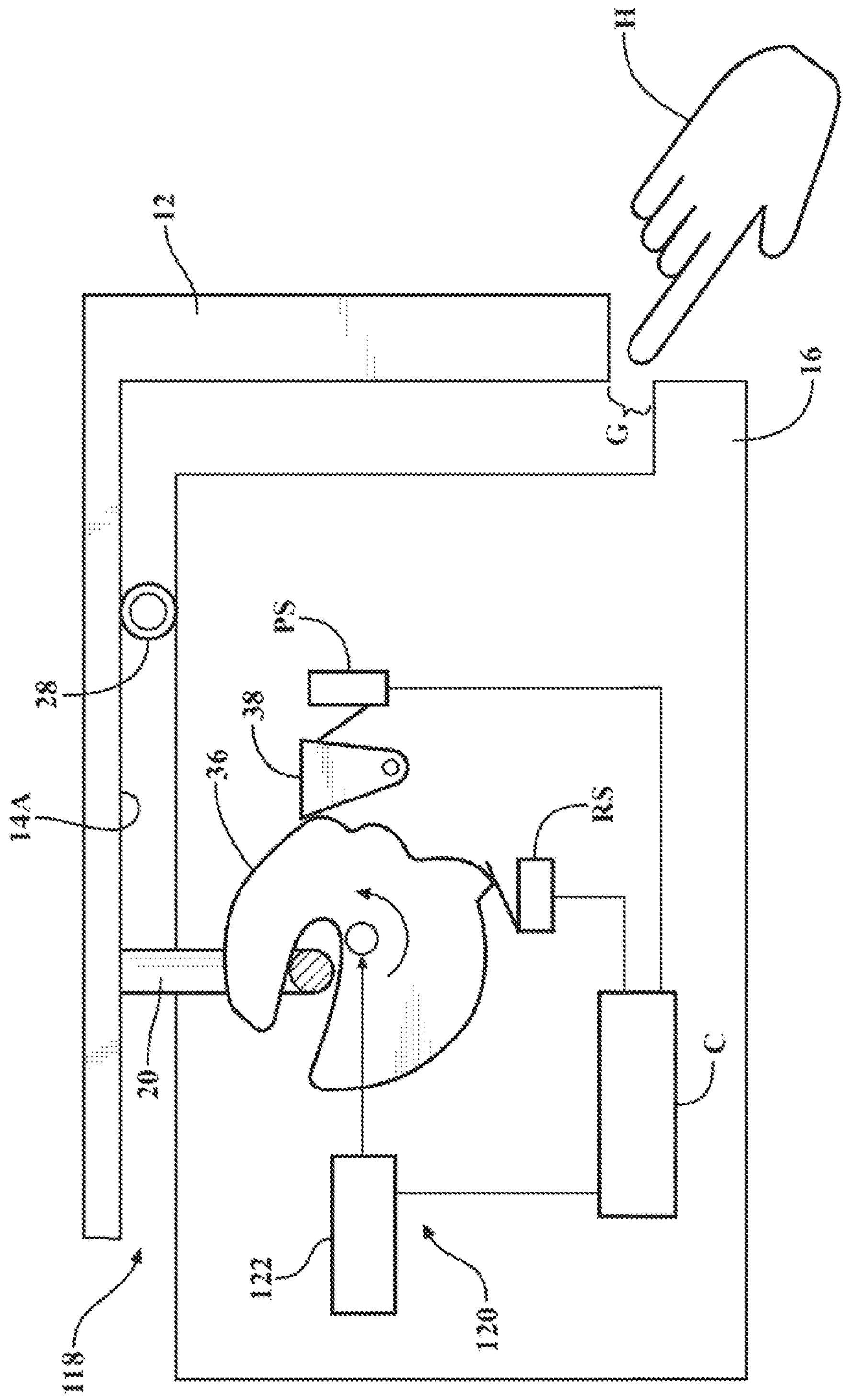
FIG. 25 is a schematic view similar to FIGS. 19A and 19B illustrating the ratchet in a secondary striker capture state and the latch cinch mechanism in a cinch start position.
Figure 26:
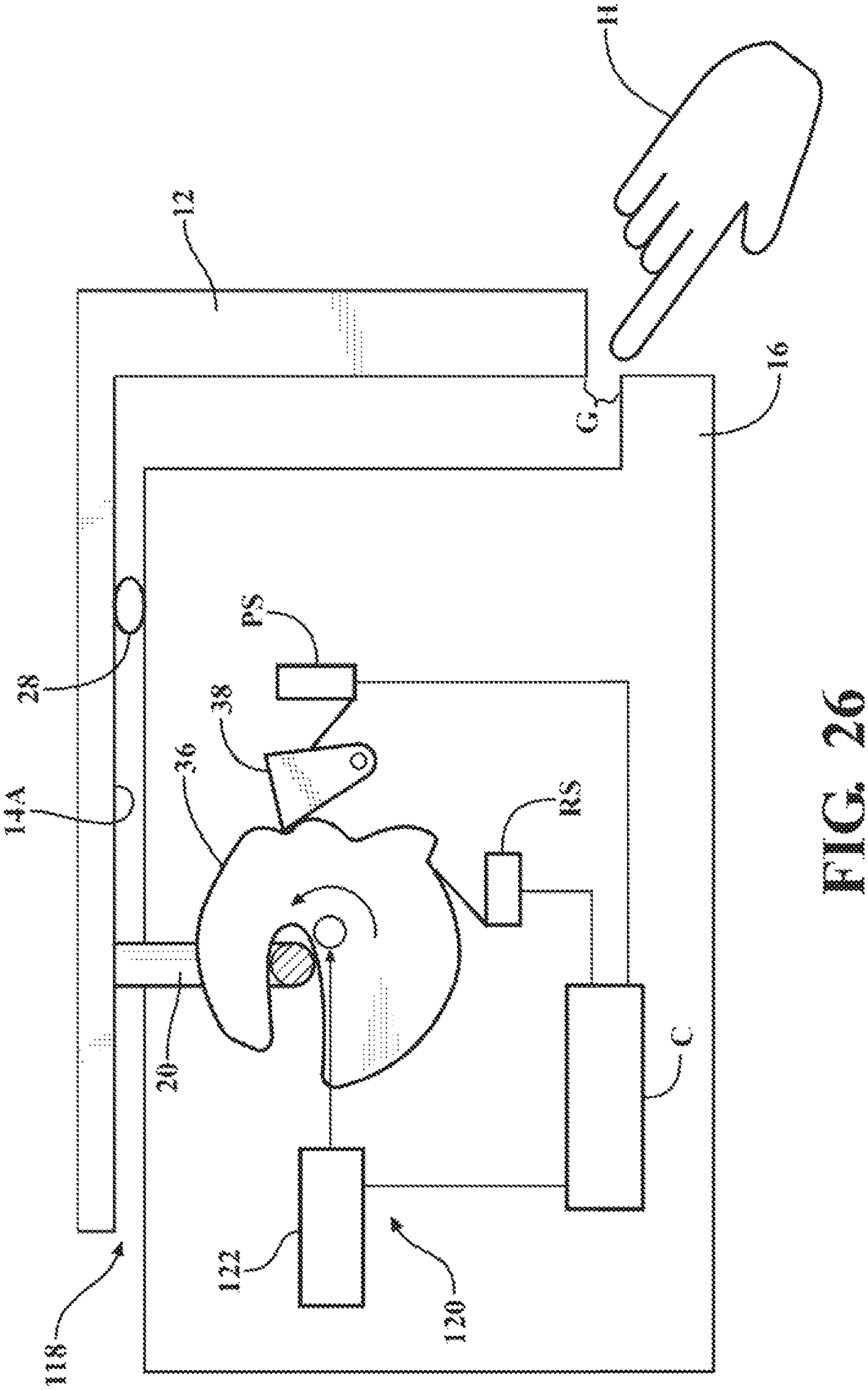
FIG. 26 is a schematic view illustrating the ratchet moving from the secondary striker capture position toward the primary striker capture position with the latch cinch mechanism transitioning from a lower power mode to a high power mode.
Figure 27:
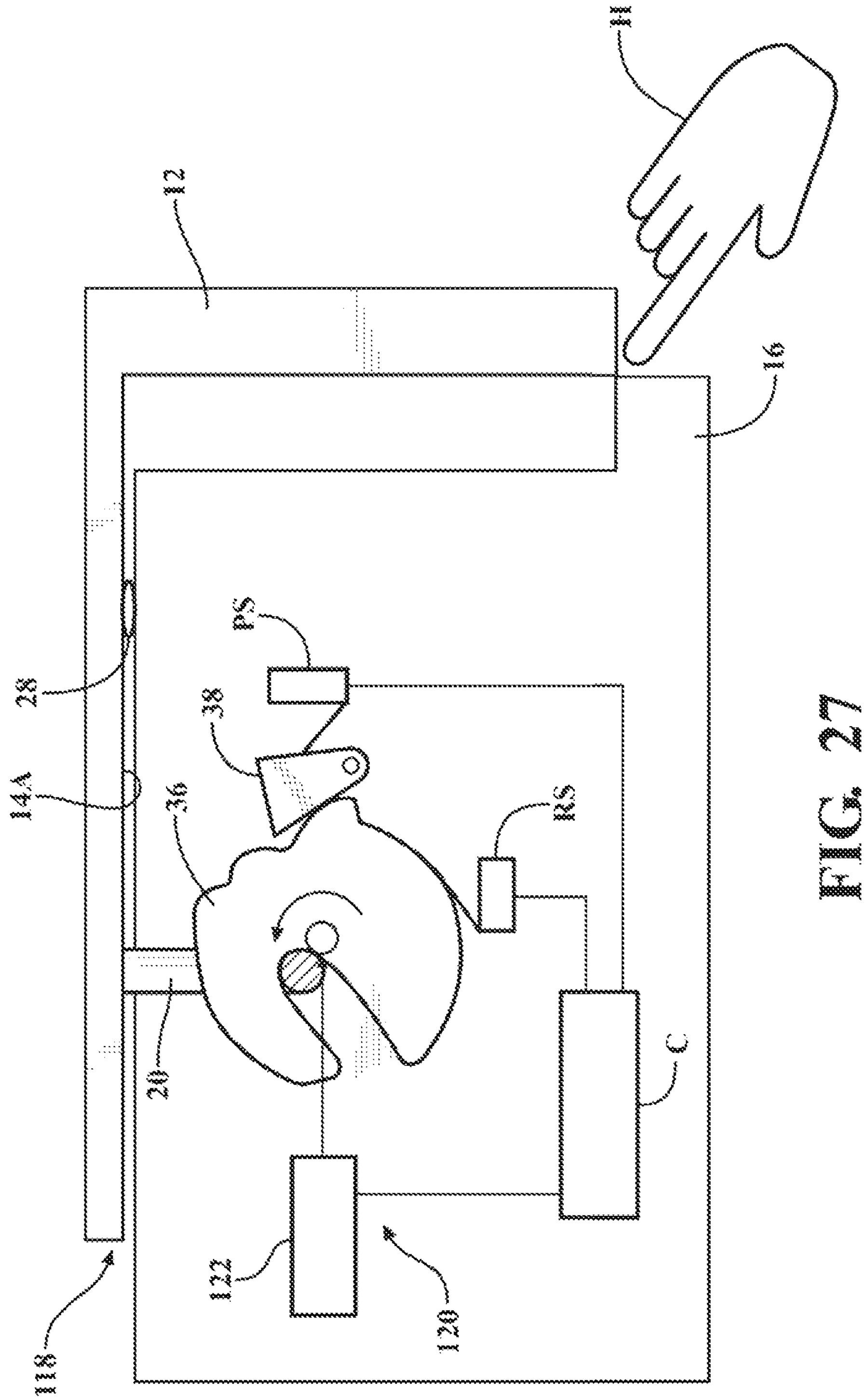
FIG. 27 is a schematic view illustrating the ratchet cinched to the primary striker capture position.

In accordance with a further aspect, FIGS. 24-27 schematically illustrate ratchet 36 and pawl 38 moving in a closing operation, and in particular, in a cinching operation of closure panel 16 from a cinch start position, whereat door 16 is in the partially closed position and the ratchet is in the secondary striker capture position (FIG. 25), to a cinch complete position, whereat closure panel 16 is in the fully closed position and the ratchet is in the primary striker capture position (FIG. 27). The cinching operation is performed such that an object, such as a person’s hand H, by way of example and without limitation, is prevented from being pinched between the closure panel 16 and the structural portion, such as the side edge 14A, of vehicle body 12 of the motor vehicle 10 while cinching the closure panel 16 from the partially closed position to the fully closed position.

Figure 24:
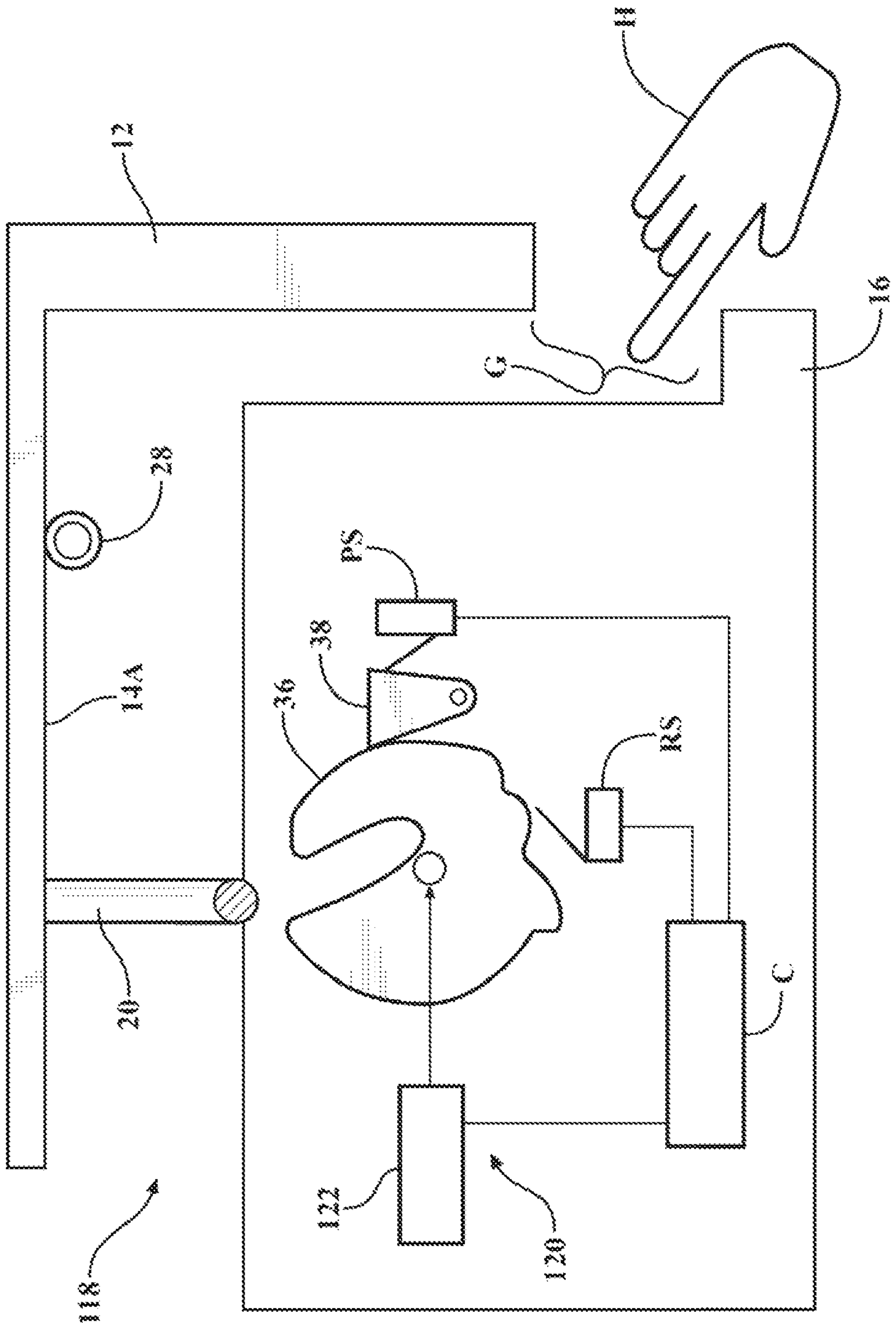
FIG. 24 is a schematic view similar to FIGS. 18A and 18B illustrating the ratchet of the latch mechanism in a striker release state and the latch cinch mechanism in a stand-by-state.

Prior to initiating the cinch operation, closure panel 16 is moved from it fully open position (FIGS. 18A, 18B, 24) to its partially open position (FIGS. 19A, 19B, 25). In the cinching operation, power-operated cinch actuator 122 is configured to receive a first signal from a controller C to move the cinch lever 180 from the cinch start position to the cinch stop position to move the ratchet 36 from its secondary striker capture position (FIGS. 19A, 19B, 25) to its primary striker capture position (FIGS. 20A, 20B, 27). However, as cinch actuator 122 is driving ratchet 36 from its secondary striker capture position toward its primary striker capture position, at least one or a plurality of sensors, such as a pawl sensor, also referred to as pawl switch PS, and/or a ratchet sensor, also referred to as ratchet switch (RS), monitor respective movements and positions of pawl 38 and ratchet 36 to detect if normal, unrestricted closure of closure panel 16 is occurring. If abnormal motion of closure panel 16 is detected, power-operated cinch actuator 122 is configured to receive a second signal from controller C, in response to an object H being detected within a gap G between the closure panel 16 and the structural portion 12 of the motor vehicle 10, after receiving the first signal, to stop moving the cinch lever 180 from the cinch start position toward the cinch stop position to stop the ratchet 36 from moving from its secondary striker capture position to its primary striker capture position. Accordingly, as a result of the cinch lever 180 being stopped from moving toward the cinch stop position, the object H is prevented from being pinched between closure panel 16 and vehicle body 12 during the cinching process. It is to be understood that closure panel 16 can be automatically returned to its partially open position upon detection of the object in gap G, with ratchet 36 being moved to its secondary striker capture position, or to its fully open position, with ratchet 36 being moved to its striker release position, upon detection of object H, as desired. It is to be further understood that the controller C can receive a signal indicating abnormal closure panel 16 movement, indicating an object H in gap G, from any type of desired sensor or sensors, including position sensors to detect the position of pawl and/or ratchet, stress/strain (force) sensors, or otherwise.

Figure 28:
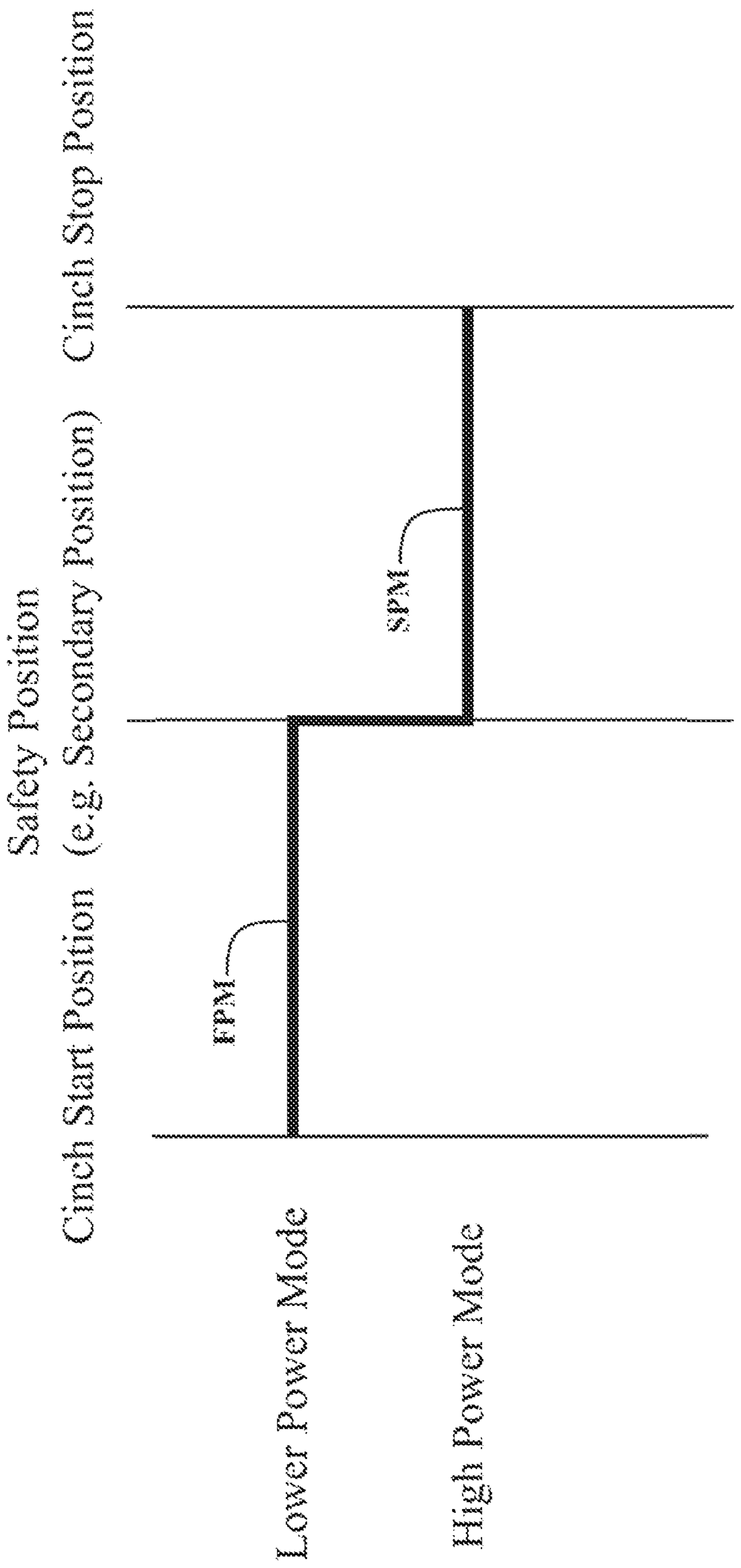
FIG. 28 is a diagram illustrating a first power mode during which the latch cinch mechanism is moving from the cinch start position to a safety position and a second power mode during which the latch cinch mechanism is moving from the safety position to a cinch stop position whereat the ratchet is in the primary striker capture position.

Upon receiving the first signal from controller C, the power-operated cinch actuator 122 is configured to move the cinch lever 180 from the cinch start position toward the cinch stop position under a first power mode FPM, corresponding to a low power mode (FIG. 28), while the gap G between the closure panel 16 and the structural portion 12 of the motor vehicle 10 is present, particularly when gap G is sufficiently large (i.e. greater than 5 mm) to allow a person’s hand or fingers thereof to be disposed into the gap G (FIGS. 24 and 25). Then, when the gap G between the closure panel 16 and the structural portion 12 of the motor vehicle 10 is closed or substantially closed, such as when a person's hand or fingers cannot be disposed within the gap G (i.e. 0-5 mm; FIG. 26), the power-operated cinch actuator 122 is configured to move the cinch lever 180 from to the cinch stop position under a second power mode SPM, corresponding to a low power mode (FIG. 28), wherein the first power mode FPM is less than the second power mode SPM. Accordingly, during movement of the door 16 under the second power mode SPM, the ratchet 36, and thus, door 16 both move at a reduced speed and under a reduced force as compared to when the door 16 is moving under the second power mode, and thus, a person can be alerted in timely fashion to avoid accidental placement of their hand, fingers or otherwise in the increased size gap G (FIGS. 24 and 25). Then, when the gap G is sufficient small, as discussed above, there is no concern for accidental pinching or insertion of the object H into the reduced size gap G, and thus, the speed and power at which the ratchet 36 and door 16 are moved can be safely increased under the second power mode SPM.

As noted above, the closure latch assembly 118 includes at least one or more sensors (PS and/or RS) configured to detect when the gap G is present and when the gap G is substantially closed (5 mm or less). The at least one sensor PS and/or RS is configured in operable communication with the power-operated cinch actuator 122 to cause the power-operated cinch actuator 122 to change from the first power mode FPM to the second power mode SPM when the gap G decreased to become substantially closed. Otherwise, if the gap G is not substantially closed, cinch actuator 122 stops the cinching operation to avoid pinching an object H disposed within gap G.

Figure 29A:
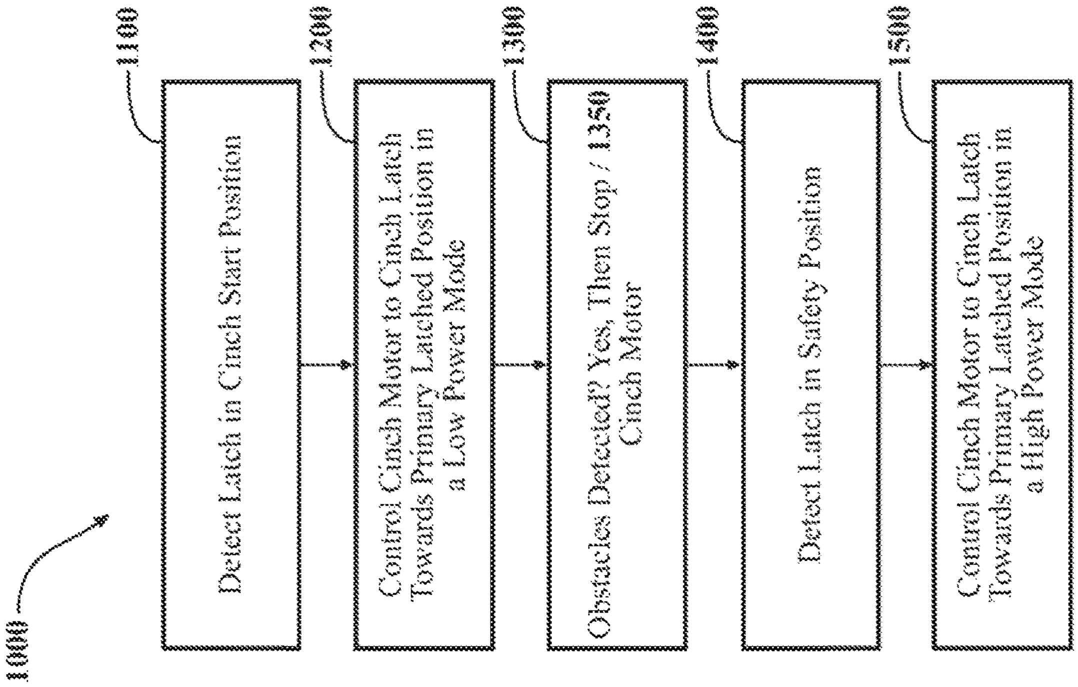
FIGS. 29A and 29B illustrate methods of preventing pinching of an object between a closure panel and a structural portion of the motor vehicle while cinching the closure panel from a partially closed position to a fully closed position.
Figure 29B:
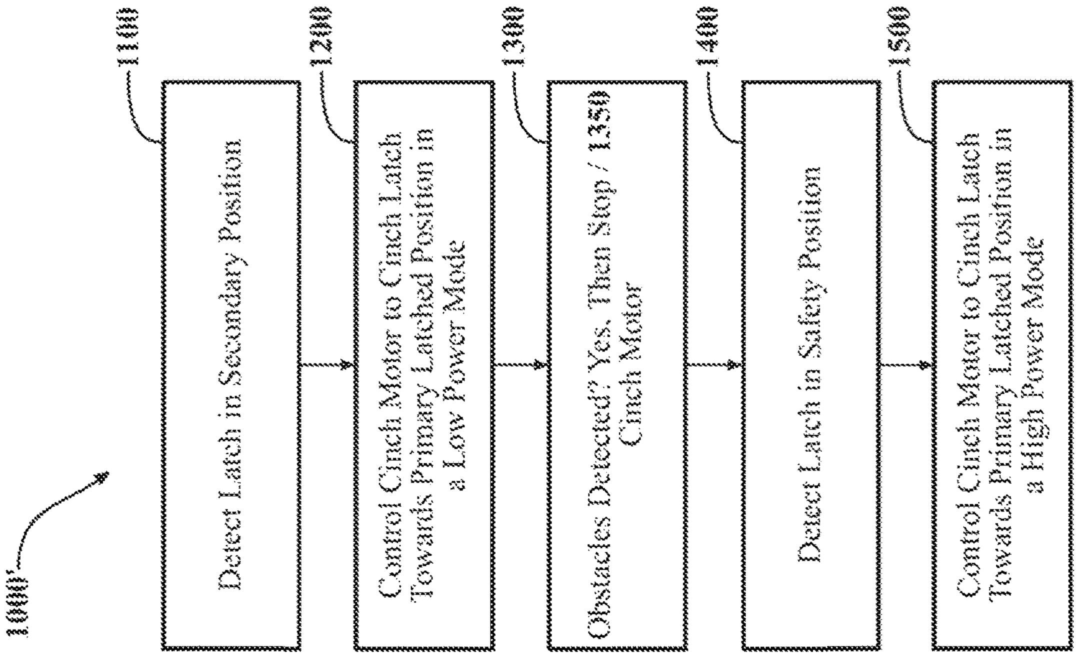

In accordance with another aspect, as shown in FIGS. 29A and 29B, a method 1000, 1000' of preventing pinching of an object H between a closure panel 16 and a structural portion 12 of the motor vehicle 10 while cinching the closure panel 16 from a partially closed position to a fully closed position is provided. The method 1000, 1000' includes a step 1100 of detecting a latch mechanism 32 of the closure panel 16 being in a cinch start position, which can correspond to the ratchet 36 being in the secondary striker capture position and/or the pawl 38 being in the second ratchet holding position; a step 1200 of actuating a cinch actuator 122 with a first signal and cinching the latch mechanism 32 toward a primary latched position; a step 1300 of detecting whether an object H is in a gap G between the closure panel 16 and a structural portion 12 of the motor vehicle 10; a step 1350 of stopping the cinching of the latch mechanism 32 with a second signal if an object H is detected in the gap G; and a step 1500 of continuing the cinching of the latch mechanism 32 to the primary latched position under the first signal if an object H is not detected in the gap G.

In accordance with another aspect, the method 1000, 1000' can further include cinching the latch mechanism from the start position toward the cinch stop position under a first power mode FPM while the gap G between the closure panel 16 and the structural portion 12 of the motor vehicle 10 is present (sufficiently large such that the object H can fit into the gap G), and further including a step 1400 of determining when the gap G between the closure panel 16 and the structural portion 12 of the motor vehicle 10 is substantially closed, such that an object H can no longer fit within the gap G, and a step 1500 of cinching the latch mechanism 32 under a second power mode SPM to the cinch stop position, wherein the first power mode FPM is less (reduced speed and reduced force) than the second power mode SPM.

In accordance with another aspect, the method 1000, 1000' can further include configuring at least one sensor and or switch assembly PS and/or RS, 219 (discussed below) to detect when the gap G is present and when the gap G is substantially closed (latch mechanism 32 is determined as being in a safety position at step 1400) and configuring the at least one sensor PS and/or RS, 219 in operable communication with the power-operated cinch actuator 122 to cause the power-operated cinch actuator 122 to change from the first power mode to the second power mode when the gap G is substantially closed.

In accordance with another aspect, the method 1000, 1000' can further include providing the single switch assembly 219 having a lever, also referred to as ajar lever 223, and a switch, also referred to as ajar switch 221, and coupling the lever 223 to the pawl 38 for lost motion therewith and configuring the lever 223 for movement into and out of actuating contact with the switch 221 in response to movement of the pawl 38 and the ratchet 36.

Figure 30:
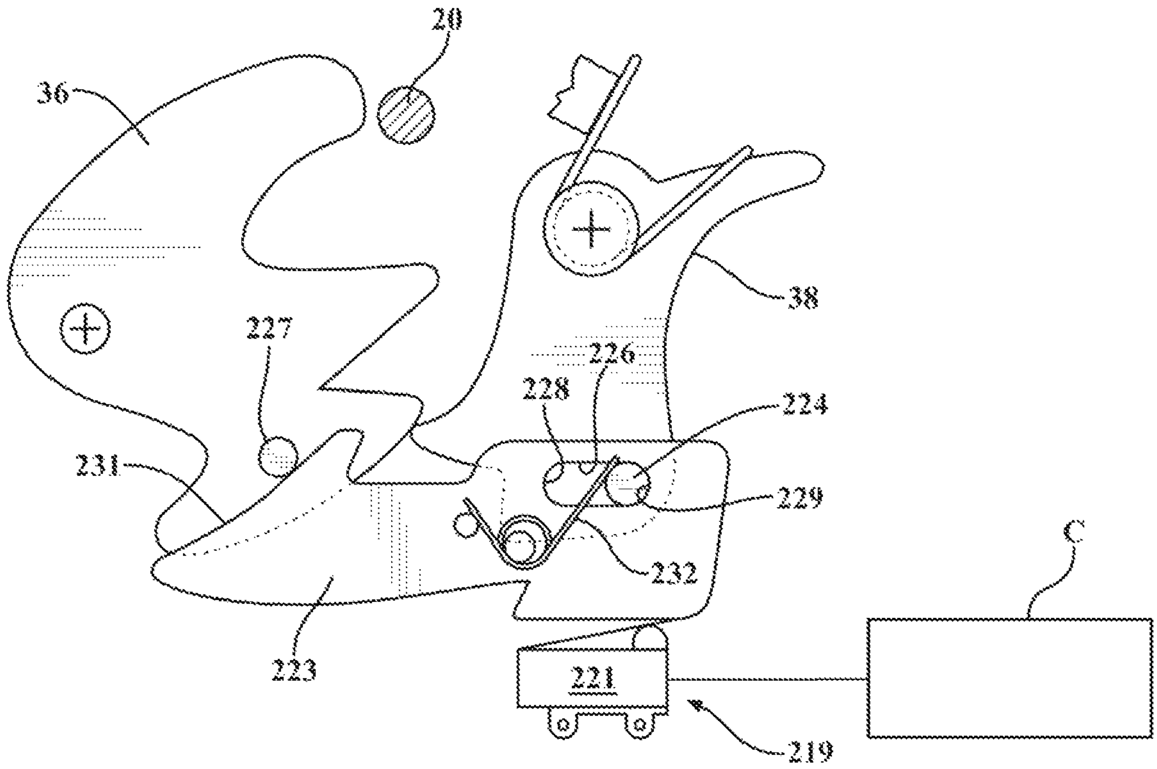
FIG. 30 illustrates a schematic plan view of a switch assembly configured to simultaneously detect the positions of the pawl and the ratchet to determine a position of a closure panel of the motor vehicle, with the ratchet shown in a striker release position and the pawl shown in a ratchet release position.
Figure 31:
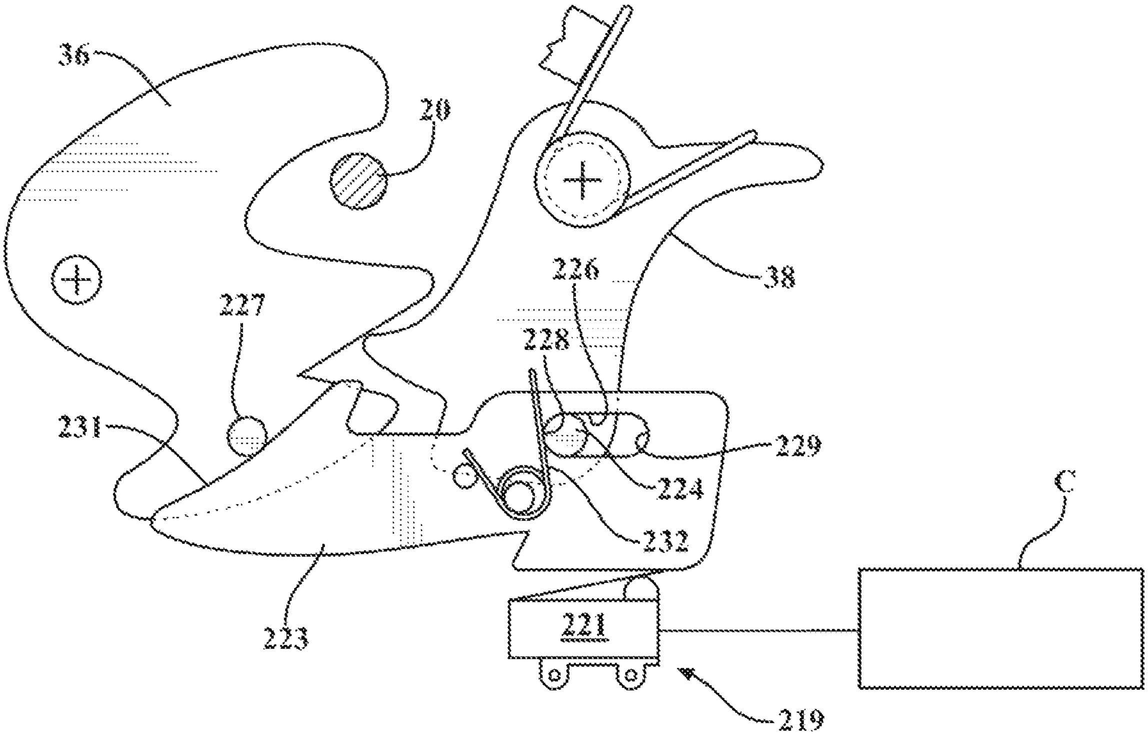
FIG. 31 is a view similar to FIG. 30 with the ratchet shown in a secondary striker capture position and the pawl shown in a secondary ratchet holding position.
Figure 32:
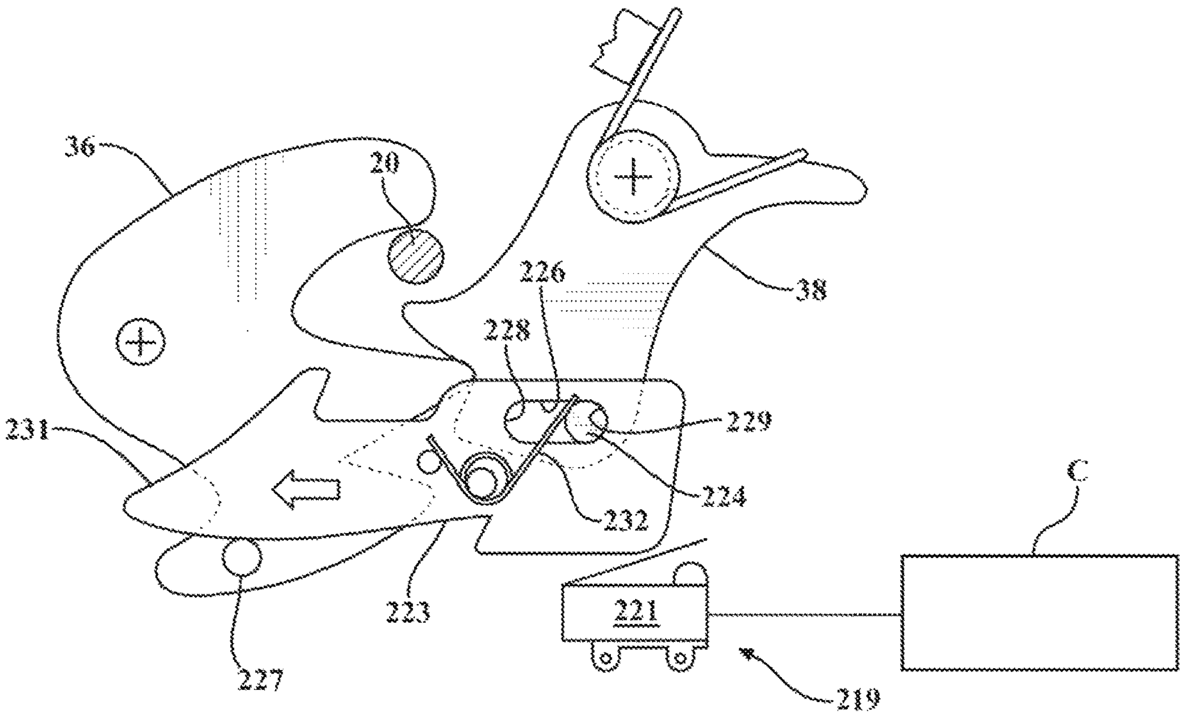
FIG. 32 is a view similar to FIG. 30 with the ratchet shown in a primary striker capture position and the pawl shown in a primary ratchet holding position.
Figure 33:
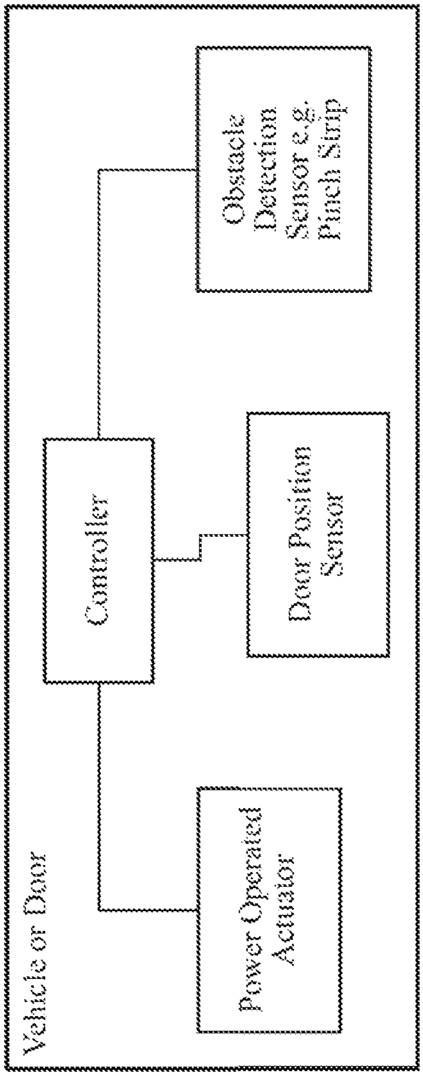
FIG. 33 is a block diagram illustrating a control configuration is accordance with one aspect of the disclosure.
Figure 34:
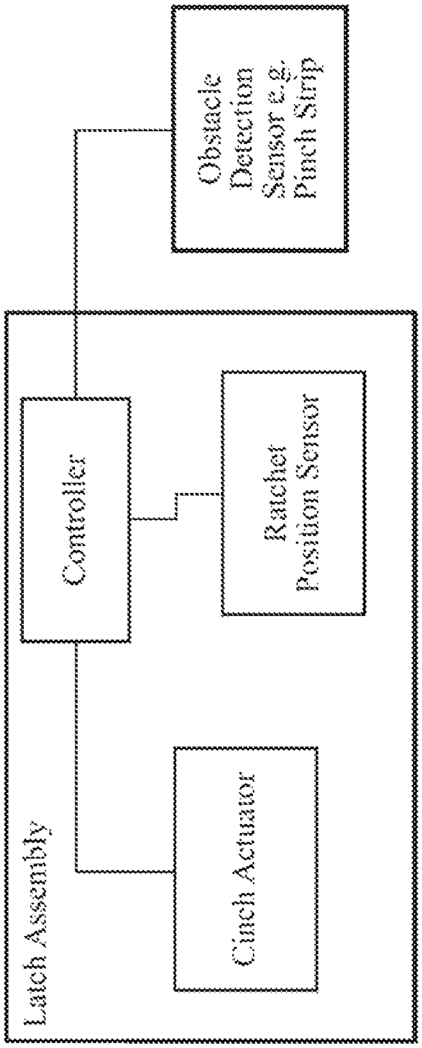
FIG. 34 is a block diagram illustrating a control configuration is accordance with another aspect of the disclosure.

In accordance with another aspect, as shown in FIGS. 30-32, the at least one sensor configured to detect when the gap G is present and when the gap G is substantially closed can be provided as a single switch assembly 219 configured to simultaneously detect the positions of the pawl 38 and the ratchet 36. The pawl 38 is coupled to the single switch assembly 219 for lost-motion (relative movement) therewith, such that the pawl 38 can move from its ratchet release position (FIG. 30), whereat a door ajar switch 221, configured in operable communication with controller C, is activated by lever 223 of the switch assembly 219, to its secondary ratchet holding position (FIG. 31), while lever 223 remains stationary or substantially stationary and in engagement with switch 221 to maintain switch 221 in its activated state.

To establish the lost motion connection between pawl 38 and lever 223, a pin 224 is fixed to the pawl 38 to extend laterally outward therefrom and the lever 22 has an elongate slot 226 extending lengthwise along the lever 22 between opposite first and second ends 228, 229. The pin 224 is disposed in the slot 226 and retained therein for sliding movement therealong between the opposite ends 228, 229.

When the ratchet 36 is in the striker release position (FIG. 30), the pin 224 is adjacent one of the first end 228 or second end 229 of the elongate slot 226, and shown as being adjacent the second end 229, and when the ratchet 36 is in the secondary striker capture position (FIG. 31), the pin 224 is adjacent the other of the first end 228 or second end 229 of the elongate slot 226, and shown as being adjacent the first end 228, wherein the lever 223 remains in engagement with the ajar switch 221 of the single switch assembly 219 when the ratchet 36 is in the striker release position and the secondary striker capture position, thereby acting to indicate a door ajar signal via controller C.

The lever 223 moves out of engagement from the ajar switch 221 of the switch assembly 219 when the ratchet 36 is in the primary striker capture position and the pawl 38 is in the ratchet holding position (FIG. 32). The lever 223 is configured to be held stationary by the ratchet 36 via a pin 227 fixed to ratchet 36 as pawl 38 moves from the ratchet release position to the secondary ratchet holding position. Pin 227 confronts an inclined nose 231 of lever 223 when pawl 38 is in the ratchet release position and the secondary ratchet holding position, wherein pin 227 abuts inclined nose 231 to hold lever 223 in engagement with switch 221 against the bias of a biasing member, such as a torsion spring 232, by way of example and without limitation, as pin 224 slides along slot 226 into engagement with first end 228 of slot 226 when pawl 38 moves to the secondary ratchet holding position. The lever 223 is also configured for movement in response to movement of the ratchet 36 via biasing member 232 as pawl 38 moves from the secondary ratchet holding position to the primary ratchet holding position and as pin 227 of ratchet 36 moves out of confronting engagement with nose 231, whereat lever 223 translates away from and out of engagement with switch 221 (FIG. 32). Accordingly, the single switch assembly 219 is operable to indicate that the closure panel 16 is in the fully closed position when the ratchet 36 is in the primary striker capture position and the pawl 38 is in the ratchet holding position via switch 221 being open.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A closure latch assembly for a motor vehicle for releasably holding a closure panel in a fully closed position and a partially closed position relative to a structural portion of the motor vehicle and for releasing the closure panel for movement to an open position, comprising:

a latch mechanism having a ratchet moveable between a striker release position whereat the ratchet is positioned to release a striker to permit the closure panel to move to the open position, a secondary striker capture position whereat the closure panel is held in the partially closed position and a primary striker capture position whereat the closure panel is held in the fully closed position, a pawl moveable between a ratchet holding position whereat the pawl is positioned to hold the ratchet in one of its primary striker capture position and secondary striker capture position, and a ratchet releasing position whereat the pawl is positioned to permit movement of the ratchet to its striker release position;

a latch release mechanism moveable between a non-actuated position whereat the pawl is permitted to remain located in its ratchet holding position and an actuated position whereat the pawl is permitted to move to its ratchet releasing position;

a latch cinch mechanism for causing the ratchet to rotate from its secondary striker capture position to its primary striker capture position; and a power-operated cinch actuator configured to receive a first signal to activate the latch cinch mechanism to move the latch cinch mechanism from a cinch start position to a cinch stop position to move the ratchet from its secondary striker capture position to its primary striker capture position and to receive a second signal, in response to an object being detected within a gap between the closure panel and the structural portion of the motor vehicle, after receiving the first signal, to deactivate the latch cinch mechanism to stop the ratchet from moving to its primary striker capture position, wherein upon receiving the first signal, the power-operated cinch actuator is configured to move the latch cinch mechanism from the cinch start position toward the cinch stop position under a first power mode while the gap between the closure panel and the structural portion of the motor vehicle is present, and when the gap between the closure panel and the structural portion of the motor vehicle is substantially closed, under a second power mode to the cinch stop position, wherein the first power mode is less than the second power mode, wherein the power-operated cinch actuator is configured to move the ratchet from the secondary striker capture position toward the primary striker capture position at a first speed while in the first power mode, and to move the ratchet to the primary striker capture position at a second speed while in the second power mode, wherein the first speed is less than the second speed.

2. The closure latch assembly of claim 1, wherein upon receiving the second signal, the ratchet is permitted to move to one of its secondary striker capture position and its striker release position.

3. The closure latch assembly of claim 1, wherein the latch cinch mechanism comprises a cinch link moveable between a rest position whereat the cinch link is disengaged from the ratchet when the ratchet is located in its striker release position and an engaged position whereat the cinch link engages the ratchet when the ratchet is located in its secondary striker capture position and a cinch lever operably moveable from a cinch start position to a cinch stop position for causing the cinch link to move from its engaged position to a ratchet cinched position, whereat the ratchet is moved to its primary striker capture position, wherein upon receiving the first signal, the power-operated cinch actuator is configured to move the cinch lever from the cinch start position toward the cinch stop position under the first power mode while the gap between the closure panel and the structural portion of the motor vehicle is present, and when the gap between the closure panel and the structural portion of the motor vehicle is substantially closed, under the second power mode to the cinch stop position.

4. The closure latch assembly of claim 1, wherein the gap is greater than 5 mm, and the gap is substantially closed when the gap is 5 mm or less.

5. The closure latch assembly of claim 1, further including at least one sensor configured to detect when the gap is present and when the gap is substantially closed, wherein the at least one sensor is configured in operable communication with the power-operated cinch actuator to cause the power-operated cinch actuator to change from the first power mode to the second power mode when the at least one sensor detects the gap is substantially closed.

6. The closure latch assembly of claim 5, wherein the at least one sensor configured to detect when the gap is present and when the gap is substantially closed is a single switch assembly configured to simultaneously detect the positions of the pawl and the ratchet.

7. The closure latch assembly of claim 5, wherein the at least one sensor deactivates the latch cinch mechanism to stop the ratchet from moving to its primary striker capture position in response to the at least one sensor detecting the object within the gap.

8. The closure latch assembly of claim 5, wherein the at least one sensor includes at least one of a position sensor and a force sensor.

9. A method of preventing pinching of an object between a closure panel and a structural portion of the motor vehicle while cinching the closure panel from a partially closed position to a fully closed position, comprising:

detecting a latch mechanism of the closure panel being in a cinch start position;

actuating a cinch actuator with a first signal and cinching the latch mechanism toward a primary latched position;

detecting whether an object is in a gap between the closure panel and a structural portion of the motor vehicle;

stopping the cinching of the latch mechanism with a second signal if an object is detected in the gap, and continuing the cinching of the latch mechanism to the primary latched position under the first signal if an object is not detected in the gap;

cinching the latch mechanism from the start position toward the cinch stop position under a first power mode while the gap between the closure panel and the structural portion of the motor vehicle is present, and when the gap between the closure panel and the structural portion of the motor vehicle is substantially closed, cinching the latch mechanism under a second power mode to the cinch stop position, wherein the first power mode is less than the second power mode; and moving the closure panel at a first speed while the power operated mechanism is in the first power mode, and moving the closure panel at a second speed while the power operated mechanism is in the second power mode, wherein the first speed is less than the second speed.

10. The method of claim 9, further including configuring at least one sensor to detect when the gap is present and when the gap is substantially closed and configuring the at least one sensor in operable communication with the power-operated cinch actuator to cause the power-operated cinch actuator to change from the first power mode to the second power mode when the gap is substantially closed.

11. The method of claim 10, further including configuring the at least one sensor to detect when the gap is present and when the gap is substantially closed and to simultaneously detect the position of at least one of the pawl and the ratchet.

12. The method of claim 11, further including providing the at least one sensor as a single switch assembly having a lever and a switch, and coupling the lever to the pawl for lost motion therewith and configuring the lever for movement into and out of actuating contact with the switch in response to movement of the pawl and the ratchet.

13. A method of moving a closure panel between a partially opened position relative to a structural portion of the motor vehicle wherein a gap between the closure panel and the structural portion of the motor vehicle is present allowing an object to be inserted between the structural body portion of the motor vehicle and the closure panel, to a partially closed position relative to a structural portion of the motor vehicle wherein the gap between the closure panel and the structural portion of the motor vehicle prevents an object to be inserted between the structural body portion of the motor vehicle, and to a fully closed position, comprising:

detecting the closure panel in the partially opened position;

activating a power operated mechanism at a first power output level when the closure panel is detected in the partially opened position;

detecting the closure panel in the partially closed position;

activating the power operated mechanism at a second power output level greater than the first power output level when the closure panel is detected in the partially opened position;

detecting the closure panel in the fully closed position;

deactivating the power operated mechanism when the closure panel is detected in the fully closed position; and moving the closure panel at a first speed while the power operated mechanism is in the first power output level, and moving the closure panel at a second speed while the power operated mechanism is in the second power output level, wherein the first speed is less than the second speed.

14. The method of claim 13, further comprising:

detecting whether an object is in the gap between the closure panel and a structural portion of the motor vehicle when the closure panel is between the partially opened position and the partially closed position; and deactivating the power operated mechanism if an object is detected in the gap, and continuing to activate the power operated mechanism if an object is not detected in the gap.

15. The method of claim 14, further including configuring a controller in operable communication with a sensor for detecting whether an object is in the gap between the closure panel and a structural portion of the motor vehicle when the closure panel is between the partially opened position and the partially closed position and configured the controller to deactivate the power operated mechanism when an object is detected by the sensor.

16. The method of claim 15, further including configuring the sensor to detect when the gap is present and when the gap is substantially closed and to simultaneously detect the positions of a pawl and a ratchet.

17. A closure latch assembly for a motor vehicle for releasably holding a closure panel in a fully closed position and a partially closed position relative to a structural portion of the motor vehicle and for releasing the closure panel for movement to an open position, comprising:

a latch mechanism having a ratchet moveable between a striker release position whereat the ratchet is positioned to release a striker to permit the closure panel to move to the open position, a secondary striker capture position whereat the closure panel is held in the partially closed position and a primary striker capture position whereat the closure panel is held in the fully closed position, a pawl moveable between a ratchet holding position whereat the pawl is positioned to hold the ratchet in one of its primary striker capture position and secondary striker capture position, and a ratchet releasing position whereat the pawl is positioned to permit movement of the ratchet to its striker release position;

a latch release mechanism moveable between a non-actuated position whereat the pawl is permitted to remain located in its ratchet holding position and an actuated position whereat the pawl is permitted to move to its ratchet releasing position;

a latch cinch mechanism for causing the ratchet to rotate from its secondary striker capture position to its primary striker capture position; and a power-operated cinch actuator configured to receive a first signal to activate the latch cinch mechanism to move the latch cinch mechanism from a cinch start position to a cinch stop position to move the ratchet from its secondary striker capture position to its primary striker capture position and to receive a second signal, in response to an object being detected within a gap between the closure panel and the structural portion of the motor vehicle, after receiving the first signal, to deactivate the latch cinch mechanism to stop the ratchet from moving to its primary striker capture position, wherein the power-operated cinch actuator is configured to move the ratchet from the secondary striker capture position toward the primary striker capture position at a first speed while in a first power mode, and to move the ratchet to the primary striker capture position at a second speed while in a second power mode, wherein the first speed is less than the second speed.

* * * * *